US008347204B2

(12) United States Patent  
Rosner

(10) Patent No.: US 8,347,204 B2  
(45) Date of Patent: Jan. 1, 2013

(54) METHOD AND SYSTEM FOR DATA ANALYSIS

(75) Inventor: Norm Rosner, Thornhill (CA)

(73) Assignee: Norm Rosner, Thornhill (CA)

( * ) Notice: Subject to any disclaimer, the term of this patent is extended or adjusted under 35 U.S.C. 154(b) by 811 days.

(21) Appl. No.: 12/396,577

(22) Filed: Mar. 3, 2009

(65) Prior Publication Data

US 2009/0276692 A1 Nov. 5, 2009

Related U.S. Application Data

(60) Provisional application No. 61/050,291, filed on May 5, 2008.

(51) Int. Cl.  
*G06F 17/00* (2006.01)
(52) U.S. Cl. .......................... 715/227; 715/212
(58) Field of Classification Search .................. 715/212, 715/220, 200, 227  
See application file for complete search history.

(56) References Cited

U.S. PATENT DOCUMENTS

| | | | | |
|---|---|---|---|---|
| 5,272,628 A * | 12/1993 | Koss | ............................. | 715/205 |
| 5,721,847 A * | 2/1998 | Johnson | ........................ | 715/786 |
| 6,157,934 A * | 12/2000 | Khan et al. | ..................... | 715/234 |
| 6,442,575 B2 * | 8/2002 | Pratley et al. | ................. | 715/212 |
| 7,143,339 B2 * | 11/2006 | Weinberg et al. | ............. | 715/212 |
| 7,467,350 B2 * | 12/2008 | Aureglia et al. | ............... | 715/218 |
| 7,647,551 B2 * | 1/2010 | Vigesaa et al. | ................ | 715/217 |
| 7,664,777 B2 * | 2/2010 | Cras et al. | ..................... | 707/600 |
| 7,954,047 B2 * | 5/2011 | Berger et al. | ................. | 715/220 |
| 2004/0015783 A1 * | 1/2004 | Lennon et al. | ................ | 715/523 |
| 2004/0103365 A1 * | 5/2004 | Cox | ............................. | 715/503 |
| 2007/0050699 A1 * | 3/2007 | Simkhay et al. | .............. | 715/503 |
| 2008/0104498 A1 * | 5/2008 | Molander et al. | ............. | 715/212 |
| 2008/0222508 A1 * | 9/2008 | Nguyen et al. | ................ | 715/212 |
| 2008/0222509 A1 * | 9/2008 | Nguyen et al. | ................ | 715/212 |
| 2009/0024940 A1 * | 1/2009 | Zeringue et al. | .............. | 715/763 |
| 2009/0024951 A1 * | 1/2009 | Zeringue et al. | .............. | 715/772 |
| 2010/0211862 A1 * | 8/2010 | Parish et al. | .................. | 715/212 |
| 2011/0271282 A1 * | 11/2011 | Sutter et al. | ................... | 718/101 |

* cited by examiner

*Primary Examiner* — Manglesh M Patel  
(74) *Attorney, Agent, or Firm* — Gowling Lafleur Henderson LLP

(57) ABSTRACT

A data analysis and display system and method for performing a plurality of operations on data arranged in data tables. One or more of the following data operations are provided: combining separate data together, for example by joining and appending; normalizing and summarizing; copying; calculating and presenting new information from existing data; making corrections in a persistent manner, and analyzing the data, to allow users to work with their data at a high level using a core set of functions that facilitate performance of these operations in a generally simple, intuitive manner.

13 Claims, 67 Drawing Sheets

TABLE AND RELATIONSHIP TYPES

| Course No. | Course Name | Student Number | Student Name | Grade |
|---|---|---|---|---|
| 101 | English | 0001 | Bob Smith | 82% |
| 101 | English | 0002 | Mary Jones | 79% |
| 101 | English | 0003 | Mark Robinson | 75% |
| 102 | Math | 0002 | Mary Jones | 89% |
| 102 | Math | 0004 | Fred Murphy | 95% |
| 201 | Geography | 0003 | Mark Robinson | 71% |
| 201 | Geography | 0004 | Fred Murphy | 65% |
| 201 | Geography | 0005 | Joe King | 90% |
| 202 | History | 0001 | Bob Smith | 88% |
| 202 | History | 0002 | Mary Jones | 76% |
| 203 | Chemistry | 0010 | Bob Smith | 78% |
| 203 | Chemistry | 0003 | Mark Robinson | 81% |
| 203 | Chemistry | 0005 | Joe King | 68% |
| 301 | Biology | 0002 | Mary Jones-Brown | 87% |
| 301 | Biology | 0004 | Fred Murphy | 92% |
| 302 | Physics | 0001 | Bob Smith | 83% |
| 302 | Physics | 0002 | Mary Jones-Brown | 93% |
| 302 | Physics | 0003 | Mark Robinson | 71% |
| 302 | Physics | 0005 | Joe King | 75% |
| 303 | Philosophy | 0003 | Mark Robinson | 85% |
| 303 | Philosophy | 0004 | Fred Murphy | 79% |
| 303 | Philosophy | 0005 | Joe King | 72% |
| 401 | Economics | 0002 | Mary Jones-Brown | 66% |
| 401 | Economics | 0005 | Joe King | 91% |
| 402 | Art | 0003 | Mark Robinson | 86% |
| 402 | Art | 0004 | Fred Murphy | 81% |

FIG. 2

TABLE AND RELATIONSHIP TYPES

COPY RELATIONSHIP

COPY RELATIONSHIP

JOIN RELATIONSHIP

APPEND RELATIONSHIP

APPEND RELATIONSHIP

| | Year | Region | GDP |
|---|---|---|---|
| 1 | 2004 | Asia and Oceania | 9,784.084 |
| 2 | 2004 | Caribbean and Central America | 223.882 |
| 3 | 2004 | Europe | 9,428.815 |
| 4 | 2004 | North America | 11,545.087 |
| 5 | 2004 | South America | 1,364.158 |
| 6 | 2004 | Sub-Saharan Africa | 398.394 |
| 7 | 2005 | Asia and Oceania | 10,256.445 |
| 8 | 2005 | Caribbean and Central America | 230.391 |
| 9 | 2005 | Europe | 9,596.288 |
| 10 | 2005 | North America | 11,960.419 |
| 11 | 2005 | South America | 1,433.883 |
| 12 | 2005 | Sub-Saharan Africa | 420.218 |
| 13 | 2006 | Asia and Oceania | 10,782.119 |
| 14 | 2006 | Caribbean and Central America | 239.122 |
| 15 | 2006 | Europe | 9,829.632 |
| 16 | 2006 | North America | 12,395.698 |
| 17 | 2006 | South America | 1,505.086 |
| 18 | 2006 | Sub-Saharan Africa | 444.653 |
| 19 | 2007 | Asia and Oceania | 11,291.057 |
| 20 | 2007 | Caribbean and Central America | 247.447 |
| 21 | 2007 | Europe | 10,044.269 |
| 22 | 2007 | North America | 12,800.071 |
| 23 | 2007 | South America | 1,573.396 |
| 24 | 2007 | Sub-Saharan Africa | 469.846 |

FIG. 6B

SUMMARY RELATIONSHIP

SUMMARY RELATIONSHIP

SUMMARY RELATIONSHIP

ANALYSIS RELATIONSHIP

ANALYSIS RELATIONSHIP

DATA CORRECTIONS

DATA CORRECTIONS

DATA CORRECTIONS

DATA CORRECTIONS

DATA CORRECTIONS

| Course No. | Course Name | Student Number | Student Name | Grade |
|---|---|---|---|---|
| 101 | English | 0010 | Bob Smith | 82% |
| 101 | English | 0002 | Mary Jones-Brown | 79% |
| 101 | English | 0003 | Mark Robinson | 75% |
| 102 | Math | 0002 | Mary Jones-Brown | 89% |
| 102 | Math | 0004 | Dr. Fred Murphy | 95% |
| 201 | Geography | 0003 | Mark Robinson | 81% |
| 201 | Geography | 0004 | Dr. Fred Murphy | 65% |
| 201 | Geography | 0005 | Joe King | 90% |
| 202 | History | 0010 | Bob Smith | 88% |
| 202 | History | 0002 | Mary Jones-Brown | 75% |
| 203 | Chemistry | 0010 | Bob Smith | 78% |
| 203 | Chemistry | 0003 | Mark Robinson | 81% |
| 203 | Chemistry | 0005 | Joe King | 68% |
| 301 | Biology | 0002 | Mary Jones-Brown | 87% |
| 301 | Biology | 0004 | Dr. Fred Murphy | 92% |
| 302 | Physics | 0010 | Bob Smith | 83% |
| 302 | Physics | 0002 | Mary Jones-Brown | 93% |
| 302 | Physics | 0003 | Mark Robinson | 71% |
| 302 | Physics | 0005 | Joe King | 75% |
| 303 | Philosophy | 0003 | Mark Robinson | 85% |
| 303 | Philosophy | 0004 | Dr. Fred Murphy | 79% |
| 303 | Philosophy | 0005 | Joe King | 72% |
| 401 | Economics | 0002 | Mary Jones-Brown | 66% |
| 401 | Economics | 0005 | Joe King | 91% |
| 402 | Art | 0003 | Mark Robinson | 86% |
| 402 | Art | 0004 | Dr. Fred Murphy | 81% |

FIG. 12E

DATA CORRECTIONS

1302

| | Trial | Group | Test Subject | Name | Attempts | Successes |
|---|---|---|---|---|---|---|
| 1 | 1 | B | 1001 | SMITH, JAMES | 76 | 36 |
| 2 | 1 | A | 1002 | JOHNSON, JOHN | 56 | 32 |
| 3 | 1 | C | 1003 | WILLIAMS, ROBERT | 93 | 74 |
| 4 | 1 | B | 1004 | JONES, MICHAEL | 50 | 28 |
| 5 | 1 | A | 1005 | BROWN, MARY | 73 | 8 |
| 6 | 1 | C | 1006 | DAVIS, WILLIAM | 48 | 24 |
| 7 | 1 | B | 1007 | MILLER, DAVID | 53 | 10 |
| 8 | 1 | B | 1008 | WILSON, RICHARD | 69 | 53 |
| 9 | 1 | C | 1009 | MOORE, CHARLES | 61 | 55 |
| 10 | 2 | B | 1001 | SMITH, JAMES | 80 | 72 |
| 11 | 2 | A | 1002 | JOHNSON, JOHN | 66 | 38 |
| 12 | 2 | C | 1003 | WILLIAMS, ROBERT | 42 | 25 |
| 13 | 2 | B | 1004 | JONES, MICHAEL | 93 | 90 |
| 14 | 2 | A | 1005 | BROWN, MARY | 51 | 9 |
| 15 | 2 | C | 1006 | DAVIS, WILLIAM | 73 | 11 |
| 16 | 2 | B | 1007 | MILLER, DAVID | 78 | 12 |
| 17 | 2 | B | 1008 | WILSON, RICHARD | 88 | 84 |
| 18 | 2 | C | 1009 | MOORE, CHARLES | 45 | 31 |
| 19 | 3 | B | 1001 | SMITH, JAMES | 54 | 36 |
| 20 | 3 | A | 1002 | JOHNSON, JOHN | 83 | 59 |
| 21 | 3 | C | 1003 | WILLIAMS, ROBERT | 59 | 35 |
| 22 | 3 | B | 1004 | JONES, MICHAEL | 38 | 10 |
| 23 | 3 | A | 1005 | BROWN, MARY | 73 | 1 |
| 24 | 3 | C | 1006 | DAVIS, WILLIAM | 58 | 55 |
| 25 | 3 | A | 1007 | MILLER, DAVID | 73 | 56 |
| 26 | 3 | B | 1008 | WILSON, RICHARD | 86 | 2 |
| 27 | 3 | C | 1009 | MOORE, CHARLES | 42 | 19 |

FIG. 13A

DATA CORRECTIONS

DATA CORRECTIONS

FIG. 13E

| | Group | Test Subject | Name | Total Attempts | Total Successes | Success Rate |
|---|---|---|---|---|---|---|
| 1 | | 1001 | SMITH, JAMES | 210 | 144 | 0.686 |
| 2 | | 1004 | JONES, MICHAEL | 181 | 128 | 0.707 |
| 3 | B | 1007 | MILLER, DAVID | 131 | 22 | 0.168 |
| 4 | | 1008 | WILSON, RICHARD | 243 | 139 | 0.572 |
| 5 | | TOTAL | | 765 | 433 | 0.566 |
| 6 | | 1002 | JOHNSON, JOHN | 205 | 129 | 0.629 |
| 7 | | 1003 | WILLIAMS, ROBERT | 194 | 134 | 0.691 |
| 8 | | 1005 | BROWN, MARY | 197 | 18 | 0.091 |
| 9 | C | 1006 | DAVIS, WILLIAM | 179 | 90 | 0.503 |
| 10 | | 1007 | MILLER, DAVID | 73 | 56 | 0.767 |
| 11 | | 1009 | MOORE, CHARLES | 148 | 105 | 0.709 |
| 12 | | TOTAL | | 996 | 532 | 0.534 |
| 13 | TOTAL | | | 1761 | 965 | 0.548 |

FIG. 13F

| | Group | Test Subject | Name | Total Attempts | Total Successes | Success Rate |
|---|---|---|---|---|---|---|
| 1 | | 1001 | SMITH, JAMES | 210 | 144 | 0.686 |
| 2 | | 1004 | JONES, MICHAEL | 181 | 128 | 0.707 |
| 3 | B | 1007 | MILLER, DAVID | 131 | 22 | 0.168 |
| 4 | | 1008 | WILSON, RICHARD | 243 | 139 | 0.572 |
| 5 | | TOTAL | | 765 | 433 | 0.566 |
| 6 | | 1002 | JOHNSON, JOHN | 205 | 129 | 0.629 |
| 7 | | 1003 | WILLIAMS, ROBERT | 194 | 134 | 0.691 |
| 8 | | 1005 | BROWN, MARY | 197 | 18 | 0.091 |
| 9 | C | 1006 | DAVIS, WILLIAM | 179 | 90 | 0.503 |
| 10 | | 1007 | MILLER, DAVID | 73 | 56 | 0.767 |
| 11 | | 1009 | MOORE, CHARLES | 148 | 105 | 0.709 |
| 12 | | TOTAL | | 996 | 532 | 0.534 |
| 13 | TOTAL | | | 1761 | 965 | 0.548 |

FIG. 13G

This value has been corrected.
Uncorrected values:
1007 (A)
1007 (B)

| | Group | Test Subject | Name | Total Attempts | Total Successes | Success Rate |
|---|---|---|---|---|---|---|
| 1 | | 1001 | SMITH, JAMES | 210 | 144 | 0.686 |
| 2 | B | 1004 | JONES, MICHAEL | 181 | 128 | 0.707 |
| 3 | | 1008 | WILSON, RICHARD | 243 | 139 | 0.572 |
| 4 | | TOTAL | | 634 | 411 | 0.648 |
| 5 | | 1002 | JOHNSON, JOHN | 205 | 129 | 0.629 |
| 6 | | 1003 | WILLIAMS, ROBERT | 194 | 134 | 0.691 |
| 7 | | 1005 | BROWN, MARY | 197 | 18 | 0.091 |
| 8 | | 1006 | DAVIS, WILLIAM | 179 | 90 | 0.503 |
| 9 | | 1007 | MILLER, DAVID | 204 | 78 | 0.382 |
| 10 | | 1009 | MOORE, CHARLES | 148 | 105 | 0.709 |
| 11 | | TOTAL | | 1127 | 554 | 0.492 |
| 12 | TOTAL | | | 1761 | 965 | 0.548 |

DATA CORRECTIONS

FIG. 13H

| | Group | Test Subject | Name | Total Attempts | Total Successes | f() | Success Rate |
|---|---|---|---|---|---|---|---|
| 1 | | 1001 | SMITH, JAMES | 210 | 144 | | 0.686 |
| 2 | B | 1004 | JONES, MICHAEL | 181 | 128 | | 0.707 |
| 3 | | 1008 | WILSON, RICHARD | 243 | 139 | | 0.572 |
| 4 | | TOTAL | | 634 | 411 | | 0.648 |
| 5 | | 1002 | JOHNSON, JOHN | 205 | 129 | | 0.629 |
| 6 | | 1003 | WILLIAMS, ROBERT | 194 | 134 | | 0.691 |
| 7 | | 1005 | BROWN, MARY | 197 | 18 | | 0.091 |
| 8 | C | 1006 | DAVIS, WILLIAM | 179 | 90 | | 0.503 |
| 9 | | 1007 | MILLER, DAVID | 204 | 78 | | 0.382 |
| 10 | | 1009 | MOORE, CHARLES | 148 | 105 | | 0.709 |
| 11 | | TOTAL | | 1127 | 554 | | 0.492 |
| 12 | TOTAL | | | 1761 | 965 | | 0.548 |

FIG. 13I

| | Group | Test Subject | Name | Total Attempts | Total Successes | f() | Success Rate |
|---|---|---|---|---|---|---|---|
| 1 | | 1001 | SMITH, JAMES | 210 | 144 | | 0.686 |
| 2 | B | 1004 | JONES, MICHAEL | 181 | 128 | | 0.707 |
| 3 | | 1008 | WILSON, RICHARD | 243 | 139 | | 0.572 |
| 4 | | TOTAL | | 634 | 411 | | 0.648 |
| 5 | | 1002 | JOHNSON, JOHN | 205 | 129 | | 0.629 |
| 6 | | 1003 | WILLIAMS, ROBERT | 194 | 134 | | 0.691 |
| 7 | | 1005 | BROWN, MARY | 197 | 18 | | 0.091 |
| 8 | C | 1006 | DAVIS, WILLIAM | 179 | 90 | | 0.503 |
| 9 | | 1007 | MILLER, DAVID | 204 | 78 | | 0.382 |
| 10 | | 1009 | MOORE, CHARLES | 148 | 105 | | 0.709 |
| 11 | | TOTAL | | 1127 | 554 | | 0.492 |
| 12 | TOTAL | | | 1761 | 965 | | 0.548 |

FIG. 13J

This value has been corrected.
Uncorrected value: 1002 (A)

| | Group | Test Subject | Name | Total Attempts | Total Successes | f() | Success Rate |
|---|---|---|---|---|---|---|---|
| 1 | | 1001 | SMITH, JAMES | 210 | 144 | | 0.686 |
| 2 | | 1002 | JOHNSON, JOHN | 205 | 129 | | 0.629 |
| 3 | B | 1004 | JONES, MICHAEL | 181 | 128 | | 0.707 |
| 4 | | 1008 | WILSON, RICHARD | 243 | 139 | | 0.572 |
| 5 | | | | 839 | 540 | | 0.644 |
| 6 | | 1003 | WILLIAMS, ROBERT | 194 | 134 | | 0.691 |
| 7 | | 1005 | BROWN, MARY | 197 | 18 | | 0.091 |
| 8 | C | 1006 | DAVIS, WILLIAM | 179 | 90 | | 0.503 |
| 9 | | 1007 | MILLER, DAVID | 204 | 78 | | 0.382 |
| 10 | | 1009 | MOORE, CHARLES | 148 | 105 | | 0.709 |
| 11 | | TOTAL | | 922 | 425 | | 0.461 |
| 12 | TOTAL | | | 1761 | 965 | | 0.548 |

DATA CORRECTIONS

DATA CORRECTIONS

FIG. 14A

| | Group | Test Subject | Name | Total Attempts | Total Successes | f() Success Rate |
|---|---|---|---|---|---|---|
| 1 | | 1005 | BROWN, MARY | 197 | 18 | 0.091 |
| 2 | A | 1007 | MILLER, DAVID | 204 | 78 | 0.382 |
| 3 | | TOTAL | | 401 | 96 | 0.239 |
| 4 | | 1001 | SMITH, JAMES | 210 | 144 | 0.686 |
| 5 | | 1002 | JOHNSON, JOHN | 205 | 129 | 0.629 |
| 6 | B | 1004 | JONES, MICHAEL | 181 | 128 | 0.707 |
| 7 | | 1008 | WILSON, RICHARD | 243 | 139 | 0.572 |
| 8 | | TOTAL | | 839 | 540 | 0.644 |
| 9 | | 1003 | WILLIAMS, ROBERT | 194 | 134 | 0.691 |
| 10 | C | 1006 | DAVIS, WILLIAM | 179 | 90 | 0.503 |
| 11 | | | MOORE, CHARLES | 148 | 105 | 0.709 |
| 12 | | | | 521 | 329 | 0.631 |
| 13 | TOTAL | | | 1761 | 965 | 0.548 |

Cut  Ctrl+X
Copy  Ctrl+C
Clear Cells
Insert Row Header Before
Delete Rows  Del
Remove Column Formula
Totals
Sort Ascending
Sort Descending
Chart Selected Data

FIG. 14B

| | Group | Test Subject | Name | Total Attempts | Total Successes | f() Success Rate |
|---|---|---|---|---|---|---|
| 1 | | 1005 | BROWN, MARY | 197 | 18 | 0.091 |
| 2 | A | 1007 | MILLER, DAVID | 204 | 78 | 0.382 |
| 3 | | TOTAL | | 401 | 96 | 0.239 |
| 4 | | 1001 | SMITH, JAMES | 210 | 144 | 0.686 |
| 5 | | 1002 | JOHNSON, JOHN | 205 | 129 | 0.629 |
| 6 | B | 1004 | JONES, MICHAEL | 181 | 128 | 0.707 |
| 7 | | 1008 | WILSON, RICHARD | 243 | 139 | 0.572 |
| 8 | | TOTAL | | 839 | 540 | 0.644 |
| 9 | | 1003 | WILLIAMS, ROBERT | 194 | 134 | 0.691 |
| 10 | C | 1006 | DAVIS, WILLIAM | 179 | 90 | 0.503 |
| 11 | | 1009 | MOORE, CHARLES | 148 | 105 | 0.709 |
| 12 | | TOTAL | | 521 | 329 | 0.631 |
| 13 | D | 1021 | jennifer martinez | 300 | 225 | 0.750 |
| 14 | | TOTAL | | 300 | 225 | 0.750 |
| 15 | TOTAL | | | 2061 | 1190 | 0.577 |

DATA CORRECTIONS

FIG. 14C

| | Group | Test Subject | Name | Total Attempts | Total Successes | Success Rate |
|---|---|---|---|---|---|---|
| 1 | | | 1005 BROWN, MARY | 197 | 18 | 0.091 |
| 2 | A | | 1007 MILLER, DAVID | 204 | 78 | 0.382 |
| 3 | | | TOTAL | 401 | 96 | 0.239 |
| 4 | | | 1001 SMITH, JAMES | 210 | 144 | 0.686 |
| 5 | | | 1002 JOHNSON, JOHN | 205 | 129 | 0.629 |
| 6 | B | | 1004 JONES, MICHAEL | 181 | 128 | 0.707 |
| 7 | | | 1008 WILSON, RICHARD | 243 | 139 | 0.572 |
| 8 | | | TOTAL | 839 | 540 | 0.644 |
| 9 | | | 1003 WILLIAMS, ROBERT | 194 | 134 | 0.691 |
| 10 | C | | 1006 DAVIS, WILLIAM | 179 | 90 | 0.503 |
| 11 | | | 1009 MOORE, CHARLES | 148 | 105 | 0.709 |
| 12 | | | TOTAL | 521 | 329 | 0.631 |
| 13 | D | | | 300 | 225 | 0.750 |
| 14 | | | TOTAL | 300 | 225 | 0.750 |
| 15 | TOTAL | | | 2061 | 1190 | 0.577 |

Context menu:
- Cut  Ctrl+X
- Copy  Ctrl+C
- Clear Cells
- Insert Row Before
- Delete Row  Del
- Remove Column Formula
- Insert Comment
- Totals ▶
- Sort Ascending
- Sort Descending
- Chart Selected Data

FIG. 14D

| | Group | Test Subject | Name | Total Attempts | Total Successes | Success Rate |
|---|---|---|---|---|---|---|
| 1 | | | 1005 BROWN, MARY | 197 | 18 | 0.091 |
| 2 | A | | 1007 MILLER, DAVID | 204 | 78 | 0.382 |
| 3 | | | TOTAL | 401 | 96 | 0.239 |
| 4 | | | 1001 SMITH, JAMES | 210 | 144 | 0.686 |
| 5 | | | 1002 JOHNSON, JOHN | 205 | 129 | 0.629 |
| 6 | B | | 1004 JONES, MICHAEL | 181 | 128 | 0.707 |
| 7 | | | 1008 WILSON, RICHARD | 243 | 139 | 0.572 |
| 8 | | | TOTAL | 839 | 540 | 0.644 |
| 9 | | | 1003 WILLIAMS, ROBERT | 194 | 134 | 0.691 |
| 10 | C | | 1006 DAVIS, WILLIAM | 179 | 90 | 0.503 |
| 11 | | | 1009 MOORE, CHARLES | 148 | 105 | 0.709 |
| 12 | | | TOTAL | 521 | 329 | 0.631 |
| 13 | | | 1021 jennifer martinez | 300 | 225 | 0.750 |
| 14 | D | | TOTAL | 510 | 340 | 0.667 |
| 15 | TOTAL | | | 2271 | 1305 | 0.575 |

FORMULAS

FORMULAS

OPERATORS:

| OPERATOR | MEANING |
|---|---|
| ( ) | Sub-expression grouping |
| ^ | Exponentiation |
| *, / | Multiplication, Division |
| +, - | Addition, Subtraction/Negation |
| & | String concatenation |
| <, >, =, <=, >=, <> | Value comparison |

Higher Precedence ↑ ↓ Lower Precedence

REGULAR FUNCTIONS:

ABS, ACOS, AND, ASIN, ATAN, ATAN2, CEILING, CHAR, CLEAN, CODE, COMBIN, CONCATENATE, COS, COSH, DATE, DATEVALUE, DAY, DEGREES, EVEN, EXACT, EXP, FACT, FALSE, FIND, FLOOR, HOUR, IF, INT, ISBLANK, ISERR, ISEVEN, ISLOGICAL, ISNA, ISNONTEXT, ISNUMBER, ISODD, ISTEXT, LEFT, LEN, LN, LOG, LOWER, MID, MINUTE, MOD, MONTH, MROUND, N, NA, NOT, NOW, ODD, OR, PERMUT, PI, POWER, PROPER, QUOTIENT, RADIANS, REPLACE, REPT, RIGHT, ROUND, ROUNDDOWN, ROUNDUP, SECOND, SIGN, SIN, SINH, SQRT, SQRTPI, SUBSTITUTE, T, TAN, TANH, TIME, TIMEVALUE, TODAY, TRIM, TRUE, TRUNC, TYPE, UPPER, VALUE, YEAR, YEARFRAC

AGGREGATE FUNCTIONS (for aggregating entire columns):

AVERAGE, COUNT, FIRST, LAST, MAX, MIN, STDEV, STDEVP, VAR, VARP

SPECIAL FUNCTIONS (for accessing data in other rows, or other special values):

| FUNCTION | MEANING |
|---|---|
| COLUMN () | Current column number |
| COLUMNNAME () | Current column name |
| COUNTFROM ( column-name [, row-count] ) | Count values starting from current row |
| COUNTTO ( column-name [, row-count] ) | Count values up to current row |
| NEXT ( column-name [, row-count] ) | Retrieve value from a subsequent row |
| PREVIOUS ( column-name [, row-count] ) | Retrieve value from a preceding row |
| ROW () | Current row number |
| SUMFROM ( column-name [, row-count] ) | Sum values starting from current row |
| SUMTO ( column-name [, row-count] ) | Sum values up to current row |

FIG. 16

REFRESHING IMPORTED DATA

MANUAL TABLE STRUCTURE

INPUT TABLE STRUCTURE

COPY TABLE STRUCTURE

JOIN RELATIONSHIP STRUCTURE

APPEND RELATIONSHIP STRUCTURE

SUMMARY/ANALYSIS RELATIONSHIP STRUCTURE

SUMMARY/ANALYSIS RELATIONSHIP STRUCTURE

CORRECTION STRUCTURES

CORRECTION STRUCTURES

SUMMARY/ANALYSIS TABLE CORRECTION STRUCTURES

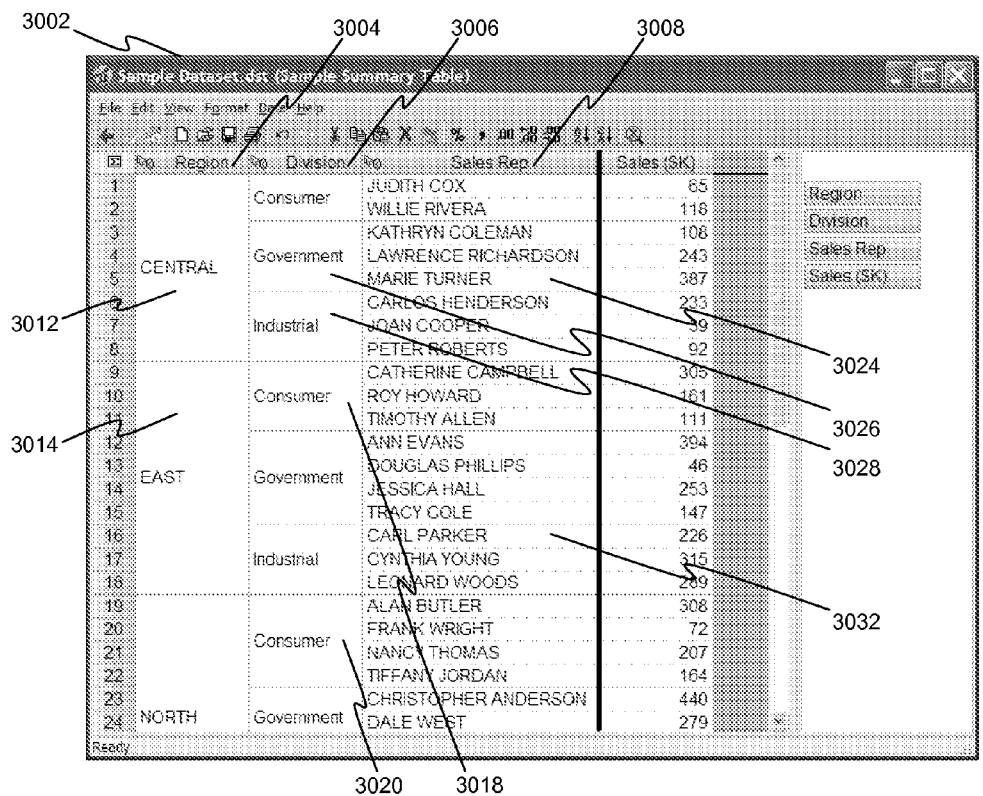

FIG. 30

Example correction rules for key column "Region" (highest level):

3010. CENTRAL → EAST (combine)

Example correction rules for key column "Division" (mid-level):

3016. NORTH, Consumer → EAST, Consumer (combine)

Example correction rules for key column "Sales Rep" (lowest level):

3022. CENTRAL, Government, MARIE TURNER → CENTRAL, Industrial, MARIE TURNER (move)

3030. EAST, Industrial, CARL PARKER → EAST, Industrial, KARL PARKER (replace)

SUMMARY/ANALYSIS TABLE CORRECTION STRUCTURES

CORRECTION RULE APPLICATION METHODS

| User Action | Rule Type | When Applied | How Applied |
|---|---|---|---|
| User drag and drops a header onto another header at the same level. | COMBINE | Rules are applied to source table data, before it is used to build the summary/analysis table structure. | Extract the the fully-qualified key values from each row in the source table.<br><br>Look for COMBINE or MOVE rules with 'uncorrected values' matching the key values.<br><br>Apply the lowest-level such rule found, by replacing the key values with the rule's 'corrected values'.<br><br>Repeatedly re-correct the data until no matching rule is found. |
| User drag and drops a header into a different higher-level header's scope. | MOVE | | |
| User overtypes the value in a header cell. | REPLACE | Rules are applied to summary/analysis table data after the table structure has been built. Rules are applied dynamically as data is retrieved from the table (e.g. when data is displayed to the user). | Extract the the fully-qualified key values from the summary/analysis table.<br><br>Look for REPLACE rules with 'uncorrected values' matching the key values.<br><br>Apply at most a single rule for each header level, if a matching rule is found at that level. Replace only the key value which is at the same level as the rule. Replace with the corresponding 'corrected value' from the rule. |

FIG. 31

SUMMARY/ANALYSIS TABLE CORRECTION STRUCTURES

SUMMARY/ANALYSIS TABLE CORRECTION STRUCTURES

SUMMARY/ANALYSIS TABLE CORRECTION STRUCTURES

| 3216. Rules for Column "Group" | 3217. Rules for Column "Subitem" |
|---|---|
| 3218.   A → B   (combine) | 3222.   B,1 → C,9   (combine) |

SUMMARY/ANALYSIS TABLE CORRECTION STRUCTURES

| 3216. Rules for Column "Group" | | | | 3217. Rules for Column "Subitem" | | | |
|---|---|---|---|---|---|---|---|
| 3218. | A → B | | (combine) | 3222. | B,1 → C,9 | | (combine) |
| | | | | 3228. | B,2 → C,2 | | (move) |

SUMMARY/ANALYSIS TABLE CORRECTION STRUCTURES

| 3216. Rules for Column "Group" | | | |
|---|---|---|---|
| 3218. | A → B | (combine) | |

| 3217. Rules for Column "Subitem" | | | |
|---|---|---|---|
| 3222. | B,1 → C,9 | (combine) |
| 3228. | B,2 → C,2 | (move) |
| 3232. | B,3 → B,3.1 | (replace) |

SUMMARY/ANALYSIS TABLE CORRECTION STRUCTURES

| 3216. Rules for Column "Group" | | | | |
|---|---|---|---|---|
| 3218. | A | → | B | (combine) |

| 3217. Rules for Column "Subitem" | | | | |
|---|---|---|---|---|
| 3222. | B,1 | → | C,9 | (combine) |
| 3228. | B,2 | → | C,2 | (move) |
| 3232. | B,3 | → | B,3.1 | (replace) |
| 3236. | C,12 | → | B,4 | (combine) |

SUMMARY/ANALYSIS TABLE CORRECTION STRUCTURES

| 3216. Rules for Column "Group" | | | | |
|---|---|---|---|---|
| 3218. | A | → | B | (combine) |

| 3217. Rules for Column "Subitem" | | | | |
|---|---|---|---|---|
| 3222. | B,1 | → | C,9 | (combine) |
| 3228. | B,2 | → | C,2 | (move) |
| 3232. | B,3 | → | B,3.1 | (replace) |
| 3236. | C,12 | → | B,4 | (combine) |
| 3240. | B,7 | → | C,7 | (move) |

SUMMARY/ANALYSIS TABLE CORRECTION STRUCTURES

| 3216. Rules for Column "Group" |
|---|
| (none) |

| 3217. Rules for Column "Subitem" | | | | |
|---|---|---|---|---|
| 3222. | A,1 | → | C,9 | (combine) |
| 3228. | A,2 | → | C,2 | (move) |
| 3232. | A,3 | → | A,3.1 | (replace) |
| 3236. | C,12 | → | A,4 | (combine) |
| 3240. | B,7 | → | C,7 | (move) |

SUMMARY/ANALYSIS TABLE CORRECTION STRUCTURES

SUMMARY/ANALYSIS TABLE CORRECTION STRUCTURES

3326. Rules for Column "Group"

| | | | | |
|---|---|---|---|---|
| 3330. | X | → | Y | (combine) |

3328. Rules for Column "Subitem"

| | | | | | |
|---|---|---|---|---|---|
| 3332. | X, 3 | → | Y, (system1) | (moved, invisible) |
| 3334. | Y, (system1) | → | Y, 3 | (replaced, invisible) |

SUMMARY/ANALYSIS TABLE CORRECTION STRUCTURES

| 3326. Rules for Column "Group" | | | | |
|---|---|---|---|---|
| 3330. | X | → | Y | (combine) |

| 3328. Rules for Column "Subitem" | | | | |
|---|---|---|---|---|
| 3332. | X, 3 | → | Y, (system1) | (moved, invisible) |
| 3334. | Y, (system1) | → | Y, 3 | (replaced, invisible) |
| 3336. | Y, 5 | → | Z, (system2) | (move) |
| 3338. | Z, (system2) | → | Z, 5 | (replaced, invisible) |

| Operation | | Target Level | Notes |
|---|---|---|---|
| 1. Join (Denormalize) | | Table | Non-traditional join<br>Columns from a source table are added directly to a target table, with values based on key lookup<br>Resolve duplicate keys in source table |
| 2. Summarize (Normalize) | | Table | Extract redundant values from one table and summarize into a subset table<br>Inverse operation to Join<br>Resolve inconsistently redundant data |
| 3. Copy | | Table | Copy or append data from one table to another table |
| 4. Derive | | Column | Derive a new column of data using a formula<br>Same formula applied to each row |
| 5. Correct | Add, Delete | Row, Column | Rows and columns added clearly identified<br>Rows and columns deleted can be fully restored |
| | Change Value | Cell | Correction is dynamically applied, so if source data is changed, the correction will still apply |
| 6. Analyze | | Table | Crosstab dimensional analysis |
| 7. Refresh | | Table | Allow replacing/adding to the data in a table |

FIG. 37

METHOD AND SYSTEM FOR DATA ANALYSIS

RELATED APPLICATION

This application claims benefit of priority to Provisional U.S. Patent Application No. 61/050,291, filed May 5, 2008, entitled Method and System for Data Analysis; the aforementioned priority application being hereby incorporated by reference in its entirety.

FIELD OF THE INVENTION

The present invention relates to a method and system for data analysis and specifically, a method and system for facilitating restructuring, manipulation and analysis of data.

BACKGROUND OF THE INVENTION

A large number of human endeavours use quantitative data methods to track and control activities. As a result, a large number of computer programs are available today for analyzing data. However, these programs are designed to work with clean (e.g., well-structured data).

Generally, clean data can be defined as data that is fully consistent with any implied relationships within the data. An implied relationship arises due to real-world relationships between objects represented by the data. For example, if one table contains course enrollment records containing a student number, and another table contains student records containing a student number and student name, then there is an implied join relationship between the tables, because the student numbers in both tables represent the same real-world objects. If the data is clean, then every student number found in the enrollment table will also appear in the student table, and each student number will only appear once in the student table. If these criteria are not met, then the data is considered to be "dirty"; however the implied relationship nevertheless still exists, because it is based on a real-world relationship that still exists. The difficulties with dirty data are first to identify the implied relationships when the data is not clean, and then to correctly address the inconsistencies in the data.

The existing methods only allow analysis of specific data from some specific source systems; others allow analysis of ad-hoc data sources. However, the existing programs need the data to be clean and well structured before it can be used or analyzed. This is disadvantageous since inconsistent "dirty" data tends to be the majority of cases, particularly with ad-hoc data sources. Some analysis programs allow the user to make limited corrections to the data, but these capabilities are often limited in scope, and in general it is very difficult to keep track of such corrections and ensure that they remain in place as the user works with the data. Therefore manually cleaning and restructuring the data is still often needed prior to performing any analysis or manipulation on the data.

The most common tools used for performing this manual cleaning and structuring are spreadsheet programs, and sometimes relational database programs for more sophisticated users. Although these are not data analysis tools per se, they are often used to prepare the data for analysis by allowing manual restructuring and manipulation of the data by a user. In many cases, the actual data analysis is then performed in spreadsheet programs also using its manual manipulation and charting capabilities.

As will be understood by a person skilled in the art, manual cleaning and restructuring of data is disadvantageous as it requires users to be knowledgeable of the desired result and clean data. As well, when handling large amounts of dirty data, this process is tedious and unreliable.

Further, the difficulty with these existing methods is that spreadsheet programs and database programs are extremely low-level tools designed for flexibility, not simplicity. They are designed to give the users control of all details and aspects. In a spreadsheet program, the user is thus responsible for ensuring every value is correct in every cell. Relationships between different parts of a spreadsheet are established on a cell-by-cell basis. For example, in order to establish a high level relationship between two data sources (such as, relating a customer number to the corresponding customer name), the user must perform operations on multiple individual cells using formulas in order to establish the relationship. This process is time consuming, non-intuitive and error-prone.

Further, although database programs allow certain operations from one or more tables to other tables, these are static operations. That is, static operations refer to the fact that the operation inputs one fixed set of data and outputs another fixed set. If a change is made in the original input data, this change is not reflected in the output data. If the input data contains certain errors, a database program will generally disallow certain operations until the errors are corrected. Users need to manually prepare the data by executing operations sequentially, starting from the initial input data and using the output of each operation as input to one or more other operations. As well the operations are performed by the user manually defining the links between each of the cells in the tables and this process needs to be redone once the order of the cells and/or location is changed.

As a result, data manipulation in spreadsheet and database programs involves significant numbers of sequential manual steps to be performed. Often users must go back and repeat steps if they need to correct errors made along the way. To redo the manipulations on a new or revised set of data, all steps must be performed again. The skill level required to perform this data manipulation and correction successfully is quite high.

The current state of the art in data manipulation software consists of four broad categories: high end statistical analysis, data mining and data visualization programs; business intelligence systems, generally integrated with a company's operational and marketing systems; specialty data manipulation software designed for the information needs of a specific vertical industry, often integrated with operational systems for the same industry; software used to analyze "ad-hoc" data with an arbitrary structure and content provided that the user performs manual manipulation on the data prior to any analysis to obtain clean data. The first category of software is generally designed for a small subset of users in specialist occupations, who have specific data analysis requirements that go beyond the needs of most users. The second and third categories of software generally require a company's operational data to be pre-structured and integrated with the data manipulation software and data warehouses. In general, the manipulation capabilities provided by these systems must be largely anticipated in advance. These systems also generally require significant involvement of technical personnel to set up and maintain. The fourth category of software allows users to perform analysis with data, and where the analysis needs cannot be anticipated in advance. However, the data often needs to be transformed, corrected or otherwise manipulated by the user before it can be usefully analyzed in these software packages.

This manual manipulation generally requires significant expertise both in data modeling and with the spreadsheet and/or database programs in use.

An increasingly large amount of corporate data resides in ad-hoc sources such as spreadsheets and desktop databases. Significant technical skills are generally required to extract useful information from this type of data. Spreadsheet programs and desktop database programs are "low-level" tools. They are designed to give the users control of all details and aspects. For example, the user is responsible for ensuring every value is correct in every cell in a spreadsheet, and relationships between different parts of the spreadsheet are established on a cell-by-cell basis. Thus, in order to establish a high level relationship between two data sources (for example, relating a customer number to the corresponding customer name), the user must perform operations on multiple individual cells using formulas in order to establish the relationship. This process is time consuming, non-intuitive and error-prone. Additionally, as mentioned earlier, the process needs to be repeated if the data including its order in the table changes.

Thus, users generally spend the majority of their time performing repetitive operations. This arises due to a number of factors. First, as previously noted, the tools involved are very low-level, so users often must perform multiple low-level operations to effectively perform a single high-level operation. Secondly, the tools involved are not dynamic, meaning that the tools often cannot be set up to dynamically perform all the necessary processing from beginning to end; instead the user generally performs a series of steps, with the output of each step being then used as input to the next step. If any errors are made at any step and discovered later, the user must repeat all the steps subsequent to the error; often, the intermediate results are no longer available at this point and the user must start again at the very beginning. Such errors happen frequently even with experienced users, due to the complexity of the process. Finally, the same analysis must be performed again on a regular basis using new data. In these situations the user must re-execute each step with the new data.

For example, a spreadsheet can join data only by manual manipulation, that is only by entering into a cell a specific formula and copying the formula to all other rows, and then repeating the process with a slightly different formula for each column to be joined. On the other hand, a desktop database is not dynamic (such operations must be performed sequentially, and if the input changes, the results of the join do not fully reflect the changes); additionally, a desktop database handles errors in the data very poorly, generally disallowing certain operations until the user has manually found and corrected each error.

Thus, spreadsheets and desktop databases used to analyze and report on data, require performing the same steps repeatedly in a very time-consuming and error-prone manner. Further, users typically spend much more of their time manipulating data, as opposed to actually analyzing the information.

A solution to one or more of these issues is therefore desirable.

SUMMARY OF THE INVENTION

According to one aspect, there is provided a data analysis method and system that allows a plurality of operations to be performed automatically by understanding and analyzing the underlying data to be manipulated. In one aspect one or more of the following operations is provided: combining separate data together (e.g. by joining or appending); normalizing (i.e. summarizing) data; copying data; calculating new information from existing data; making corrections; and analyzing the data. Advantageously, the method and system allows users to work with their data at a high level using a small set of functions that facilitate performing these operations in a simple, generally intuitive way.

According to one embodiment, the method and system provides these functions in a manner that is persistent. That is, the method and system retains the information describing the operations performed, so that the operations need only be performed once and applies to a set of associated data. According to another embodiment, the operations are also dynamic, meaning that if any changes or corrections are made to any data within the system (e.g. to the input data table or to the source table), all other data within the system will correspondingly reflect the change. Finally, the operations are transparent, meaning that a user is clearly informed with regard to all operations which have been performed.

According to one aspect, the method and system allows a user to add, modify or delete any data. In one aspect, all such modifications are marked as corrections within the corresponding table. Accordingly, information regarding the original (uncorrected) state of the data is always available to the user. In one aspect, the corrections made by a user to the data are reversible, so the user can easily revert back to the original state of the data.

Advantageously, the data analysis system is tolerant of errors in the data (e.g. dirty data). The functions provided (e.g. copy, summarize, append, join, analyze) operate in a manner that can produce meaningful results even with errors in the source data.

BRIEF DESCRIPTION OF THE DRAWINGS

The invention will be better understood with reference to the attached drawings, in which:

FIG. 2 is an example data table used with the data analysis system of FIG. 1A;

FIGS. 6A-6B illustrate exemplary input and appended resultant tables of the append module of FIG. 1A;

FIGS. 7A-7D illustrate exemplary input and summarized resultant tables of the summary module of FIG. 1A;

FIGS. 11A-14D illustrate exemplary resultant tables according to the corrections module of FIG. 1A;

FIGS. 15-16 illustrate example formulas for analysing data according to the data analysis system of FIG. 1A;

FIGS. 30-33D illustrate table correction structures provided by the corrections module of FIG. 1A;

FIG. 37 illustrates exemplary operations provided by the data analysis system of FIG. 1.

DETAILED DESCRIPTION OF THE PREFERRED EMBODIMENTS

Data Analysis System 100

Figure 1A:
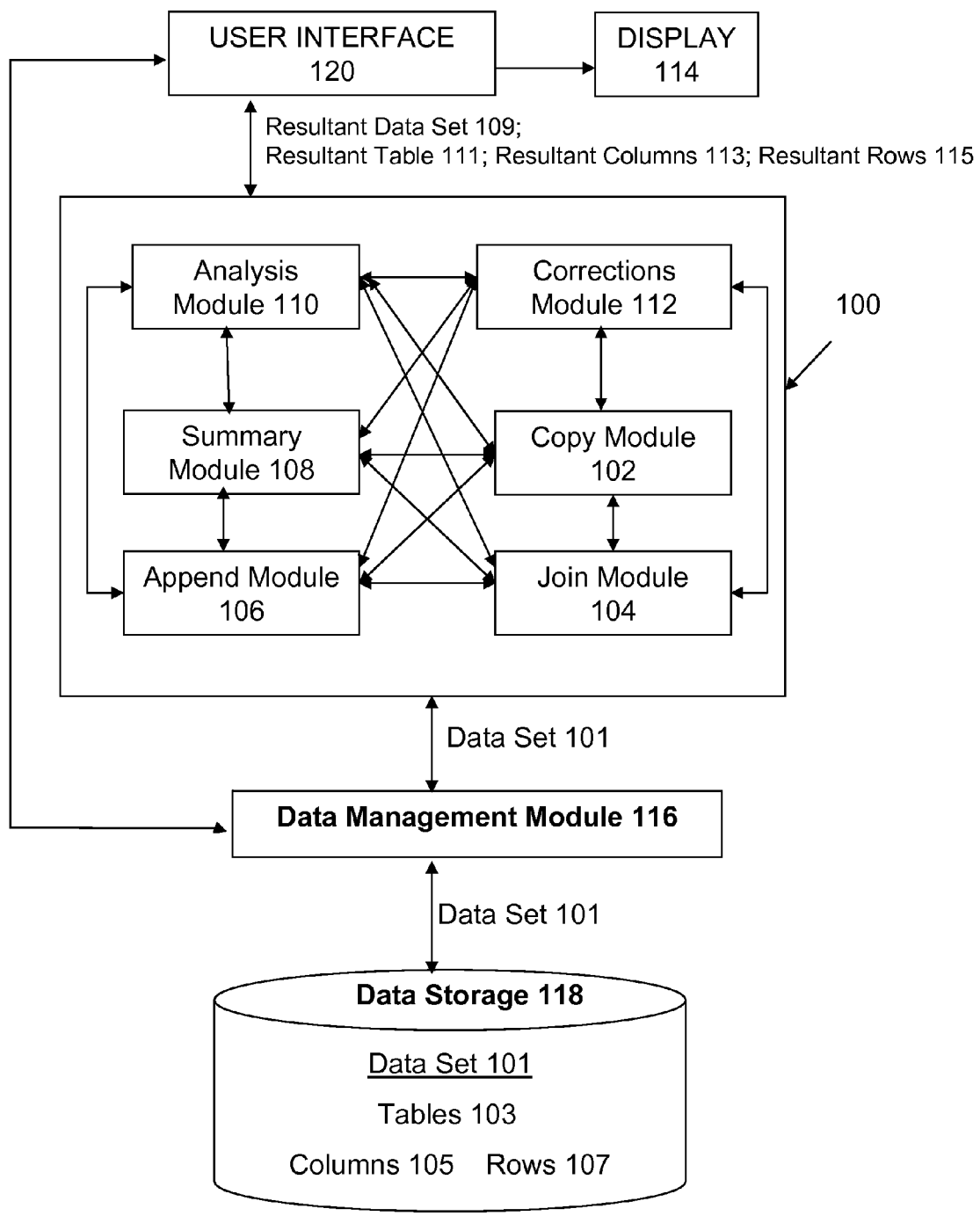
FIG. 1A is a schematic diagram of an embodiment of a data analysis system.

For convenience, like reference numerals in the description refer to like structures in the drawings. Referring to FIG. 1A, shown is an embodiment of a data analysis system, indicated generally by the numeral 100. The data analysis system 100 is configured for facilitating restructuring of data such as joining rows from different tables, cleaning of data such as to remove discrepancies and redundancies with the data, correction such as allowing a user to correct data while keeping track of corrections, and analysis of data such as to provide graphical analysis. As described earlier, the data received by the data analysis system 100 may receive dirty data that includes redundancies and other discrepancies within the data. The data analysis system 100 receives a data set 101 from a data management module 116. The data management module 116 interacts with and receives the data set 101 from a data storage 118 for subsequent manipulation by the data analysis system 100. The data storage 118 is configured to store a plurality of data sets 101 comprising one or more data tables 103 having corresponding columns 105 and rows 107 containing the data.

As will be described herein, the data set 101 may be created via user input through user interface 120 or may be provided from another storage system. Other ways of obtaining the data set 101 will be understood by a person skilled in the art.

The data analysis system 100 receives the data sets 101 for subsequent manipulation according to the operation desired by the user via a user interface 120. The data analysis system 100 provides resultant data sets 109 comprising one or more resultant tables 111 including resultant columns 113 and rows 115 to a user interface 120 for subsequent display on the display 114. The data analysis system 100 comprises a copy module 102, a join module 104, an append module 106, a summary module 108, an analysis module 110, and a corrections module 112. The copy module 102 is configured to copy a received source table 103 to a target table (e.g. provided as a resultant data set 109 to the user interface 120 for subsequent display on a display 114). The relationship between the target table (e.g. the resultant data set 109) and the source data set 101 is dynamic. That is, any changes to the values within the source table 103 will be reflected in the resultant table 111. The copy module 102 maintains a data link between the columns 105, row values 107 of the source table (e.g. input table 103) and the corresponding copied target table's rows and columns (provided as an output resultant data set 109).

The join module 104 is configured to receive a source table and a target table as input data sets 101. As illustrated in reference to FIGS. 5B and 5C, the user selects column(s) of the source table to be linked with column(s) of the target table. Each value in the linked column of the target table has a set of corresponding values in the remaining columns of the target table (e.g. located within the same row as the value in the linked column of the target table). Each value in the selected column of the target table corresponding to a same value in the linked column of the target table is associated with the set of corresponding values of the target table. In this way, the joined resultant table (e.g. resultant table 111) provided by the join module 104, includes the source table columns and rows. The joined resultant table further includes additional columns for each of the linked target columns. The additional column includes values from the linked target columns associated with the selected source table column.

As discussed earlier, the data analysis system 100 maintains a link between the values of the input data set 101 (e.g. input table 103) and corresponding output resultant data set 109 (e.g. resultant table 111) such that when a value in the input table 103 is changed the corresponding values in the resultant data table 111 are changed accordingly. That is, there exists a dynamic relationship between the input data set 101 and the output resultant data set 109. In this case, the join module maintains a link between the resultant table 111 (e.g. produced by joining the target and source input tables 103) and the input tables 103 (e.g. the source and target input tables) such that when a value is changed in the source table or the target table, it is reflected in the resultant table 111. The visual style of display used for data in a cell or an array of cells, whether background color, steady or flashing color, font type, font size, various icons, etc., may be varied to indicate that action has been taken on that cell or array of cells. This visual style of display may typically be different from the display scheme used for the cell or array of cells which remain unaffected by any of the operations of the various modules discussed herein.

The append module 106 is configured to append the rows/columns of one table at the end of another table (e.g. append rows/columns from the source table to the target table). The appended resultant table 111 is dynamic, so that when the data is changed in input source or target table 103, the resultant data table 111 provided by appending columns/rows is changed accordingly.

The summary module 108 is configured to receive the input table 103 and provide a summarized resultant table 111. The user selects one or more columns/rows from the source table (e.g. input table 103) to define key columns/rows. The key columns/rows define how the other columns of the resultant table will be summarized. That is, the key columns define the categories for the corresponding summarization columns. First, the redundant values in the key columns are consolidated (e.g. as shown in the "Student Number" column of FIG. 7D) to a single value.

The user then selects one or more other columns of the source table as summarization columns. The module 108 aggregates values in each summarization column associated with the single value (e.g. the single value from the key column) such as to provide an aggregated value in the other columns corresponding to the single value of the key column. The aggregated value may be a single value for redundant values corresponding to the single value of the key column. For example, in FIG. 7D, the key column has been consolidated such that there is only one instance of each student number from the original column in the input table 103. Further, the consolidated value in the key column corresponds to a plurality of values in the selected summarization column(s). The plurality of values in the selected summarization columns corresponding to the consolidated value in the key column is then aggregated. Accordingly, since the student names may have been repeated several times to account for the repetitive student number (e.g. Student Names corresponding to Student Number=002), the "Student Names" column in the summarization column is aggregated. In this case, the aggregation means that the redundancies in the summarization columns are removed such that there is a single value in the summarization column corresponding to the consolidated single value in the key column. For example, the numerous entries of Mary Jones Brown having different spelling is reduced to a single representative value/aggregated value of "Mary Jones-Brown". The user is further presented with a drop down menu or other selection means to select which of the underlying values (obtained from the source table) should be the representative aggregated value. In one embodiment, changes made to the summarized resultant table 111, such as by modifying the aggregated value, are reflected accordingly in the corresponding input table 103 values.

In one embodiment, the aggregation of the values in the summarization columns associated with the single consolidated value in the key column comprises a statistical analysis value such as a median, mean, mode, sum, minimum, maximum, or difference of the underlying plurality of values in the summarization column. For example, in FIG. 9B, the summarization column corresponds to an average value for each of the categories defined by the key column.

The analysis module 110 provides the additional functionality over the summarization module that the user can select the method of aggregation for the summarization columns. The possible aggregation types can include total, minimum, maximum, stdev, etc. The analysis module further provides a visual display (e.g. a chart or plot) of the key columns and the summarization columns such that illustrated in FIG. 9C where the key column ("Course Name") and the Summarization columns (e.g. Avg Grade) are plotted. The result is presented as a resultant data set 109 for subsequent display on the display 114.

The corrections module 112 is configured to maintain a history of all modifications made to the one or more input tables 103 and/or resultant tables 111. For example, the values in the resultant tables 111 and/or the input tables 103 may have been modified while the user interacts with any one of the copy module 102, the join module 104, the append module 106, the summary module 108, and/or the analysis module 110. Accordingly, the corrections module 112 allows a user to revert back any changed value or added/deleted value(s) to its original or previous value. According to another embodiment, the corrections module 112 provides a visual display on the display 114 of any changes or modifications to the resultant table 111 and/or input tables 103. In this way, the operations performed by a user either manually or automatically are transparent such that the user can clearly see what has been corrected or changed and how. According to another embodiment, the corrections module 112 further maintains a history of all actions performed by a user such as any actions performed by any one of the copy module 102, the join module 104, the append module 106, the summary module 108, the analysis module 110. The corrections module 112 further maintains information regarding the state of the values in the input tables 103 and the resultant tables 111 such as to allow the user to undo certain operations and revert to a previous state.

Thus, the data analysis system 100 uses a pre-defined set of simple, high-level "atomic" operations (e.g. joining, summarizing, appending, copying, analyzing, allowing corrections) that allow manipulation of data in traditional tabular format. These atomic operations combine together to provide the processes needed to accept, clean, correct, restructure and analyze arbitrary data. Additionally, the data analysis system 100 maintains consistency between the input data set 101 and the resultant data set 109 as described herein such that changes to values within a resultant data set 109 are reflected in one or more linked values. Further, the data analysis system 100 (e.g. via the corrections module 112) maintains a history of the operations performed as well as the state of the data set 109 at each stage such that a user is able to revert back to previous states.

Preferably, the data analysis system 100 provides the one or more operations in a manner that eliminates repetition. This can be done by providing one or more of the following characteristics for the operations:

1. PERSISTENT: In one embodiment, one or more operations (e.g. join, summary, copy, correct), once performed, are recorded such that they can be repeated and not performed again by the user. For example, if the user overtypes a cell with a corrected value, it is not only the corrected value that persists; it is the actual existence of the correcting operation that persists.

2. DYNAMIC: In one embodiment, any change to the structure or content of the data is automatically reflected elsewhere in the data, so that the data (e.g. data set 109) remains consistent. As will be described, in one example, as the input data set 101 is changed, the resultant data set 109 changes accordingly.

3. REVERSIBLE: In one embodiment, the user can remove a performed operation at any time as provided by the corrections module 112. If requested, the data will then automatically reset to its previous state. In one example, the original input data itself is not modified.

4. TRANSPARENT: In one embodiment, one or more operations that have been performed are visible to the user as provided by the corrections module 112. This allows the user to see and revert back to previous states if desired.

Referring to FIG. 37 shown are exemplary operations provided by the data analysis system of FIG. 1 and modules 102, 104, 106, 108, 110, and 112. In one embodiment, the join module 104, facilitates joining columns of data from a lookup table to a target table. The join is based on looking up values from specified key columns for each target table row. In one embodiment, the summary module 108 allows summarization of redundant data in a table into a single non-redundant subset table. In one embodiment, the copy module 102 allows copying rows and columns of data from one table to another. The data may be copied to a new table or appended to an existing table. In one embodiment, the analysis module 110, allows deriving a new column of data by performing a specified calculation for each row using the values contained in the row. In one embodiment, the corrections module 112 facilitates performing corrections on the data in a table. The specific sub-operations include adding and deleting rows and columns, and changing values in cells. In one embodiment, the analysis module 110 and/or summary module 108 facilitates performing analysis on a table of data. This consists of summarizing the data vertically and/or horizontally by the values in specified columns of data. In one embodiment, the corrections module 112 is further configured to allow refreshing the input data (e.g. input data set 101) with the new data.

It is noted that the join operation provided by the join module 104 and the summarize operation provided by the summary module 108 are inverse operations. The join operation extracts non-redundant data from one table and adds redundant copies of the data to another table, i.e. the join operation denormalizes the data. The summarize operation extracts redundant data from one table and uses it to create a non-redundant subset table. These two operations, together with the ability to copy data and the ability to selectively correct data, are sufficient to perform all the manipulation, cleaning and restructuring useful for ad-hoc data analysis purposes. Finally, the user is provided the ability to set up persistent analyses of the clean data, and the ability to refresh the input data with new data when required.

Accordingly, as described above, preferably, the one or more operations provided by the data analysis system 100 are persistent, dynamic, reversible and transparent, such as to allow a user to perform the operations and in the process create a persistent structure defining the sequence of operations. The user can then make changes at any point in the structure, without needing to repeat any other operations. The user can also refresh the input data (e.g. input data set 101) via the corrections module 112, and the persistent operations will continue to be dynamically applied to the new data.

Computing Device 117

Figure 1B:
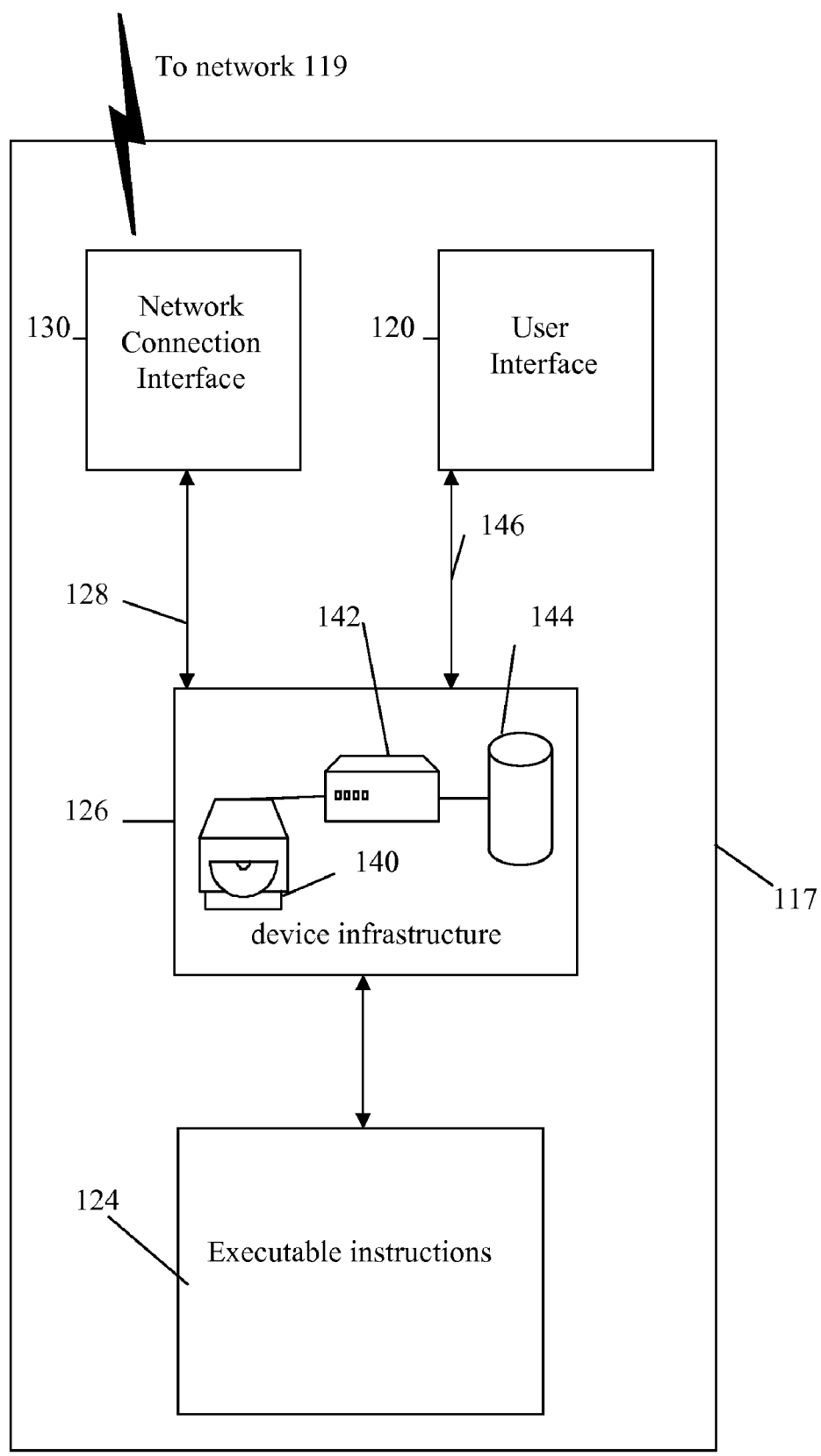
FIG. 1B is a schematic diagram illustrating an exemplary computing device for the data analysis system of FIG. 1A.

The data analysis system 100 including the copy module 102, the join module 104, the append module 106, the summary module 108 and/or the analysis module 110 described herein may be implemented on one or more networked computing devices 117 such as that illustrated in FIG. 1B. Referring to FIG. 1B, the computing device 117 can include a network connection interface 130, such as a network interface card or a modem, coupled via connection 128 to a device infrastructure 126. The connection interface 130 is connectable during operation of the device 117 to the network 119 (e.g. an Intranet and/or an extranet such as the Internet), which enables the devices 117 to communicate with each other as appropriate. The network 119 can support the communication of the messages for the various transmitted data (e.g. data set 101, resultant data set 109) as desired.

Referring again to FIG. 1B, the device 117 can also have a user interface 120, coupled to the device infrastructure 126 by connection 146, to interact with a user (e.g. system 100 administrator). The user interface 120 can include one or more user input devices such as but not limited to a QWERTY keyboard, a keypad, a stylus, a mouse, a microphone and the user output device such as an LCD screen display and/or a speaker. If the screen is touch sensitive, then the display can also be used as the user input device as controlled by the device infrastructure 126. For example, the user interface 120 for the copy module 102, the join module 104, the append module 106, the summary module 108, and/or the analysis module 110 is employed by a user to define or modify the data set 101 or the resultant data set 109 as well as to select desired settings and selections for each of the modules (such as to select which two tables should be joined by the join module 104).

Referring again to FIG. 1B, operation of the device 117 is facilitated by the device infrastructure 126. The device infrastructure 126 includes one or more computer processors 142 and can include an associated memory 144 (e.g. a random access memory). The memory 144 is used to store data (e.g. data set 101, resultant data set 109) for access by the respective user and/or operating system/executable instructions 124 of the device 117. The computer processor 142 facilitates performance of the device 117 configured for the intended task through operation of the network interface 130, the user interface 120 and other application programs/hardware 124 (e.g. browser or other device application on the mobile/desktop) of the device 117 by executing task related instructions. These task related instructions can be provided by an operating system, and/or software applications 124 located in the memory 144, and/or by operability that is configured into the electronic/digital circuitry of the processor(s) 142 designed to perform the specific task(s). Further, it is recognized that the device infrastructure 126 can include a computer readable storage medium 140 coupled to the processor 142 for providing instructions to the processor 142 and/or to load/update the instructions 124. The computer readable medium 140 can include hardware and/or software such as, by way of example only, magnetic disks, magnetic tape, optically readable medium such as CD/DVD ROMS, and memory cards. In each case, the computer readable medium 140 may take the form of a small disk, floppy diskette, cassette, hard disk drive, solid-state memory card, or RAM provided in the memory module 144. It should be noted that the above listed example computer readable mediums 140 can be used either alone or in combination.

Further, it is recognized that the computing device 117 can include the executable applications 124 comprising code or machine readable instructions for implementing predetermined functions/operations including those of an operating system and the data analysis system 100 or modules 102, 104, 106, 108, and 110, for example. The processor 142 as used herein is a configured device and/or set of machine-readable instructions for performing operations as described by example above.

As used herein, the processor 142 may comprise any one or combination of, hardware, firmware, and/or software. The processor 142 acts upon information by manipulating, analyzing, modifying, converting or transmitting information for use by an executable procedure or an information device, and/or by routing the information with respect to an output device. The processor 142 may use or comprise the capabilities of a controller or microprocessor, for example. Accordingly, any of the functionality of the executable instructions 227 (e.g. through modules associated with selected tasks) may be implemented in hardware, software or a combination of both. Accordingly, the use of a processor 142 as a device and/or as a set of machine-readable instructions is hereafter referred to generically as a processor/module for sake of simplicity. The memory 146 is used to store data locally as well as to facilitate access to remote data stored on other devices 117 connected to the network 119.

Data Table Structures

The data analysis system 100 is based on the concept of data tables as illustrated in FIG. 2. Structurally, tables are based on the traditional relational database model. Each table contains information about multiple instances of some entity. FIG. 2 shows a representation of a sample table (e.g. input table 103 or resultant table 111). The table consists of data arranged in arrays of data cells, the arrays in turn may include multiple rows (e.g. 107, 115) and multiple columns (e.g. 105). The intersection of each row and column is referred to as a cell; each cell capable of containing a data value. The data value may be numeric, alphabetical, or any combination thereof. For example, cell 206 is at the intersection of row 202 and column 204. Cell 206 contains the data value "95%".

Typically all the cells in a particular column contain data values of similar type and meaning. For example, in FIG. 2 all cells in column 204 contain numeric values expressed as percentages, and represent student grades. Each column can be assigned a name representing its content. In FIG. 2 the column name is provided at the top of each column. There are 5 columns with names 210 "Course No.", 212 "Course Name", 214 "Student Number", 216 "Student Name" and 218 "Grade".

Each row in the table represents an instance of a particular entity represented by the table. In FIG. 2 the table represents the entity "Student Enrollment". Each row in the table represents a single instance of a specific student enrolling in a specific course. The values in the individual cells of each row are used to identify or describe different aspects of a single instance of the "Student Enrollment" entity.

Figure 3:
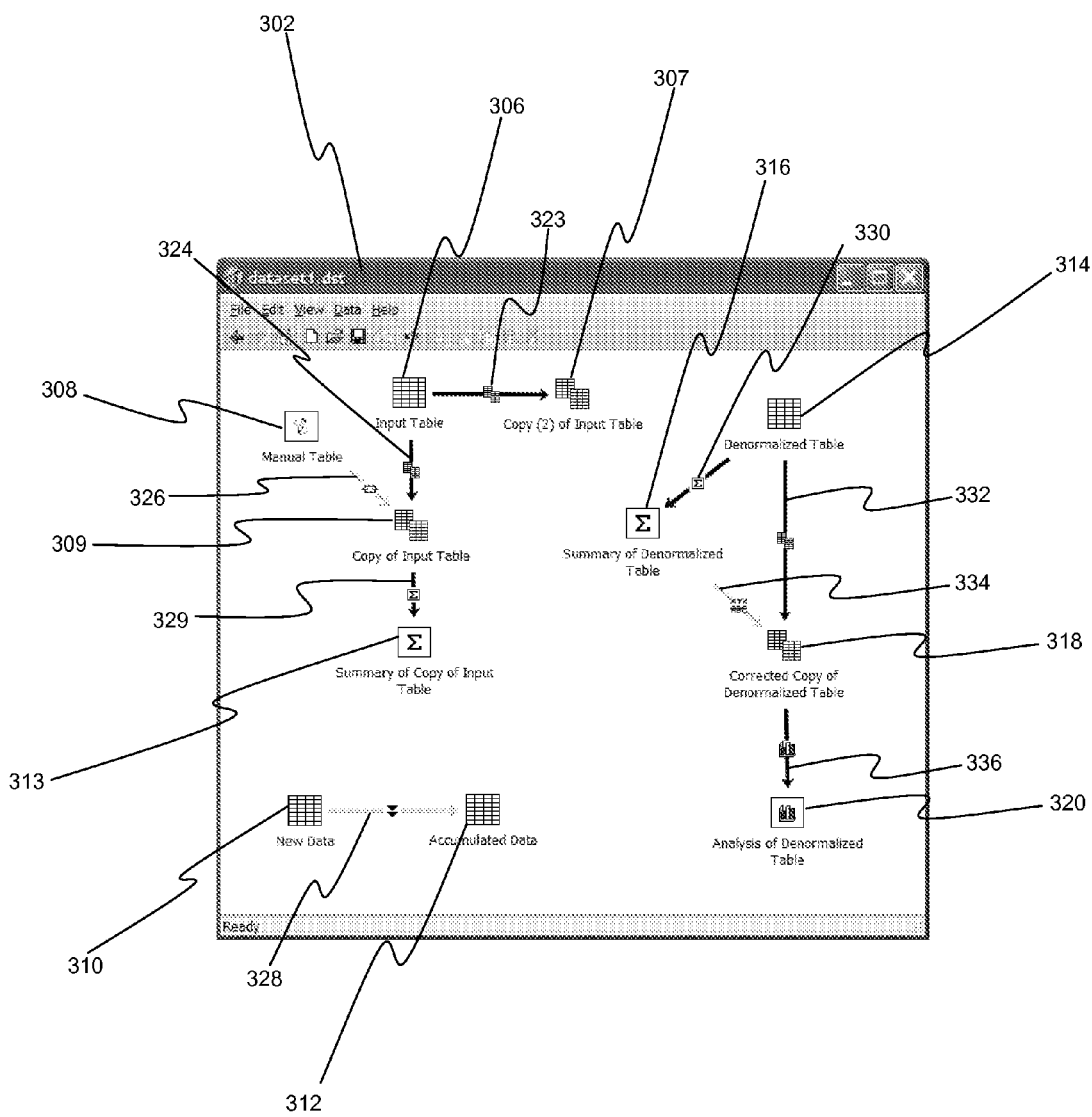
FIG. 3 illustrates an example table workspace implemented using the data analysis system of FIG. 1A.

The data analysis system 100 allows users to store, manipulate and display data in the form of tables as described above. The data analysis system initially presents a window on a single user interface display screen to the user. This window is the workspace through which the users access and manipulate their tables. FIG. 3 shows an example of a table workspace window 302 containing 11 icons representative of the respective tables. Each table icon (306-310, 312-314, 318-320) represents an individual table of data.

Figure 4A:
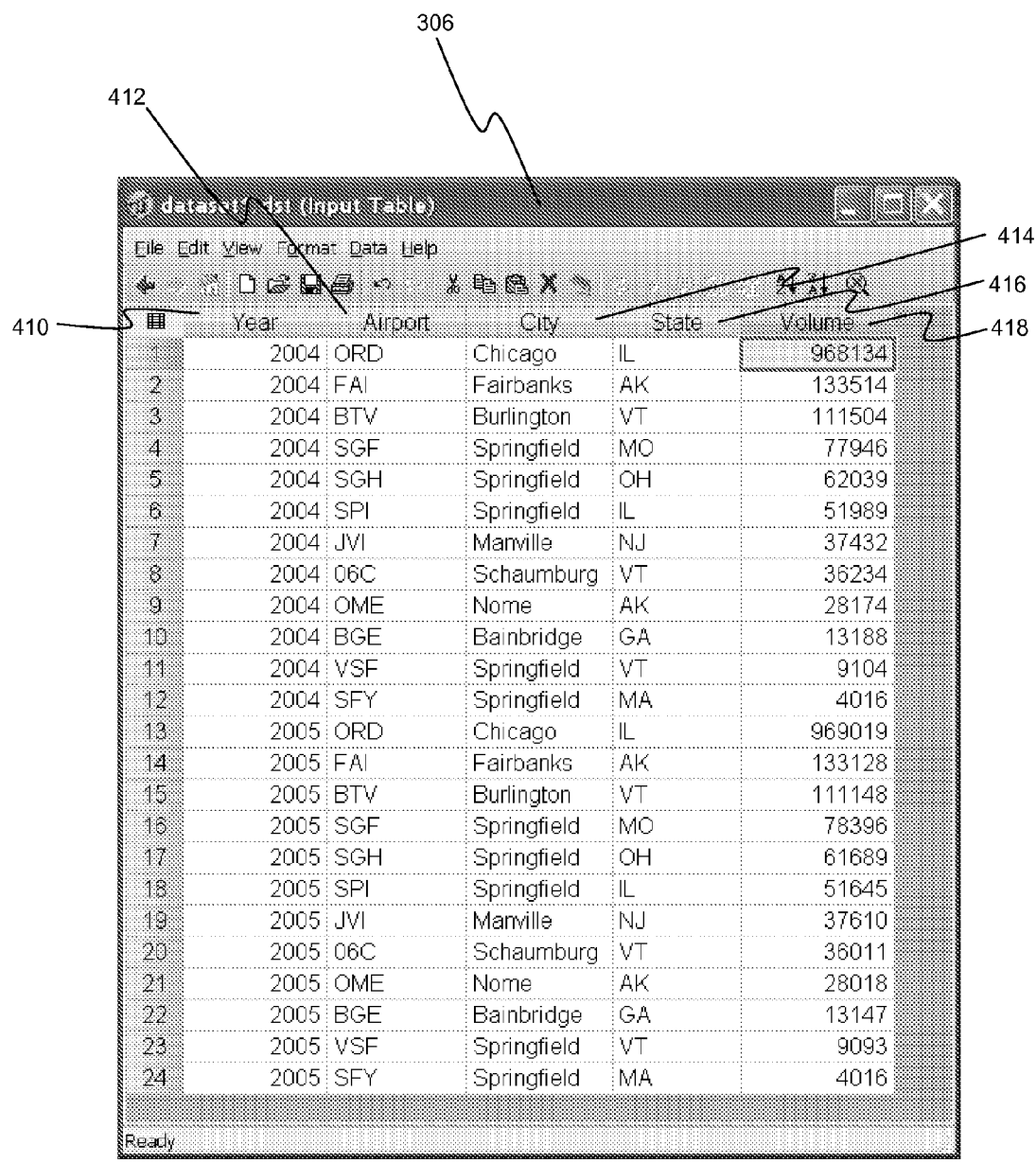
FIGS. 4A-4B illustrate exemplary source and copied target table during a copy operation of the copy module of FIG. 1A.

For example, a user double-clicks an icon with their mouse to view the data in an individual table (e.g. input table 103). In one case, if the user double-clicks table 306, the contents table 306 are displayed as shown in FIG. 4A. A user may also select an icon representative of a source table, for instance, and proceed to drag and drop that icon onto, or overlapping with, an icon representative of a target table, to indicate a join operation, all done on the single user interface display screen.

Table workspace 302 in FIG. 3 contains tables of different types, illustrated by differing icons. Tables can have different kinds of relationships with each other, visually indicated by differing arrows between icons. As illustrated, each relationship has a source table and a target table; the arrow points from the source table to the target table. Each relationship specifies that some or all of the contents of the target table are to be derived from the source table. The relationships between two or more tables are dynamic: the contents of a target table are dynamically determined whenever needed, based on the current contents of the source table. There are five table types and five relationship types which are described below.

Type of Tables and Relationships—FIG. 3

Tables 306, 310, 312 and 314 are examples of input tables, and represented by icons of the single user interface display screen. According to one embodiment, an input table (e.g. table 103) is a type of table that contains data imported into the data analysis system 100 from an external source, such as a spreadsheet file, a formatted text file, a web page data table, the system clipboard, or other sources as will be understood by a person skilled in the art.

Table 308 is an example of a manual input table (e.g. table 103). A manual table comprises data (e.g. data set 101) that has been manually entered into the data analysis system 100 by the user. The user manually creates rows and columns and enters values directly into the cells.

Tables 307, 309 and 318 are examples of copy tables. A copy table (e.g. resultant table 111) contains a copy of the data in another table. In this example, table 307 is a copy of table 306; this relationship is indicated by arrow 323. The copy is dynamic, meaning that copy table 307 will always contain a copy of the current data in source table 306. If data in source table 306 is changed, or if rows or columns are added to or deleted from source table 306, then the data in copy table 307 will automatically change correspondingly. A more detailed example of a copy relationship is provided below.

Tables 313 and 316 (e.g. FIG. 8, FIGS. 7C-7D) are examples of summary tables (e.g. resultant tables 111). A summary table is similar to a copy table, in that it contains data that has been derived from a source table (e.g. table 103). However, the data in a summary table is not a direct copy of its source table. The summary table receives redundant (duplicated) data from the source table (e.g. table 103) and summarizes it so that it is no longer redundant, a process referred to as normalization. In this example, summary table 316 contains a normalized summary of one or more columns from its source table (e.g. table 103), table 314. This relationship is visually indicated by directional arrow 330, linking an icon representative of summary table 316 with an icon representative of its source table 314. The summary relationship is dynamic, so that the data in summary table 316 will always correspond to the current (e.g. updated) data in source table 314. If data in source table 314 is changed, or if rows or columns are added to or deleted from source table 314, then the normalized data in summary table 316 will automatically change correspondingly. A more detailed example of a summary relationship is provided below.

Figure 9A:
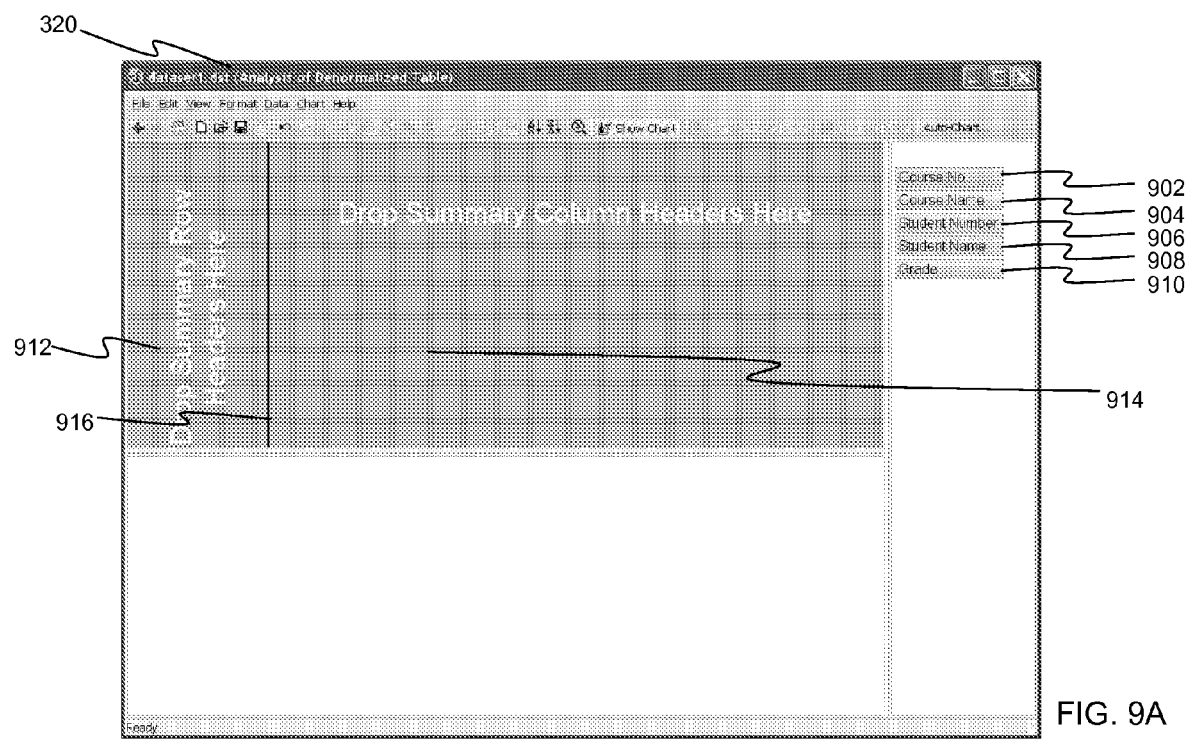
FIGS. 9A-10 illustrate exemplary resultant tables and graphical visualization of the resultant tables according to the analysis module of FIG. 1A.
Figure 9B:
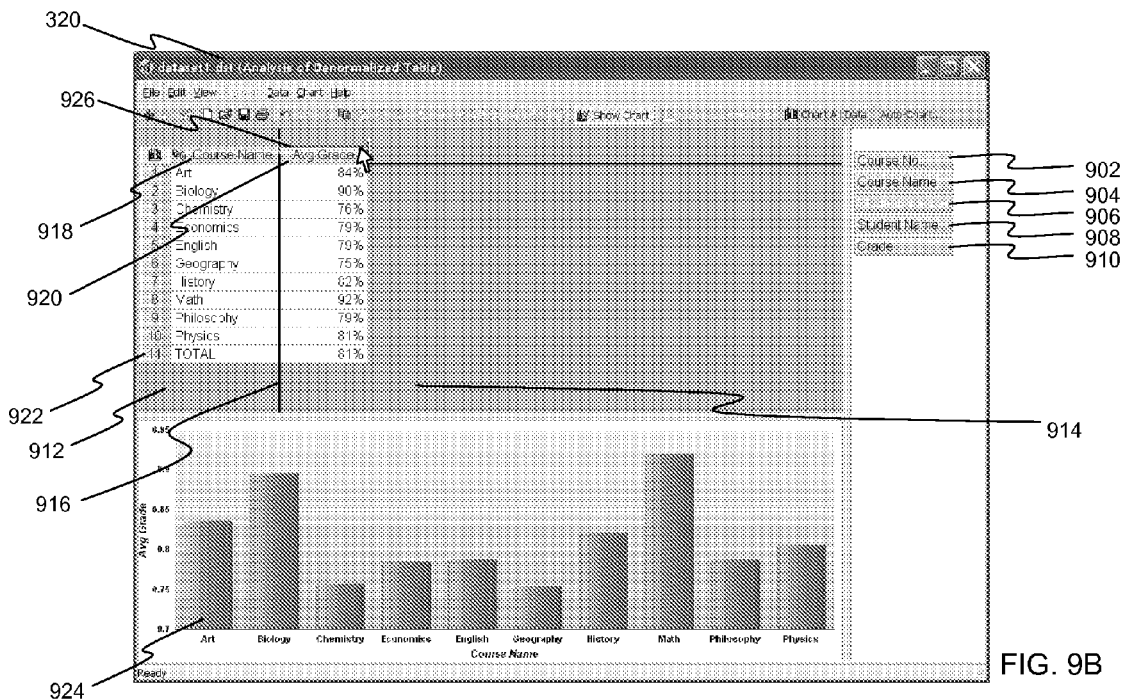
Figure 9C:
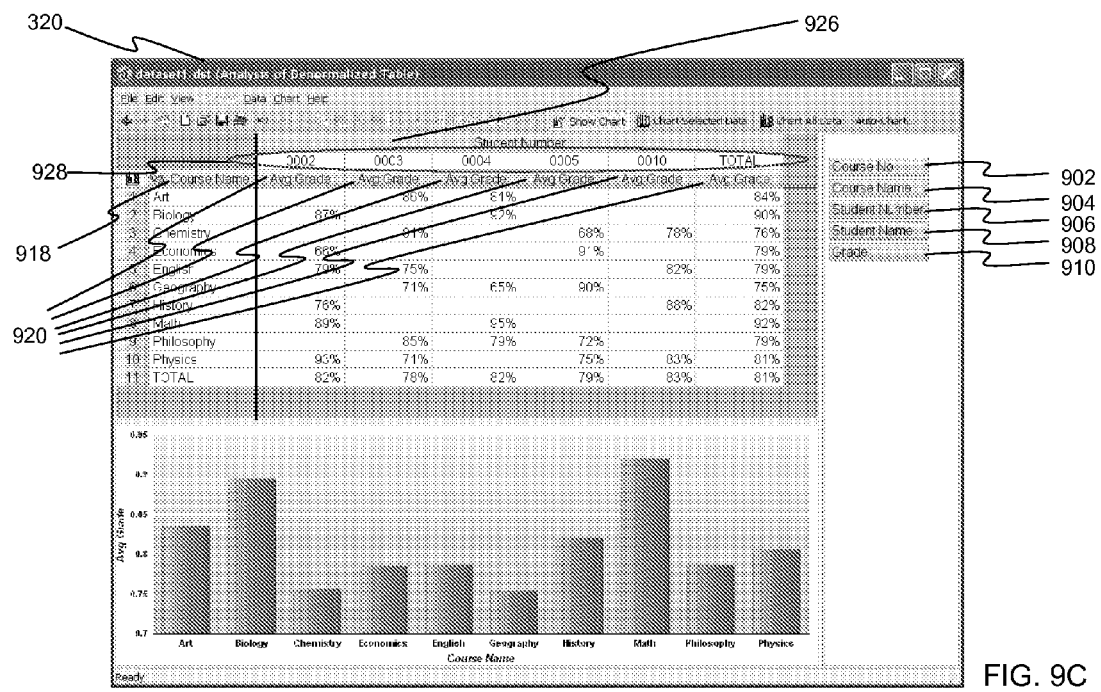

Table 320 is an example of an analysis table (e.g. also shown in FIGS. 9A-9C). An analysis table 320 is an embodiment of the resultant table 111. Table 320 receives data from source table 318 (e.g. table 103); this relationship may be visually indicated on the user interface screen by directional arrow 336. Table 320 aggregates the data in selected columns of the source table (also referred to as fact columns) based on the values in one or more other selected columns (also referred to as dimensions). The aggregated data is displayed in the form of both a data table and a chart. More detailed examples of analysis tables are provided below.

In the three table relationship operation types described above (copy, summarize and analyze), the source table is the primary source (input table 103) for data in the target table. Two other relationships also can be created between tables, which instead add data from one table to another target table (e.g. a pre-existing table). In this embodiment, the source and target tables are both embodiments of tables 103 input into the data analysis system 100 for providing a resultant table 111. These two relationships are the join relationship and the append relationship provided by the join module 104 and the append module 106.

Join Operation and Append Operation Provided by the Join Module 104 and Append Module 106

The join relationship/operation provided by the join module 104 adds additional columns of data to the target table, by matching values in specific target table columns (known as foreign keys) with values in the source table. In this case, both the target and source tables are embodiments of the table 103. In FIG. 3 there is a join relationship between source table 308 and target table 309, as visually indicated by directional arrow 326. There is also a join relationship between source table 316 and target table 318, as visually indicated by directional arrow 334. The join relationship is dynamic, so that any changes to a foreign key or to the source table will automatically update the corresponding data in the target table. The join operation differs from the traditional relational database join in several respects. A more detailed example of a join relationship provided by the join module 104 is provided below.

The append relationship/operation provided by the append module 110 appends copies of rows from the source table to the end of the target table to create a new resultant table 111 having appended rows from the source table to the target table. In this case, the source and target tables are embodiments of the tables 103. In FIG. 3 there is an append relationship between source table 310 and target table 312, as indicated by arrow 328. This relationship is dynamic, so that any changes to the source table (e.g. 310) will automatically update the corresponding data in the target table (e.g. 312, resultant table 111). A more detailed example of an append relationship is provided below.

According to the illustrated embodiment in FIG. 3, a user is provided with a plurality of functions that allows them to create and manipulate each of the five table types (e.g. copy table, summary table, analysis table, input table, manual table) and five relationship types (e.g. copy, summarize, analyze, join, append) according to the data analysis system 100 of FIG. 1A. For example, the user can create an input table or a source table by selecting a data file outside the data analysis system 100 (e.g. from the computer desktop or file manager), and using the mouse or other importing means to drag it into table workspace 302 on a single user interface display screen. It will be understood that any data file accessible to the data analysis system (directly or indirectly) may be used. This set of functions, in combination with three other capabilities, described below, form a set of functional "building blocks" that allows the user to easily create a fully dynamic data manipulation and analysis system. These three other capabilities include: making corrections; deriving new data using formulas; and refreshing imported data. Detailed examples of these capabilities are provided below.

Copy Relationship/Operation—FIG. 4(A B)

In FIG. 3 there is a copy relationship between source table 306 and target table 307, as indicated by arrow 323 and provided by the copy module 102. FIG. 4A shows the contents of source table 306. This table is an input table (e.g. table 103), so its contents were previously imported from outside the data analysis system 100 and/or data storage 118. Source table 306 has 26 rows of data, and has 5 columns 410, 412, 414, 416 and 418.

Figure 4B:
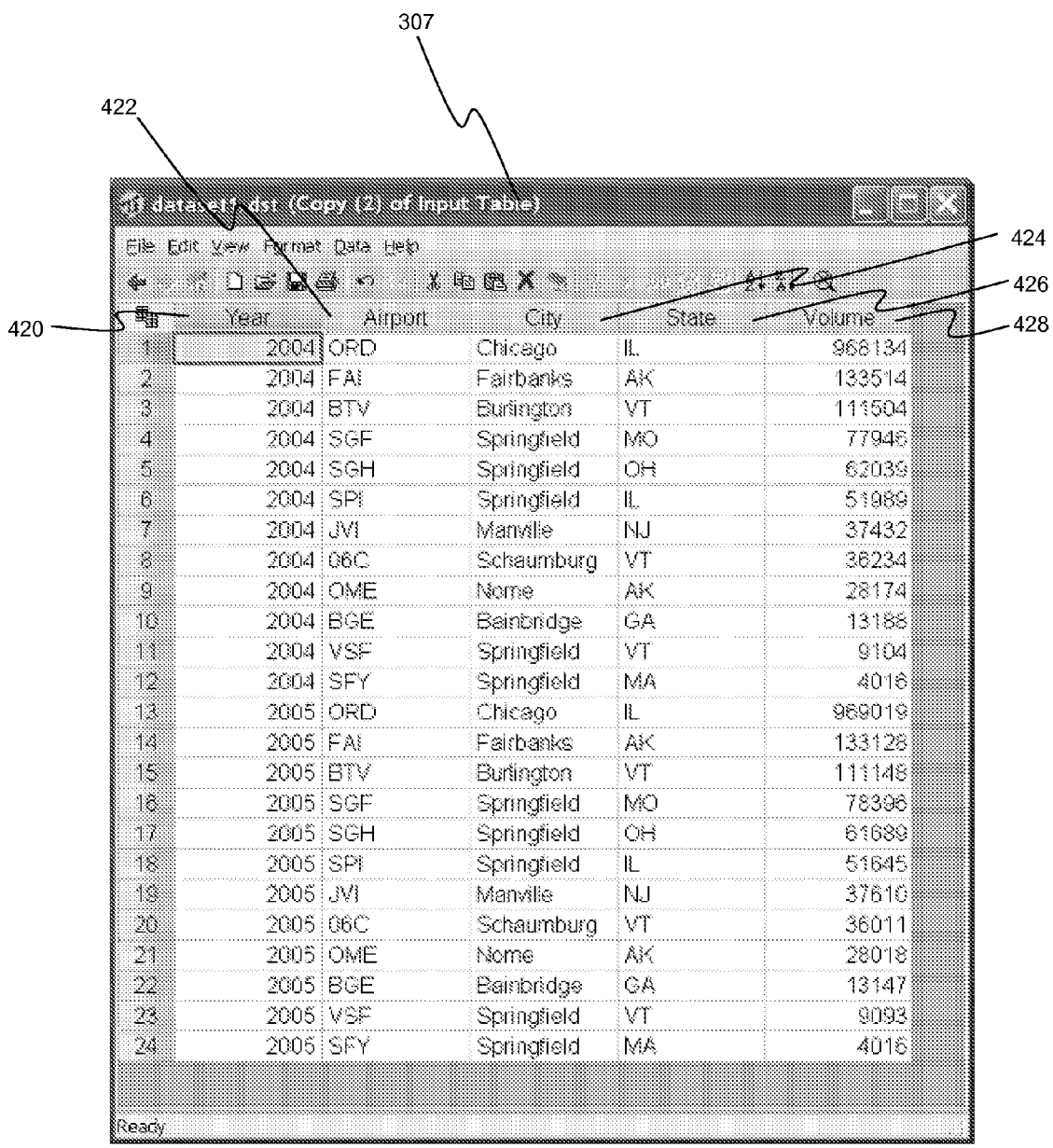

FIG. 4B shows the contents of target table 307 (e.g. resultant table 111), automatically derived from the data in source table 306. The target table has 26 rows, each one of which corresponds uniquely to a row in source table 306. The target table also has 5 columns 420, 422, 424, 426 and 428; these respectively correspond to columns 410, 412, 414, 416 and 418 in source table 306. The data values in the rows and columns of target table 307 match the data values in the corresponding rows and columns of source table 306. In addition, the column names (e.g. Year, Airport . . . ) in target table 307 match the column names in source table 306. As described earlier, the copy relationship between the source and target table 306 and 307 is dynamic, so if any data in source table 306 (e.g. the table 103) is subsequently changed, then the corresponding data in target table 307 (e.g. the resultant table 111) will automatically change to match.

In one aspect, the rows and columns in the target table 307 are initially ordered the same as the corresponding rows and columns in the source table. If rows or columns are subsequently reordered in either the source table or the target table, the rows and columns of the two tables will retain their original association. For example, if a row in the source table is moved to a different position, it will continue to correspond to the same target table row as before the move (e.g. the content of the target table row the same as the content of the associated source table row), although the two rows will be in different positions.

If rows or columns are subsequently deleted from the source table, then the corresponding rows or columns will be automatically deleted from the target table.

If new rows or columns are subsequently added to the source table, then corresponding new rows or columns will be automatically added to the target table, with matching data values.

In one aspect, the data and related information (e.g. modifications to the data such as additions or deletions) flows from the source table to the target table. In this case, changes made directly to the target table have no effect on the source table.

Join Relationship/Operation—FIG. 5(A C)

Figures 5A, 5B:
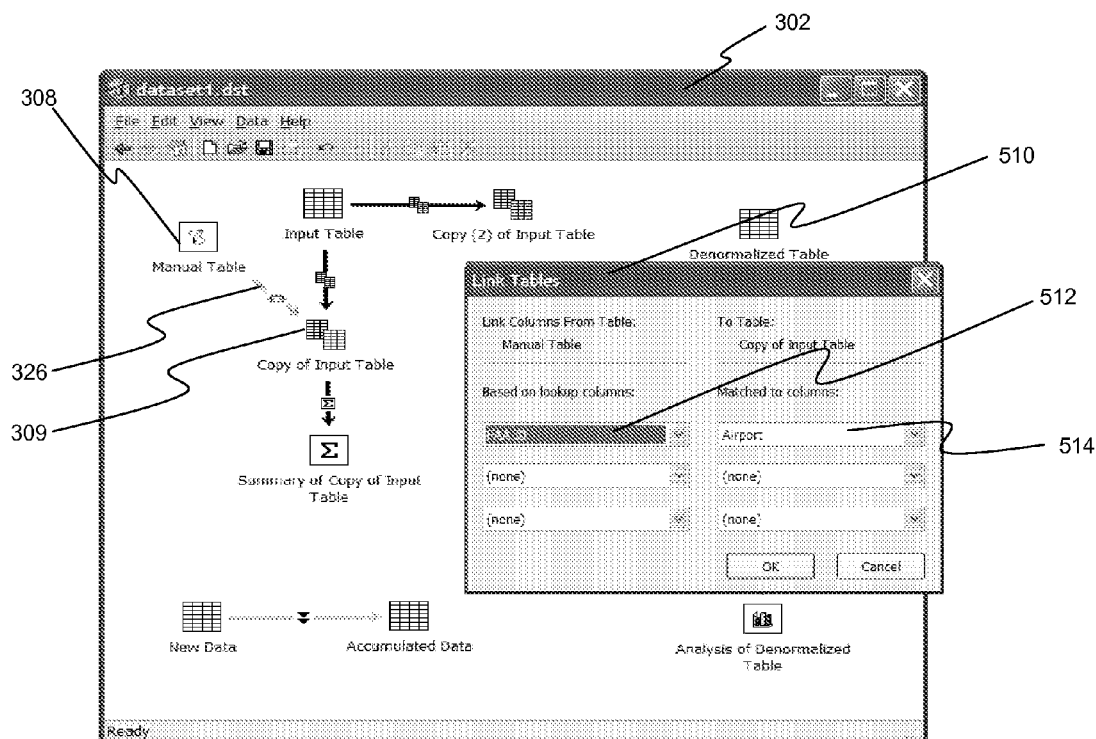
FIGS. 5A-5C illustrate exemplary tables and input parameters of the join module of FIG. 1A.

In FIG. 3 there is a join relationship between source table 308 and target table 309, as indicated by arrow 326 and provided by the join module 104. FIG. 5A shows the contents of source table 308 (e.g. table 103) used in the join operation. The source table 308 has two columns, column "FAA ID" 502 and column "Runways" 504, with 13 rows. In this example, each row contains a unique value for column "FAA ID" 502 except for the last two rows 505 and 506; both rows contain the value "VSF" for "FAA ID". For column "Runways" 504, row 505 contains the value "1" (in cell 507), and row 506 contains the value "2" (in cell 508). Since there is more than one value for "Runways" when the "Airport=VSF", the system allows user input to select the desired value for "Runways". As will be described below in reference to FIG. 5C, the resultant join table 309 (e.g. resultant table 111), allows the user to select the desired value of Runways" when the "Airport=VSF".

Further, the data analysis system 100 allows the user to define the join relationship between two or more tables (e.g. via a link table user interface (S10). For example, if the user double-clicks arrow 326 in FIG. 3, a window 510 appears over table workspace 302 as shown in FIG. 5B. On the left side of window 510, the user can select one or more columns from source table 308. On the right side of window 510, the user selects the same number of columns from target table 309. In this example, the user has selected column "FAA ID" for the source table, and column "Airport" for the target table (selections 512 and 514 respectively within window 510). These columns, referred to as join keys, are used to control the join relationship between the source table 308 and target table 309.

Figure 5C:
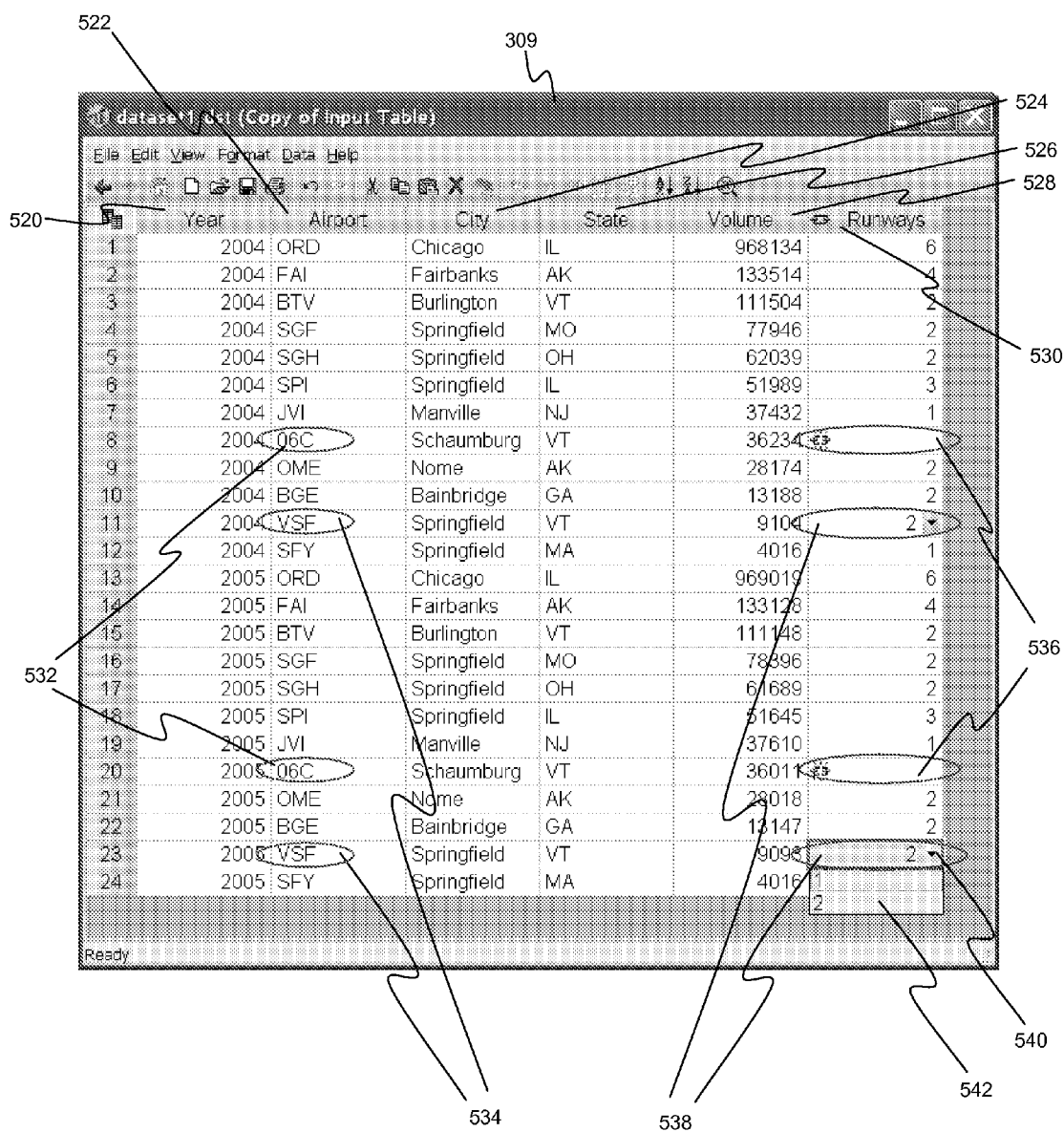

FIG. 5C shows the contents of target table 309. As illustrated in FIG. 3, a table may have one or more relationships with one or more other tables. For example, in addition to the join relationship, table 309 has a copy relationship with table 306; table 309 thus contains an identical copy of the data of rows and columns from table 306. The first 5 columns 520, 522, 524, 526 and 528 in table 309 therefore match the 5 columns 410, 412, 414, 416 and 418 in table 306.

As a result of the join relationship, another column "Runways" 530 also appears in target table 309 (e.g. now resultant table 111). This column contains values dynamically copied from column "Runways" 504 in join source table 308. For each row in target table 309, the join module 104 takes the value in column "Airport" 522; it then finds a corresponding row in source table 308 with a matching value in column "FAA ID" 502. The value in that row for column "Runways" 504 is then copied to column "Runways" 530 in the corresponding target table row.

In target table 309, there are two instances 532 with a value of "06C" in column "Airport" 522. However, there are no rows in join source table 308 with the value "06C" in column "FAA ID" 502. As a result, no value for column "Runways" 530 is displayed in corresponding cells 536. Instead an icon is displayed in the cells (e.g. 536), which indicates to the user that data for that specific row could not be joined because a matching row (e.g. where an instance of at least one column in the source table matched an instance of a corresponding column in the target table) was not found. The user can then choose to remedy the problem by (1) adding a new row to the join source table with a value "06C" in column "FAA ID" 502; (2) changing the values in cells 532 to a value other than "06C"; or (3) manually entering values for column "Runways" 530 directly into cells 536. Alternatively, the user can choose to leave cells 536 blank instead.

In target table 309, there are two instances 534 with a value of "VSF" for column "Airport" 522. As previously noted, join source table 308 contains two matching rows with the value "VSF" in column "FAA ID" 502. The first matching row has a value of "1" for column "Runways" 504, while the second matching row has a value of "2". In such situations, the join module 104 selects a single row to be used as a source of data. In this example, the join module 104 has selected the second matching row to be used to join values to target table 309. Therefore the value "2" is used for column "Runways" 530 in the two cells 538. For example, the data analysis system may be configured that if it finds more than one matching row in the join source table, it will select the last such row encountered.

An indicator such as a down-arrow icon also appears in each of the cells 538. This indicates to the user that more than one value was found for column "Runways" 530 corresponding to the value "VSF" for column "Airport" 522. The user can use the mouse to click down-arrow icon 540. The application then displays menu 542, which contains both of the values "1" and "2". The user can select either of these values to be used instead of the default value.

In this example, only one column from the source table was conjoined to the target table. In general, all columns in the join source table will be joined to the target table, except for any columns used as a join key. The join key columns are not added to the target table, because the target table's join key columns already contain the appropriate values.

As described earlier, the join relationship is dynamic. If any changes are made to the join key in either the source table or the target table, or if the data in the columns being joined is changed, then the contents of the target table will automatically be updated appropriately. If any joined columns are deleted from the source table, the corresponding columns in the target table will be automatically deleted. If any columns are subsequently added to the source table, then corresponding new columns will be joined to the target table automatically.

If join columns are reordered in either the source table or the target table, this has no effect on the correspondence between columns in the two tables. Each source table column will correspond to the same target table column as before.

Data and related information (e.g. info regarding changes to the data) flows from the source table to the target table only. Any changes made directly to the target table have no effect on the source table.

Append Relationship—FIG. 6(A B)

Figure 6A:
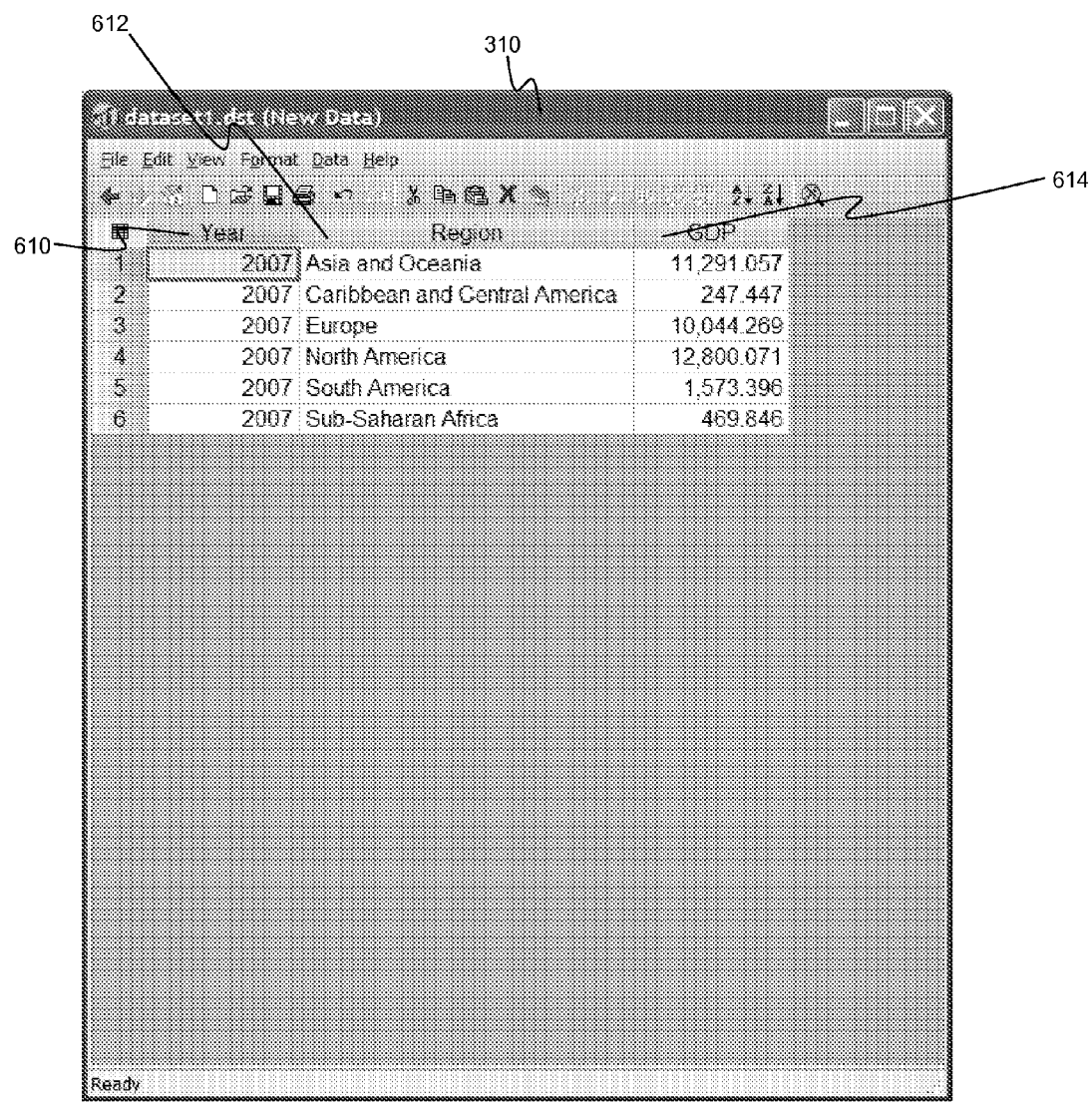

In FIG. 3 there is an append relationship between source table 310 and target table 312, as indicated by arrow 328 as provided by the append module 106. FIG. 6A shows the contents of append source table 310. The source table 310 (e.g. table 103) has 6 rows of data and has 3 columns 610, 612 and 614. FIG. 6B shows the contents of target table 312 once the rows of source table 310 have been appended to result in resultant target table 312 (e.g. resultant table 111). The resultant target table 312 has 24 rows of data and has 5 columns 620, 622 and 624. The target table 312 is an input table (prior to the append operation); the first 18 rows of the table contain data previously imported into the data analysis system (e.g. target table 312). The last 6 rows of the table contain data dynamically copied from append source table 310. The copied rows are indicated as 630. Values in the first source column 610 are copied to the first target column 620; values in the second source column 612 are copied to the second target column 622; and values in the third source column 614 are copied to the third target column 624. The append relationship is dynamic, so if any data values in source table 310 are subsequently changed, then the corresponding data values in target table 312 will automatically change to match.

In target table 312, the appended rows are initially positioned at the bottom of the table, and are initially ordered the same as the corresponding rows in source table 310. The user can subsequently reorder the rows in either the source table or the target table. The appended rows in the target table do not need to remain consecutive; the user can reorder all the rows in the target table arbitrarily. If rows are reordered in either the source table or the target table, the rows of the two tables will retain their original correspondence. For example, if a row in the target table is moved to a different position, it will continue to correspond to the same source table row as before.

If new rows are subsequently added to the source table, then corresponding new rows will be automatically appended to the target table. If rows are subsequently deleted from the source table, then the corresponding appended rows will be automatically deleted from the target table.

For example, values in the $n^{th}$ source column are appended to the $n^{th}$ target column (e.g. forming new rows in the target table). If columns are reordered in either the source table or the target table, then the correspondence between the two tables' columns will automatically change. The values in the new $n^{th}$ source column will now be copied to the new $n^{th}$ target column. Thus, unlike rows, the columns in the source table always correspond sequentially to the columns in the target table, based on the order of the columns. This allows the user to change the correspondence between the columns simply by changing the order of the columns in either table.

Unlike rows, if columns are subsequently added or deleted in either the source table or the target table, then the correspondence between the two tables' (e.g. source & target) columns will automatically change so that columns in the two tables (e.g. source & target) continue to correspond sequentially.

If the append source table (e.g. table 103) has fewer columns than the target table, then the corresponding columns in the target table will be blank. If the append source table has more columns than the target table, then the appropriate number of extra blank columns will be added to the target table before appending.

According to one embodiment, information flows from the source table to the target table only. Any changes made directly to the target table have no effect on the source table.

Summary Relationship/Operation—FIGS. 7(A D), 8

Figures 7A, 7B:
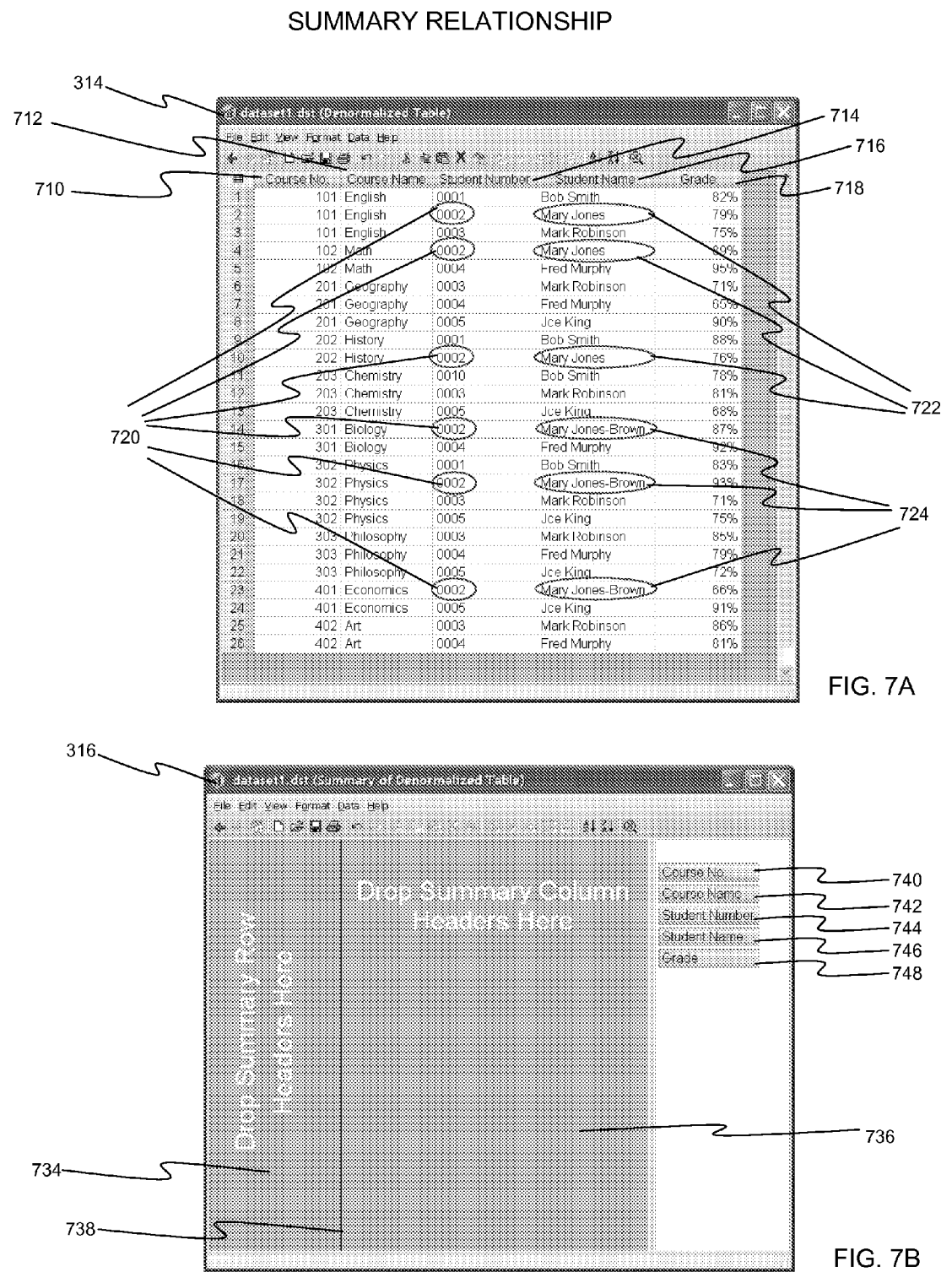
Figure 7C:
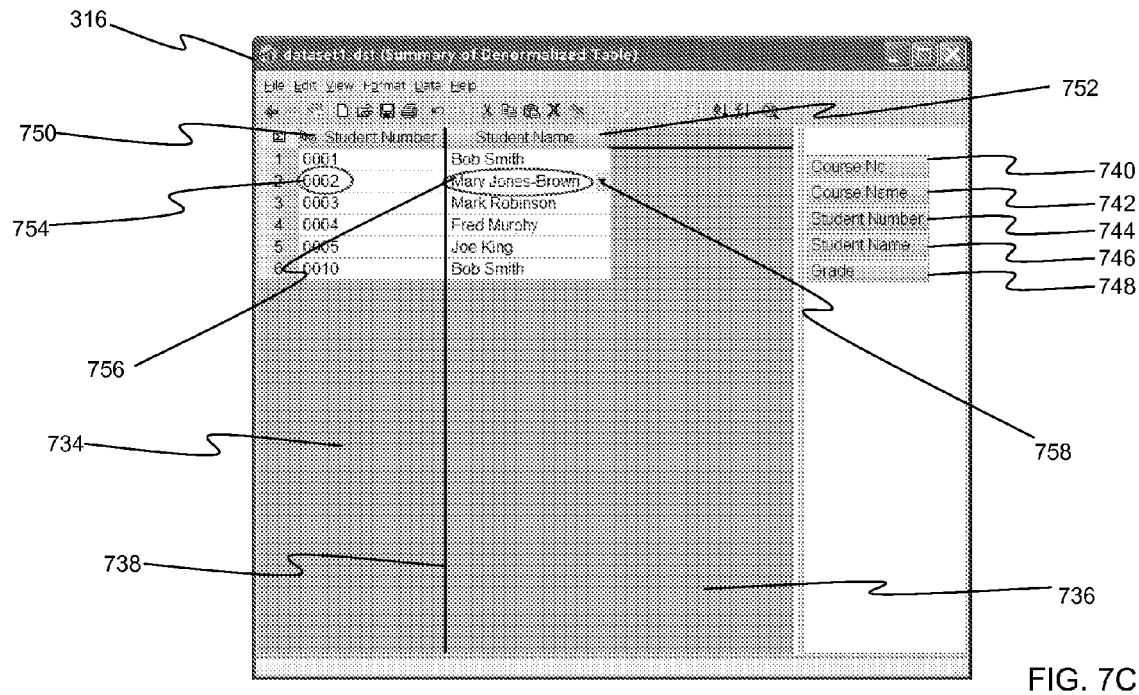
Figure 7D:
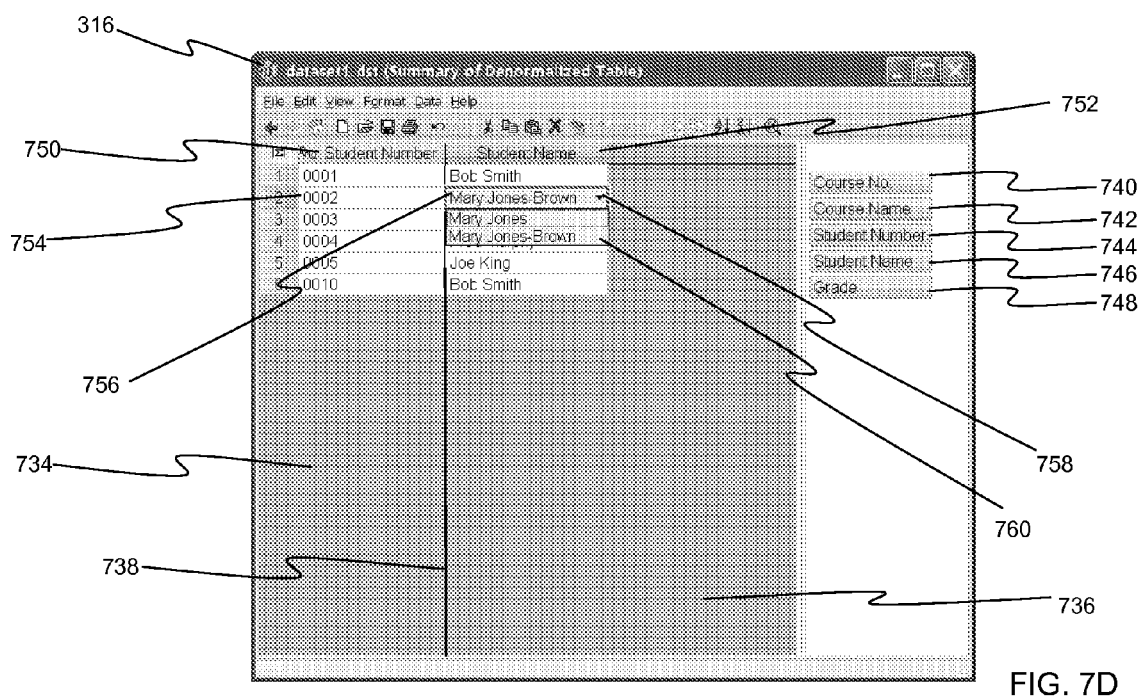

FIGS. 7A, 7B, 7C and 7D illustrate the operation of a summary table provided by the summary module 108 in detail. The data in table 314 (e.g. table 103), as shown in FIG. 7A, contains redundancies. For example, every row having a value of "101" in column "Course No." 710, also has a value of "English" in column "Course Name" 712; every row having a value of "102" in column "Course No." 710, also has a value of "Math" in column "Course Name" 712; and in general, for each unique value found in column "Course No." 710, every row having that value also has the same specific corresponding value in column "Course Name" 712 (e.g. implying that either the "Course Name" 712 or the "Course No." may be sufficient in identifying the course).

Therefore, information is repeated multiple times in table 314. The information that Course No. "101" corresponds to Course Name "English" is specified three times, on three different rows; the information that Course No. "102" corresponds to Course Name "Math" is specified two times, on two different rows; and so on. Because of this redundant information, the data in table 314 is considered denormalized.

Similarly, the data in column "Student Number" 714 and column "Student Name" 716 also contains redundancies. In almost all cases, each unique value for Student Number corresponds to a single specific value for Student Name (e.g. a one-to-one relationship). However, for Student Number "0002" the value for Student Name is not consistent. There are six instances 720 where the Student Number is "0002". The corresponding value for Student Name is "Mary Jones" in three instances 722, and is "Mary Jones Brown" in three instances 724. Because of these exceptions, this data is considered inconsistent denormalized data. Accordingly, as will be described below, the summary module 108 provides a resultant output table 111 (e.g. FIG. 7C) which allows user selection of the desired value for the "Student Name" and other values in order to normalize the table.

In one case, it is desirable to normalize the Student Number and Student Name data in table 314, by producing a separate, normalized table that contains only those columns. This normalized table should contain one row for each unique value of Student Number, with a single corresponding value for Student Name.

FIG. 7B shows the contents of summary table 316 (e.g. resultant table 111), which uses table 314 as its source table (e.g. table 103). As initially created, summary table 316 is empty with no rows or columns present. The empty table display area is divided into two regions 734 and 736, separated by a vertical divider line 738. Also present is a separate area that contains column headers 740, 742, 744, 746 and 748. These column headers correspond respectively to columns 710, 712, 714, 716 and 718 in source table 314. The column headers can be dragged using the mouse and dropped into regions 734 and 736.

FIG. 7C shows the display of the contents of summary table 316, after the user has dropped column header "Student Number" 744 into region 734, to the left of divider line 738 (e.g. to define a key column), and has dropped column header "Student Name" 746 into region 736, to the right of divider line 738 (e.g. to define summarization column). As a result, the table now contains column "Student Number" 750 in region 734, and column "Student Name" 752 in region 736.

Because column "Student Number" 750 is in region 734 to the left of divider line 738, it is designated as a "key column" for summary table 316. This specifies that the summary module 108 should generate one row in summary table 316, for each unique value in column "Student Number" 714 in source table 314. Therefore the summary module 108 has generated five rows for summary table 316. Each row corresponds to one of the five unique values for column "Student Number" 714 present within source table 314. This unique value is contained in column "Student Number" 750 for each row.

Because column "Student Name" 752 is in region 734 to the right of divider line 738, it is designated as a "summarized column". This specifies that the summary module 108 should display a single value for Student Name on each row, to correspond with the Student Number for that row. If source table 314 consistently contains the same value for Student Name on all rows with that Student Number, then that is the value used in summary table 316. If a row in summary table 316 contains a Student Number that has multiple inconsistent corresponding values for Student Name in source table 314, then the summary module 108 will select one of these multiple values to be used in summary table 316. The selection of such a data value or data item may be based on a predetermined aggregation rule. Each selection rule for selecting an aggregate data value or item may be based on selecting a single value among multiple existing values. For example, the default selection rule may be to use the value that appears last in the source table. The user can choose to use a different selection rule for a summarized column, e.g. use the value which appears first; use the value most commonly found; use the lowest or highest alphabetically, etc. Alternatively, if a summarized column contains numeric data, the user can choose instead to use a mathematical aggregation rule instead of a selection rule to combine multiple numeric values, e.g. sum, average, count, min, max, mean, standard deviation, variance, etc.

As noted above, for all values of Student Number except "0002", source table 314 contains a consistent unique value for Student Name (see FIG. 7A). Therefore this value appears in column "Student Name" 752 in summary table 316, in the same row with the corresponding value for Student Number.

For Student Number "0002", source table 314 does not contain a consistent unique value for Student Name; some rows contain "Mary Jones" and some contain "Mary Jones Brown". As default, the data analysis system has selected the value "Mary Jones Brown" to be used in summary table 316. This value was selected because it appears last within source table 314.

Therefore the data in summary table 316 now contains the same information as source table 314 regarding Student Number and Student Name, except that the data is now in the desired consistent normalized form, with a single value for Student Name corresponding to each Student Number.

In summary table 316, the displayed value 756 for Student Name "Mary Jones Brown" has a down-arrow icon 758 to its right. This indicates to the user that inconsistent values for Student Name were found in source table 314 for the corresponding Student Number "0002", and that the summary module 108 has automatically selected the Student Name "Mary Jones Brown" to be used.

The user can then select the desired value for "Student Name" when "Student Number=0002". For example, the user can use the mouse to click the down-arrow icon 758. As shown in FIG. 6D, The application then displays menu 763, which contains both of the values "Mary Jones" and "Mary Jones Brown". The user can select either of these values to be used for displayed value 756. The selected value is then used (e.g. as a representative value) instead of the default value.

Figure 8:
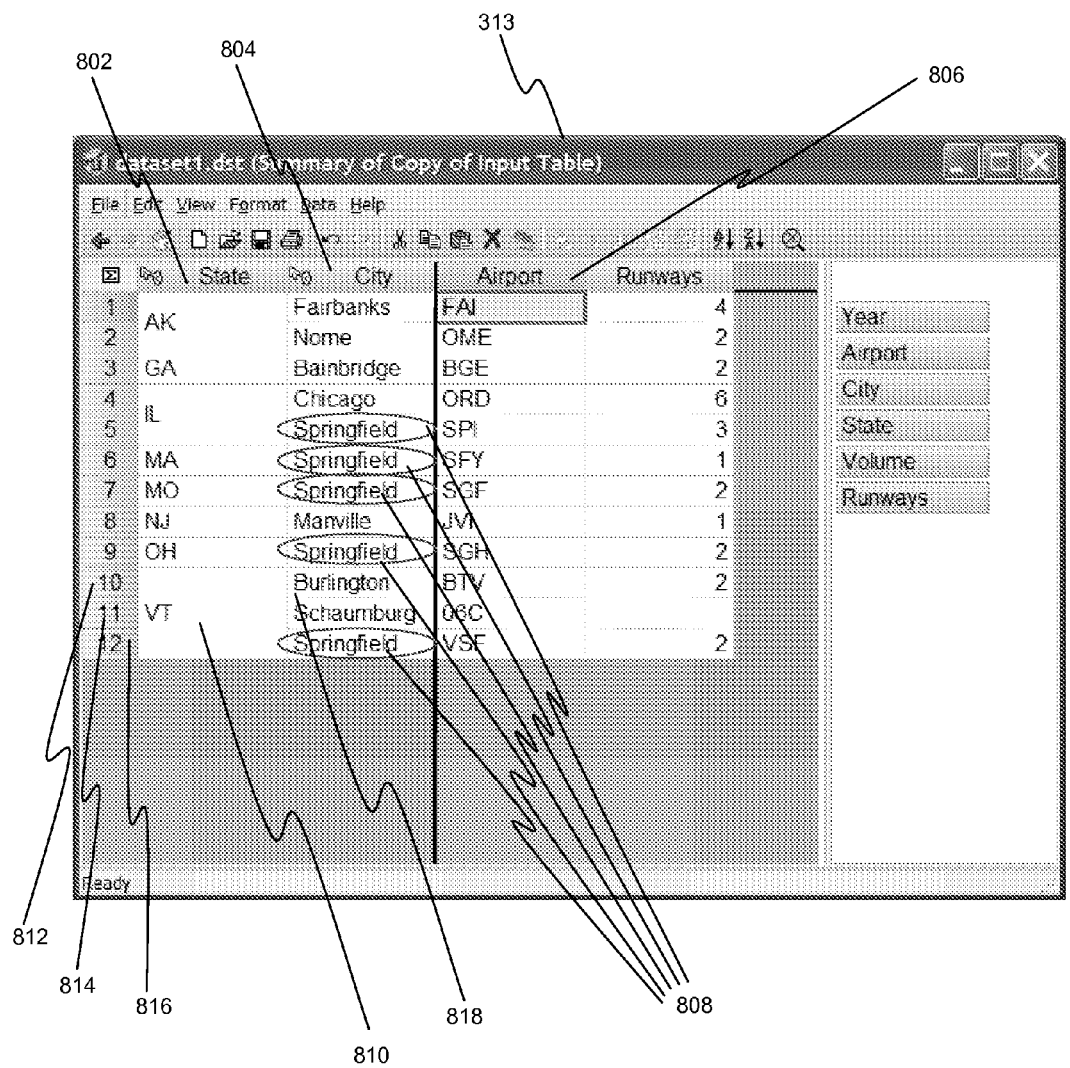
FIG. 8 illustrates an exemplary output summarized resultant table having a number of key columns.

Referring now to FIG. 8, a summary table (e.g. resultant summary table 111) may have more than one key column as provided by the summary module 108. FIG. 8 shows the contents of summary table 313, which has a summary relationship with source table 309. (The contents of table 309 were shown previously in FIG. 5C.) Summary table 313 in FIG. 8 has two key columns, column "State" 802 and column "City" 804. These two columns correspond to columns 526 and 524 of the same names in source table 309.

Column "State" 802 contains cells that span multiple rows. For example, cell 810, containing the value "VT", spans three rows 812, 814 and 816. This indicates to the user that all three of these rows contain the same value for column "State" 802. Summary table 313 thus provides groups of rows, where each group has the same value in all rows for one column (e.g. "State" 802), and each group's individual rows have different values for a second other column (e.g. "City" 804).

Any cell in a key column is designated as a "header cell". For example, cell 810 containing "VT" is a header cell for the group of rows 812, 814 and 816. Cell 818 is a header cell for row 812 only. Cell 810 is considered to be a "higher-level" header cell than cell 818, because it is further to the left and therefore has a scope which is more inclusive. Headers at the lowest level always apply to single rows only.

As described earlier, the summary relationship is dynamic. If any data is added or changes are made to the source table (e.g. table 103), the data in summary table (e.g. resultant table 111) will be automatically updated appropriately. Changing or adding data to the source table can result in header cells and their groups being automatically added to or deleted from the summary table. If a row is added for which a higher level header cell already exists, then a lower-level header cell will be created within the existing higher-level header. If a row is added for which a higher level header cell does not exist, then a higher-level header will be added. If the pre-existing headers are sorted, then new headers will be inserted into the sort sequence appropriately. If the pre-existing headers are not sorted, then new headers will be inserted at the end of the appropriate higher-level grouping.

In one embodiment, information (e.g. data and data related information such as modifications to the data) flows from the source table to the summary table only. Any changes made directly to the summary table have no effect on the source table.

Analysis Relationship—FIGS. 9(A C), 10

FIGS. 9A, 9B and 9C illustrate the operation of an analysis table (e.g. resultant analysis table 111) as provided by the analysis module 106 in detail. An analysis table provides functionality very similar to that of a summary table, with additional functionality of providing a graphical analysis of the data on the display 114 as described in the examples below.

FIG. 9A shows the contents of analysis table 320, which uses table 318 as its source table (e.g. table 103). As initially created, analysis table 320 is empty with no rows or columns present. The empty table display area is divided into two regions 912 and 914, separated by a vertical divider line 916. Also present is a separate area that contains column headers 902, 904, 906, 908 and 910. These column headers correspond to columns in source table 318. The column headers can be selected (e.g. by using the mouse to drag the header and drop into regions 912 and 914).

FIG. 9B shows the display of the contents of analysis table 320, after the user has dropped column header "Course Name" 904 into region 912, to the left of divider line 916 (e.g. to define key columns), and has dropped column header "Grade" 910 into region 914, to the right of divider line 916 (to define columns for summarization and/or analysis). In addition, the user has specified that the column header "Grade" 910 is to be aggregated using "average". As a result, the table now contains two columns: column "Course Name" 918, which is a key column, in region 912; and column "Avg Grade" 920, which is a summarized column, in region 914. Column "Course Name" 918 contains the different unique values for Course Name found in the source table. Column "Avg Grade" 920 contains the average value of Grade for the corresponding Course Name.

Unlike a summary table, an analysis table (e.g. resultant table 111) will by default perform arithmetic aggregation in a summarized column, rather than select a single summarization value from the source table. If the values to be aggregated are predominantly numeric, then the default aggregation is "sum". If the values to be aggregated are not predominantly numeric, then the default aggregation is "count".

Also present in FIG. 9B is total row 922. This row displays vertical totals for each summarized column in the table. In the case of summarized column "Avg Grade" 920 which is aggregated using "average", the total row will display the overall average.

Also present in FIG. 9B is chart 924, an additional capability of the analysis table via the analysis module 110. The chart automatically displays a representation of the current data in the analysis table. The user is provided functions to change the type of chart displayed or to select subsets of data to be charted.

Another capability of the analysis module 110 is to summarize values horizontally as well as vertically (e.g. for each row and column). In FIG. 9B the user has used the mouse to select column header "Student Number" 906 and drag it to a position 926 above column "Avg Grade" 920. This results in a table as displayed as in FIG. 9C. Column "Avg Grade" 920 has been replicated horizontally 6 times. Above the replicated columns 920 is row of labels 928 showing the different unique values for "Student Number" found in the source table, followed by the label "TOTAL". Across the top of these labels is a horizontal column group header 926 labeled "Student Number". This indicates that each replicated column 920 contains average grades by course for the Student Number specified in the label 928 above, with the last column containing overall course averages.

An analysis table can contain any number of replicated column sets as in FIG. 9C, along with any number of individual summarized columns as in FIG. 9B, arranged horizontally across the table.

Similar to the summary table, an analysis table can have more than one key column.

Figure 10:
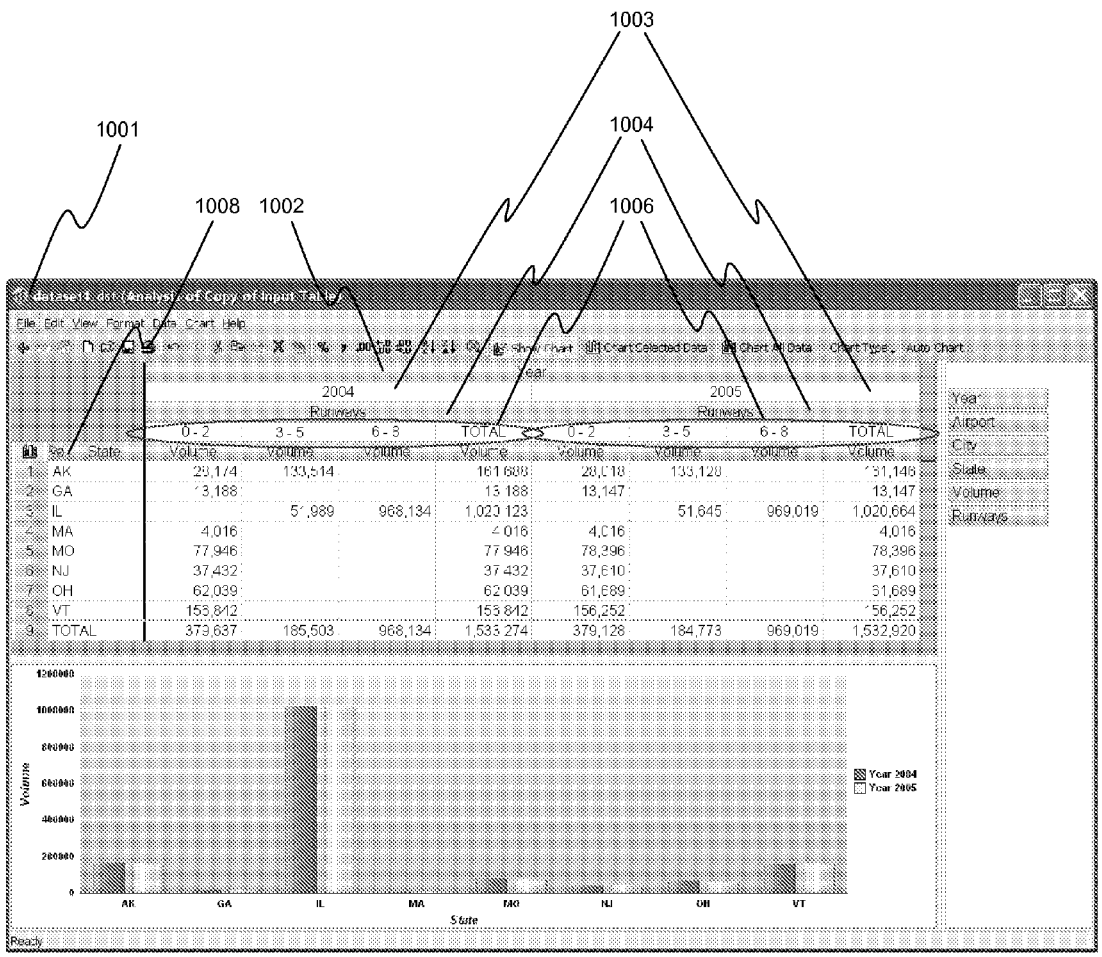

A replicated column set as in FIG. 9C can have multiple horizontal group headers 926 stacked vertically. This is similar to having multiple key columns, but is arranged horizontally instead of vertically. FIG. 10 shows an example of an analysis table 1001 with multiple horizontal group headers. (Note that this example is not one of the tables in FIG. 3, but is based on the data in table 309 as shown in FIG. 5C). Under horizontal group header 1002 labelled "Year", there are two sub grouping headers 1003 labelled "2004" and "2005". Within each of these sub groupings is a horizontal group header 1004 labelled "Runways". Under each group header 1004 is a set of 4 column labels 1006, arranged over 4 columns. Each of the columns contains aggregate values corresponding to the appropriate sub grouping header 1003 and column label 1006, for the corresponding values in key column "State" 1008.

FIG. 10 illustrates another capability of the analysis module 110 not available in a summary table. Below each horizontal group header "Runways" 1004 is a set of column labels 1006 "0-2", "3-5", "6-8" and "TOTAL". This indicates that values are to be aggregated based on ranges of values for "Runways", rather than being based on discrete values. This option is available for any column which contains numeric data. Similarly, data representing dates can be grouped by year, quarter year, month, or day.

An analysis relationship is dynamic. If any changes are made to the source table, then this will cause the immediate update of values in the analysis table appropriately.

In one aspect, in an analysis relationship, information flows from the source table to the target table. Any changes made directly to the target table have no effect on the source table.

Data Corrections—FIGS. 11(A D), 12(A ¬ E), 13(A M), 14(A D) Provided by the Corrections Module 112

There are three significant aspects to the data corrections capabilities: corrections are completely transparent (the user can clearly see what has been corrected and how), reversible (the user can always remove the correction and revert back to the default state) and unrestricted (the user is given the freedom to make any changes desired).

Figures 11A, 11B:
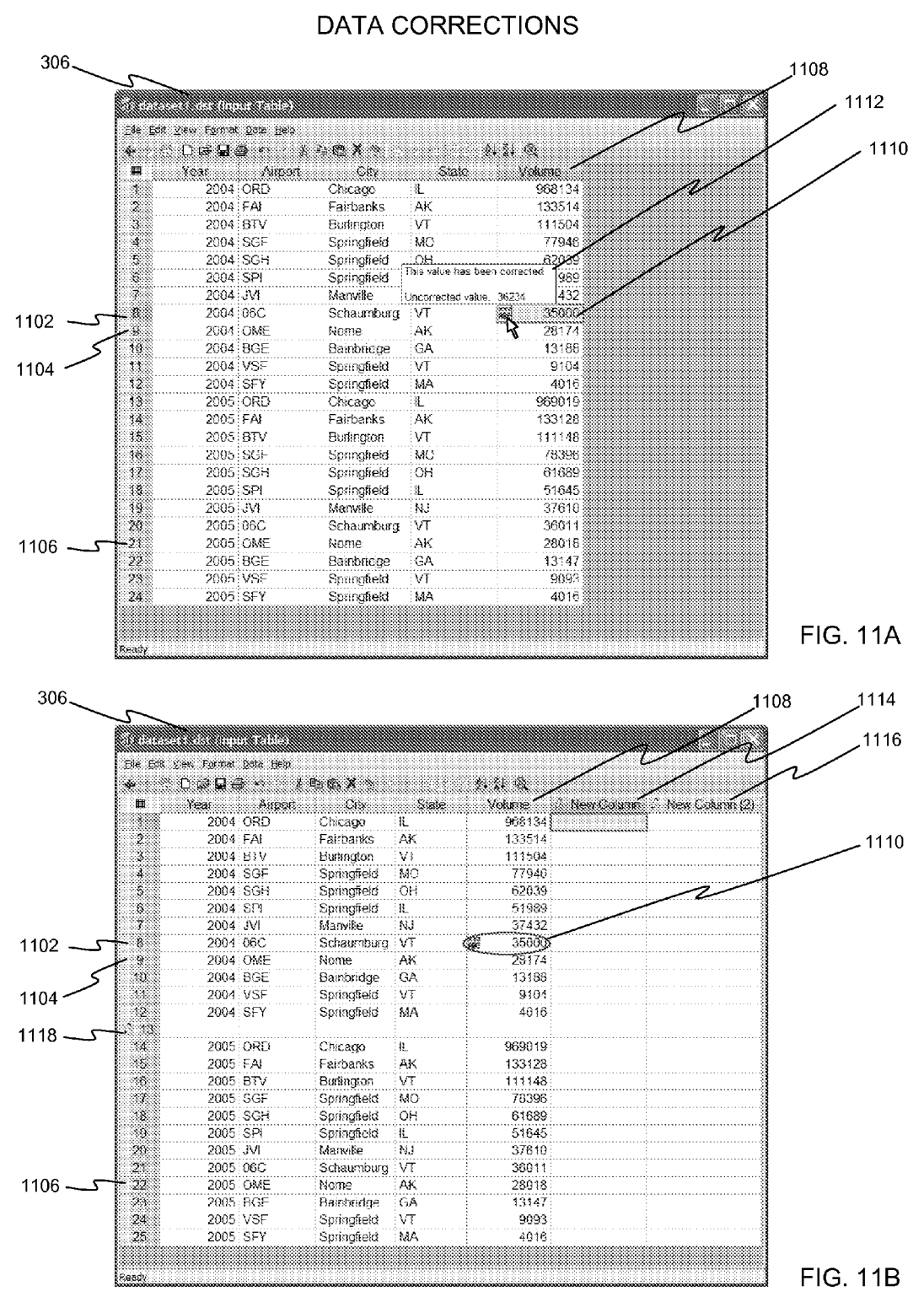

FIG. 11(A-D) illustrate the basic correction capabilities of the corrections module 112. FIG. 11A shows the contents of table 306 from FIG. 3. The user has selected a cell 1110 and then typed the value "35000" to replace the original value "36234". A graphical icon appears in the cell 1110 to visually indicate that the value has been corrected. If the user moves the mouse pointer over the icon, a message 1112 is displayed providing the original value for the cell. A command is available to the user which removes the correction and reverts back to the original value.

FIG. 11B shows the contents of table 306. The user has used commands to insert a new row 1118 and to insert 2 new columns 1114 and 1116. These items are marked with an icon indicating that they were inserted manually.

Figure 11C:
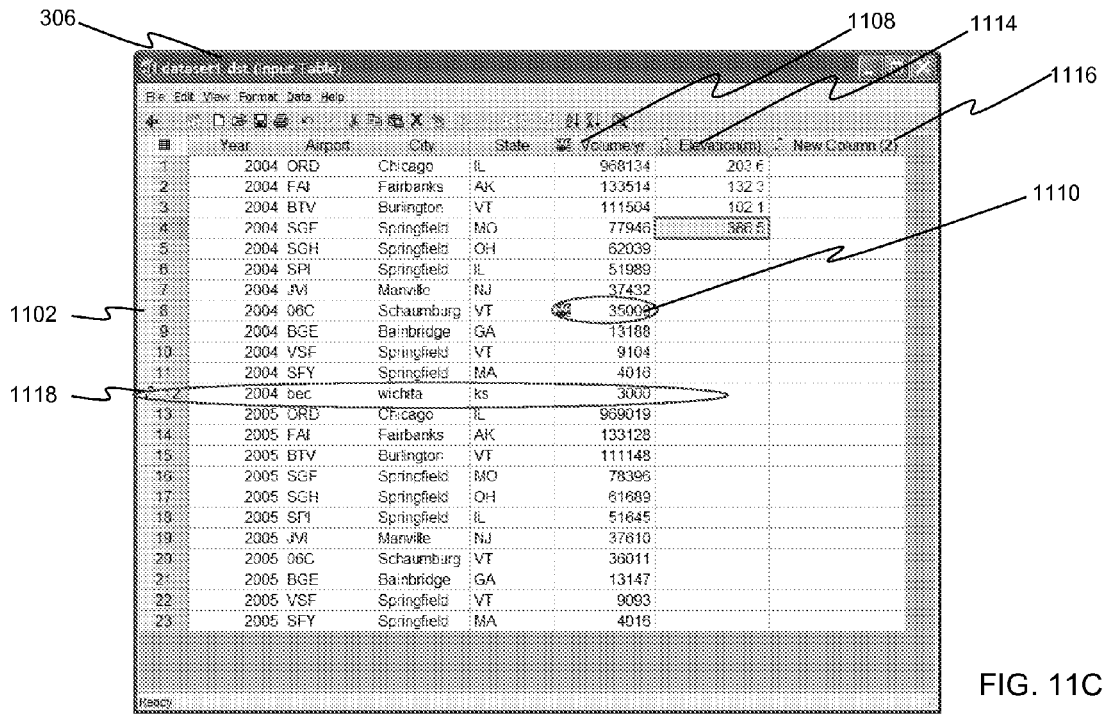

In FIG. 11C the user has made additional corrections to table 306. The user has changed the name of column 1108 from "Volume" to "Volume/yr". The column name has been marked with an icon indicating that the column name has been corrected. As before, the user can place the mouse pointer over the icon to see the original name, and the user can remove the correction if desired.

In general, when the user enters data into manually created items, it is not considered a correction. In FIG. 11C the user has renamed column 1114 from "New Column" to "Elevation (m)". Values have also been entered into the first 5 cells of new row 1118, and the first 4 cells of new column 1114. In these cases, the icon indicating correction is not displayed, because the changed items were manually inserted.

In FIG. 11C the user has also used commands to delete two rows. In FIG. 11C there are 23 rows in table 306; in FIG. 11B there are 25 rows in table 306. FIG. 11B contains two rows 1104 and 1106 which are not present in FIG. 11C.

Figure 11D:
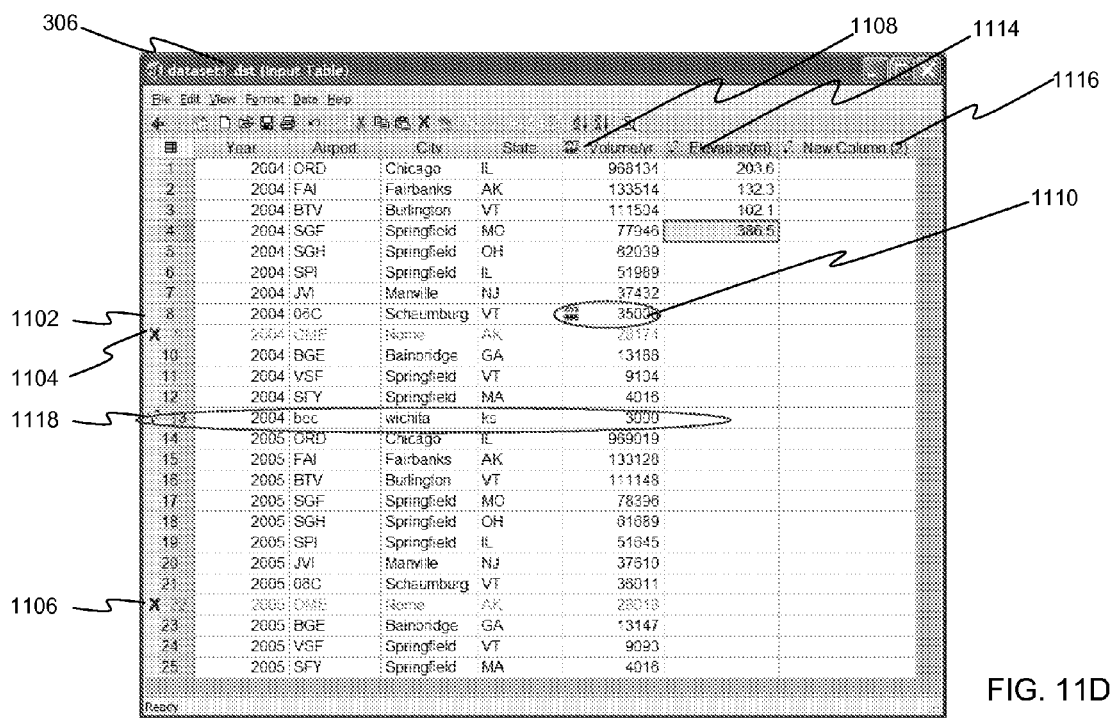

In FIG. 11D the user has selected an option to display deleted items. The two deleted rows 1104 and 1106 are displayed again, but they are marked with icons indicating that they have been deleted. Deleted rows and columns are kept in the table but are generally hidden from the user unless the user chooses to see the deleted items. The deleted items are otherwise treated as if they did not exist. For example, in a copy relationship a deleted row in the source table will not be copied to the target table.

While the user is viewing deleted items, they can view both rows and columns which have been deleted. They can use commands to restore selected deleted items back into the table.

In addition to the basic corrections described above, a summary table or analysis table has additional correction capabilities. This is illustrated in FIG. 12(A-E).

Figure 12A:
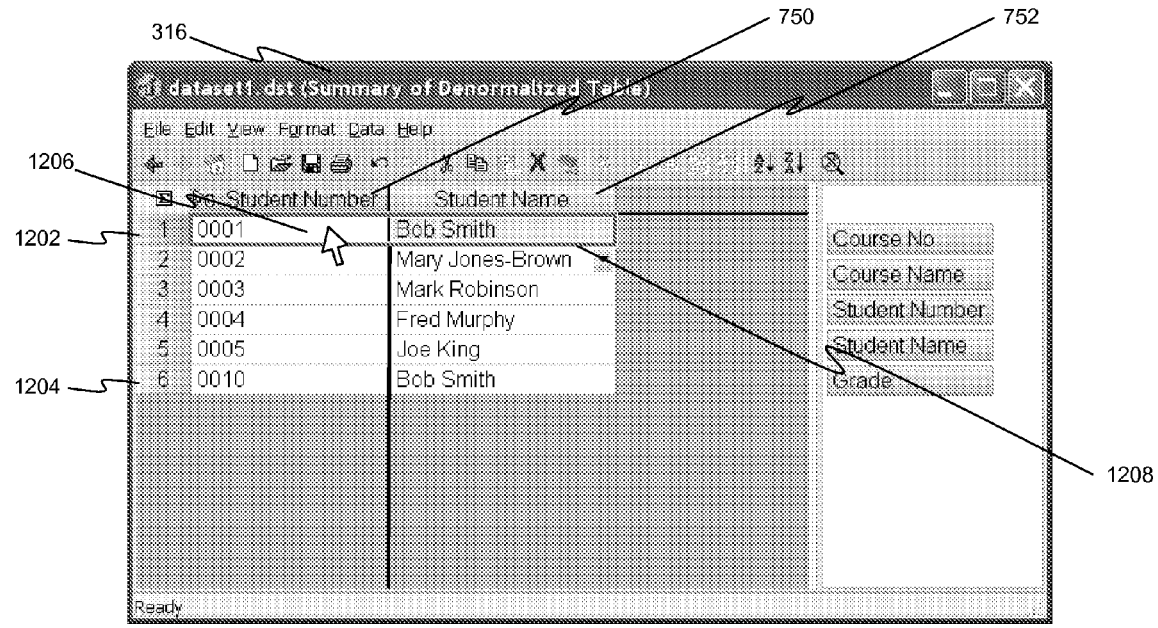

FIG. 12A shows the contents of summary table 316 shown previously. In this example, Bob Smith has been entered in the original data with two different values for Student Number, "0001" and "0010". The summary table contains one row for each unique value of "Student Number", so Student Name "Bob Smith" appears on two different rows 1202 and 1204, but represent the same person.

In FIG. 12A the user has used the mouse to click into cell 1206, which is the header cell for row 1202. This has the result of selecting the entire row 1202 as indicated by a selection outline 1208.

Figure 12B:
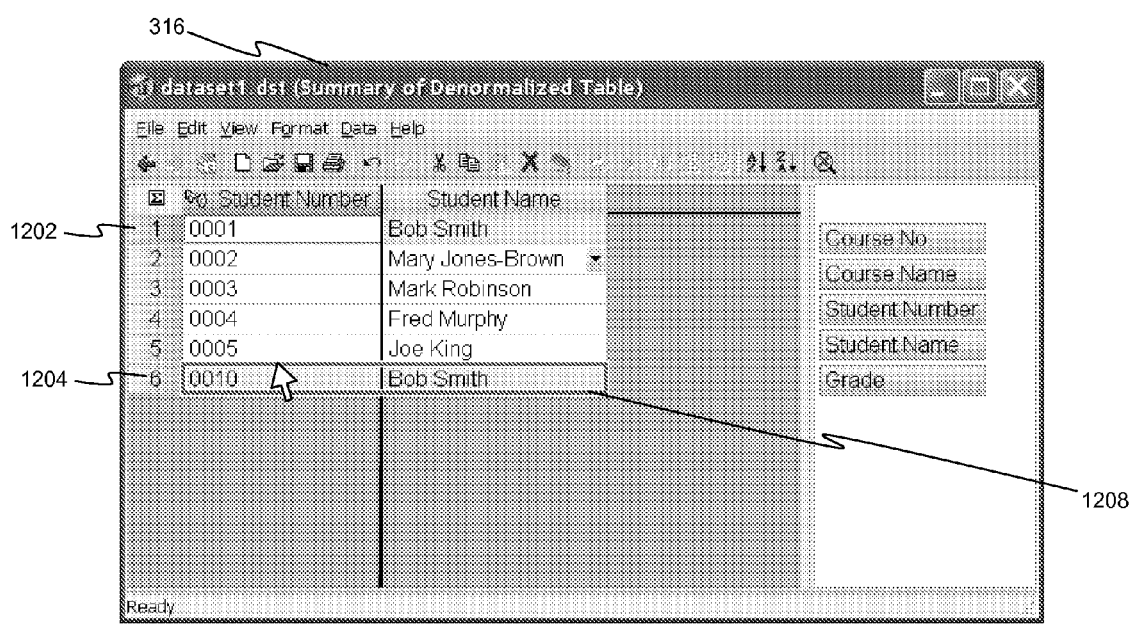

In FIG. 12B the user has used the mouse to drag selection outline 1208 over row 1204.

Figure 12C:
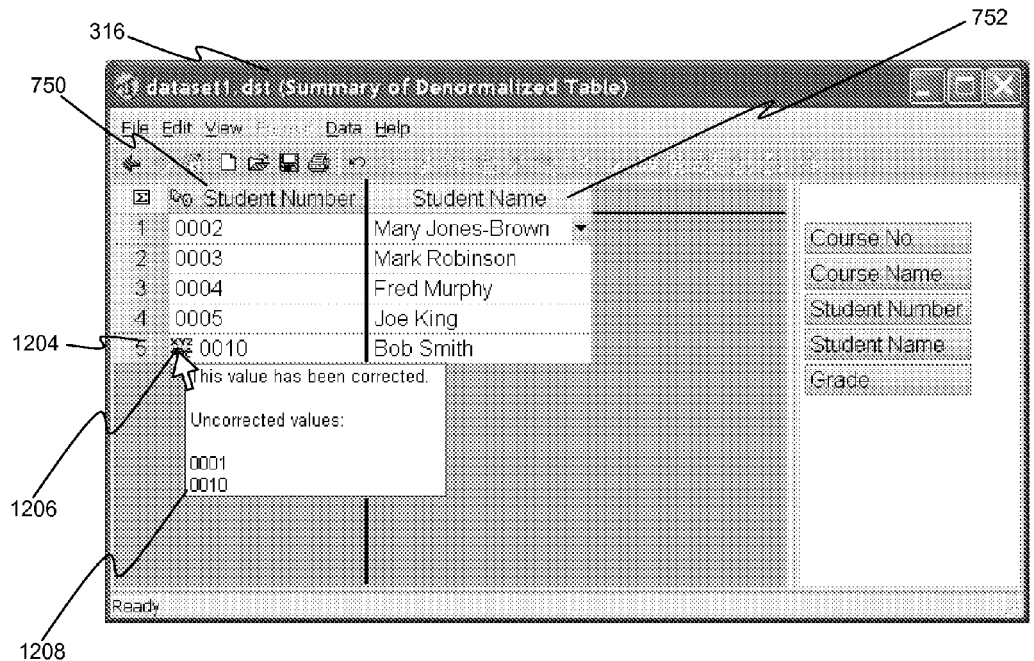

In FIG. 12C when the user releases the mouse, summary table 316 now no longer displays row 1202. Cell 1206 in row 1204 now contains an icon indicating that the item has been corrected. When the user places the mouse pointer over the icon, a message is displayed providing two uncorrected original values for cell 1206. The value "0001" originally was from row 1202, which is now no longer present. The value "0010" originally was from row 1204, and is still displayed in cell 1206. This indicates to the user that items with Student Number "0001" are to be corrected to use Student Number "0010".

Figure 12D:
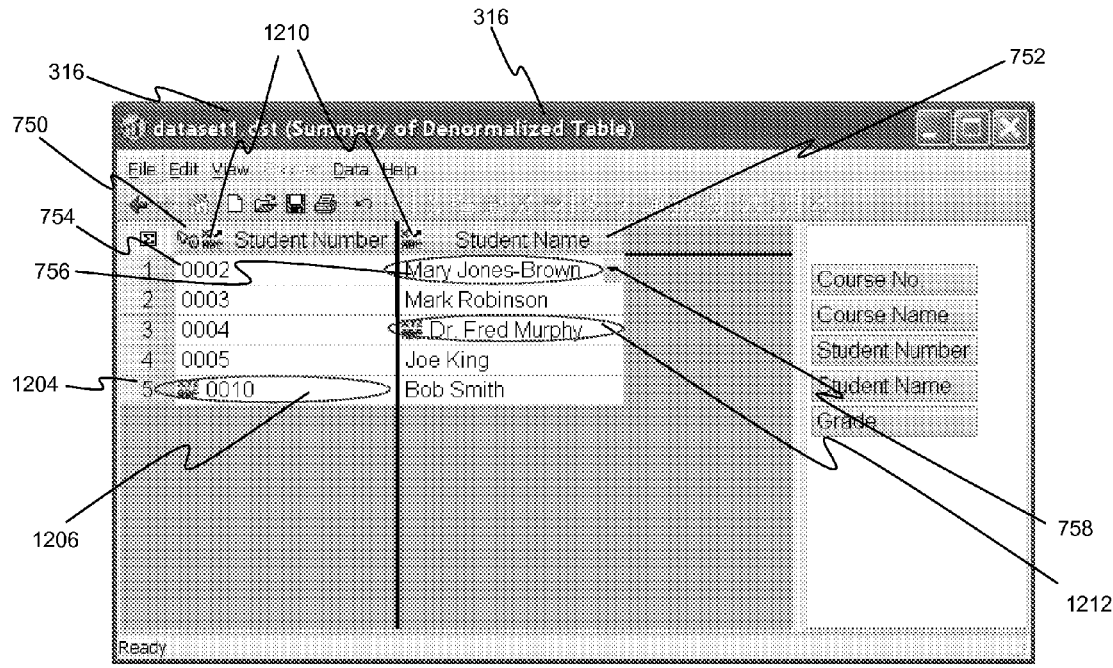

In FIG. 12D an additional correction has been made to summary table 316. The value in cell 1212 has been changed from "Fred Murphy" to "Dr. Fred Murphy". Also, as discussed previously, cell 756 displays a down-arrow icon. This is because the original source data contains two different spellings for this Student Name, "Mary Jones" and "Mary Jones Brown". The value "Mary Jones Brown" has been automatically been selected for cell 756 because it is the value that appears last in the source data.

Also in FIG. 12D the user has selected an option to automatically apply corrections from summary table 316, as indicated by icons 1210. This has the effect of automatically creating copy table 318 as shown previously in FIG. 3. Table 318, referred to as a "corrected copy table", is a copy of input table 314. Input table 314 is also the source table for summary table 316. A join relationship has also automatically been created from summary table 316 to copy table 318, as indicated by arrow 334 on FIG. 3. This join relationship has some special properties as illustrated in FIG. 12E.

FIG. 12E shows the contents of corrected copy table 318. Like its source table 316, the table has 26 rows of data and 5 columns 1260, 1262, 1264, 1266 and 1268, corresponding to 26 rows and 5 columns of the same name in source table 316.

The joined columns 750 and 752 from summary table 316 (FIG. 12D) do not appear directly in corrected copy table 318 (FIG. 12E). However, the two columns "Student Number" 1264 and "Student Name" 1266 contain corrected values obtained from summary table 316. In 4 instances 1270, the value for column "Student Number" 1264 is "0010". In 3 of these instances, the original data in source table 314 is "0001" instead. These values have been changed according to the correction previously made in summary table 316 (FIG. 12C).

In FIG. 12E, there are five instances 1272 where the value for column "Student Name" 1226 is "Dr. Fred Murphy". The original data in source table 314 was "Fred Murphy" instead. These values have been changed according to the correction previously made in summary table 316 (FIG. 12D).

In FIG. 12E, there are 6 instances 1274 where the value for column "Student Name" 1266 is "Mary Jones Brown". In 3 of these instances, the original value in source table was "Mary Jones". In summary table 316, these values were automatically summarized into a single value "Mary Jones Brown". The values in corrected copy table 318 have been changed accordingly. In this case, the user did not need to make any manual correction in summary table 316 at all, because the table automatically summarized the values based on the key column.

Additional handling is preferable if corrections are made to a summary table or an analysis table with more than one key column. To illustrate this, FIGS. 13(A-M) show a sequence of corrections to an analysis table. (This example does not correspond to any of the tables shown previously in FIG. 3).

Figure 13B:
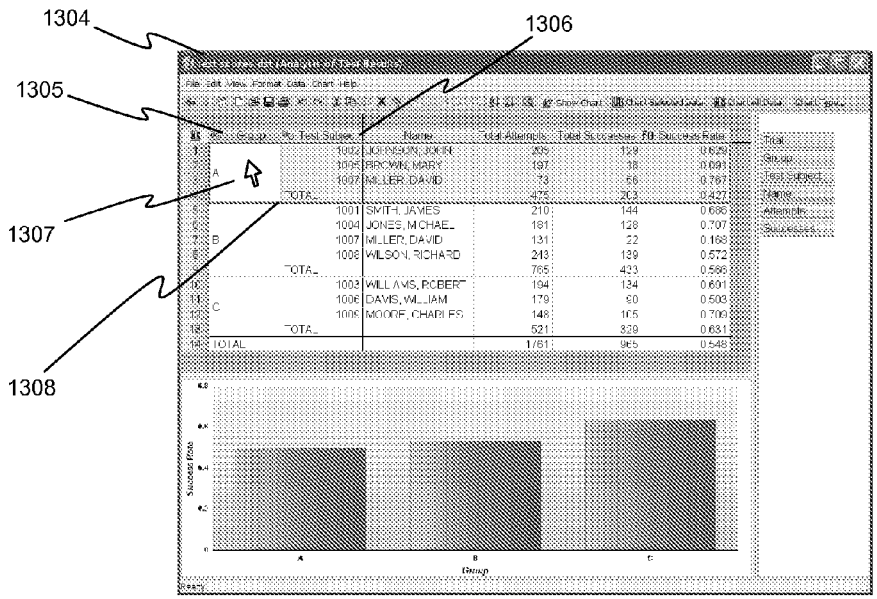

FIG. 13A shows the contents of source table 1302, and FIG. 13B shows the contents of analysis table 1304 using table 1302 as its source table. The user has specified two key columns, column "Group" 1305 and column "Test Subject" 1306. Analysis table 1304 summarizes the data into three groups of rows with values of "A", "B" and "C" for column "Group" 1305. Each of these groups contains multiple rows with different values for column "Test Subject" 1306, and also contains a subtotal row.

In FIG. 13B the user has used their mouse to click into cell 1307, which is the header cell for Group "A". This has the effect of selecting the entire group of rows, as indicated by selection outline 1308.

Figure 13C:
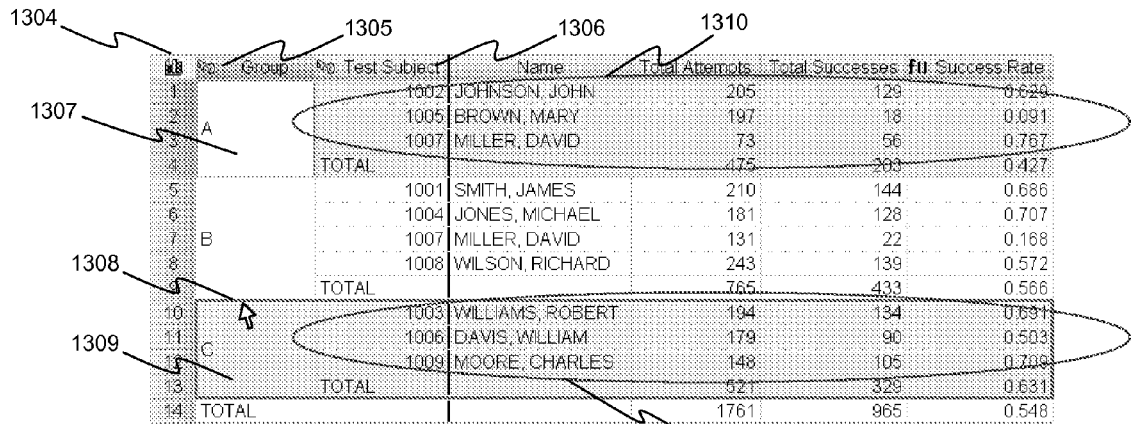

In FIG. 13C the user has used the mouse to drag selection outline 1308 over cell 1309 which is the header cell for Group "C".

Figure 13D:
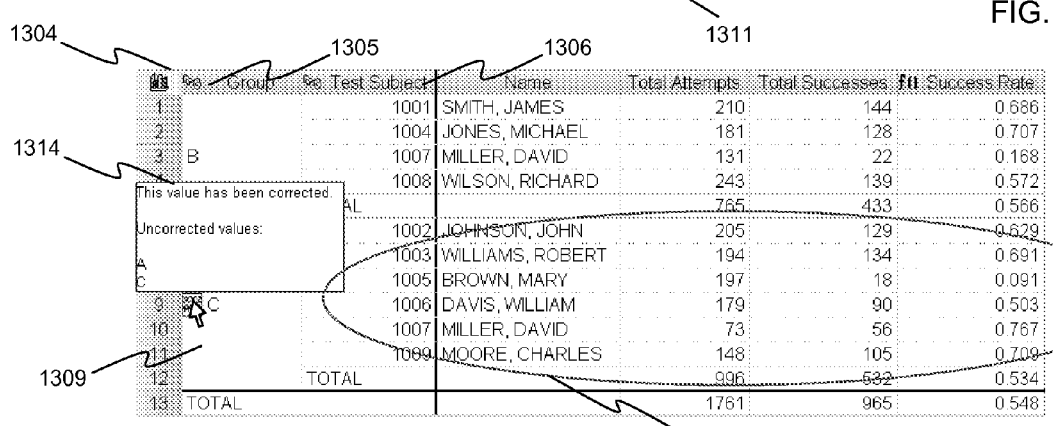

In FIG. 13D when the user releases the mouse, summary table 316 now no longer displays a header for Group "A". The rows from Group "A" 1310 have been moved into Group "C" 1311. An icon appears in header cell 1309 indicating that the group has been corrected. If the user places the mouse pointer over the icon, a message 1314 is displayed indicating that Group "A" has been combined with Group "C".

In FIG. 13E the user has used their mouse to click into cell 1316, which is the sub-header cell for the row corresponding to Group "B", Test Subject "1007". This has the effect of selecting the entire row, as indicated by selection outline 1318.

In FIG. 13F the user has used the mouse to drag selection outline 1318 over row 1322.

In FIG. 13G when the user releases the mouse, the table now no longer displays the selected row (1321 in FIG. 13F). Sub-header cell 1323 for row 1322 contains an icon indicating that the row has been corrected. If the user places the mouse pointer over the icon, a message 1324 displays the two original values which have been combined. Original values are provided for both column "Test Subject" 1306 and column "Group" 1305. In combined row 1322, the aggregate data values in cell 1325 and cell 1326 now include data associated with either of the combined header values.

FIG. 13H the user has used their mouse to click into cell 1327, which is the sub-header cell for the row corresponding to Group "C", Test Subject "1002". This has the effect of selecting the entire row, as indicated by selection outline 1328.

In FIG. 13I the user has used the mouse to drag selection outline 1318 to a position in Group "B" between two other rows. The selection outline 1328 has changed shape to indicate a position between the rows.

In FIG. 13J when the user releases the mouse, the selected row 1331 has been moved to a new position in Group "B". Sub-header cell 1327 for row 1331 contains an icon indicating that the row has been corrected. If the user places the mouse pointer over the icon, a message 1334 shows that the original values are Group "A", Test Subject "1002". Thus, although the user dragged row 1331 from Group "C" to Group "B", the message 1334 indicates that the row originally had a Group value of "A".

Figures 13K, 13L, 13M:
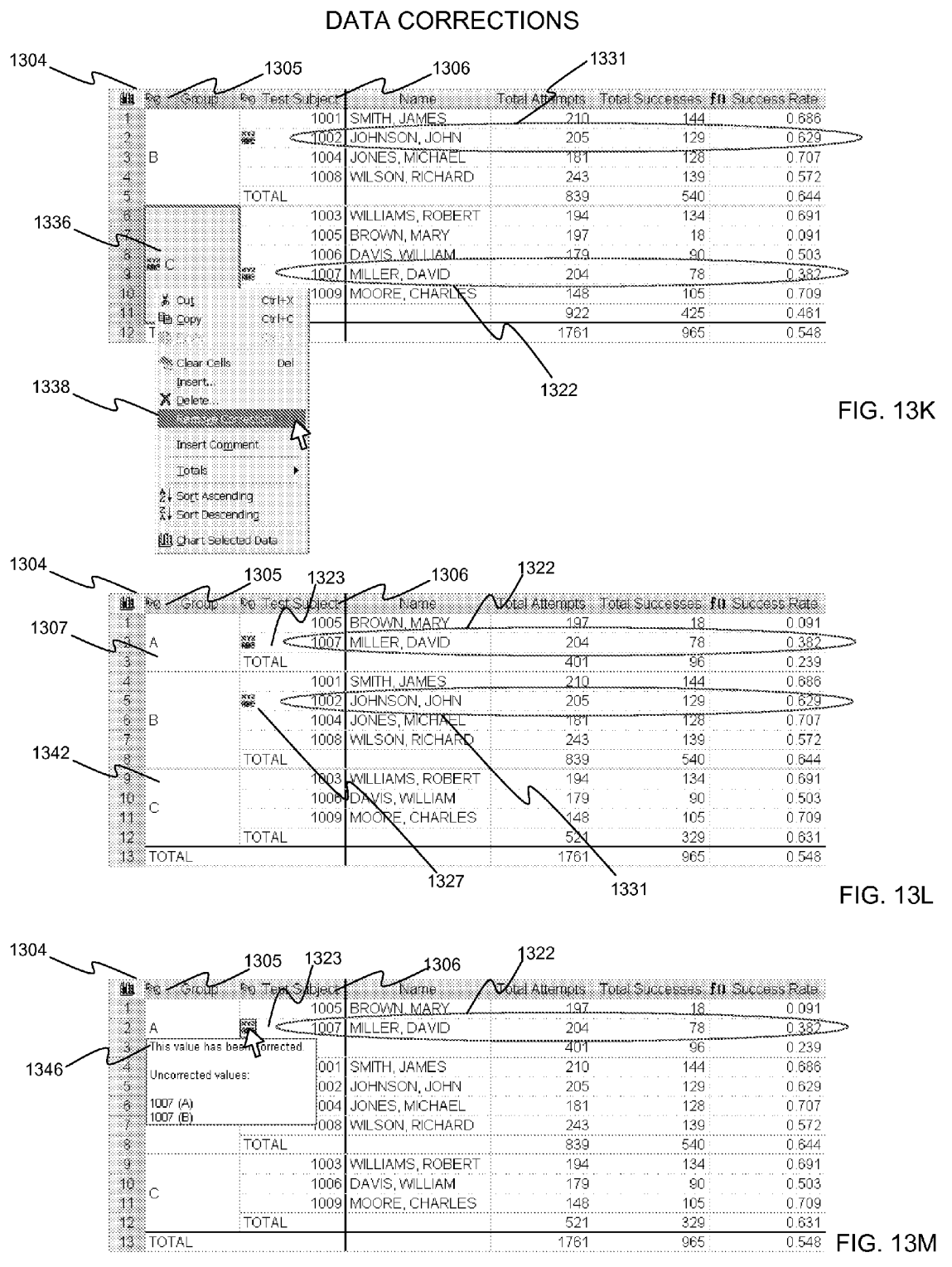

In FIG. 13K the user has selected cell 1336, which is the header cell for Group "C" corrected previously. The user then uses a command 1338 to remove the correction to cell 1336.

FIG. 13L shows the table after the correction to Group "C" has been removed. The header cell 1307 for Group "A", which previously had been combined with Group "C", has now reappeared. Group "A" contains 2 of the 3 sub-items originally present (see FIG. 13C, rows 1310). However, row 1331, which originally had been in Group "A", remains in Group "B" because the correction that moved it there (FIGS. 13H, 13I, 13J) is still present, as indicated by the icon in cell 1327.

A correction icon is also present in cell 1323, which is the sub-header cell for row 1322. This row was combined with another row in a previous correction (FIGS. 13E, 13F, 13G). In FIG. 13M the user has placed the mouse pointer over the icon, and a message has been displayed giving the original values for the two combined rows. Note that although row 1322 had been in Group "C" at the time this correction was made, the two rows remain combined but are now in Group "A".

In one embodiment, the data analysis system 100 ensures that once headers or rows have been combined, they remain combined unless the specific correction that combined them is removed by the user. Similarly, the data analysis system 100 ensures that once a header or row has been moved into the scope of a higher-level header (i.e. a header cell further to the left), it remains with that higher-level header unless the specific correction that moved it is removed by the user. If the item combined or moved into is itself subsequently combined or moved elsewhere, then all the rows will remain in the subsequent location until the correction is removed by the user.

If the source table subsequently changes resulting in a row being added belonging to an existing row group, and the existing row group has been combined or moved into another group, then the new row will be added to whichever location the existing group was moved to or combined with.

When new rows are inserted into a summary table or an analysis table with more than one key column, additional handling is desired. To illustrate this, FIGS. 14(A-D) show a sequence of corrections to the same analysis table used in the previous example. In FIG. 14A, the user has used the mouse to click into higher-level header cell 1342. This has selected all of Group "C" as indicated by selection outline 1402. The user then uses a command 1404 to insert a new row header.

FIG. 14B shows that after the insertion command is executed, the table contains another manual higher-level group. The user has typed "D" into header cell 1406 for the new group. Within the group are two new rows 1408 and 1410. Row 1410 is the sub-total row for the new group. Manual row 1408 was initially blank when inserted; the user has typed values into its cells.

In FIG. 14C, the user has used the mouse to click into lower-level header cell 1412. This has selected one row 1408, as indicated by selection outline 1416. The user then uses a command 1414 to insert a new row.

FIG. 14C shows that after the insertion command is executed, Group "D" now contains another row 1416. This time a lower-level header was inserted because the user had selected a single row and not a higher-level group of rows.

Manual rows or manual row groups can be moved into or combined with either a manual or non-manual header. Non-manual rows or non-manual row groups also can be moved into or combined with either a manual or non-manual header. The only restriction is the single manual rows at the lowest level cannot be combined with other rows.

Figure 15:
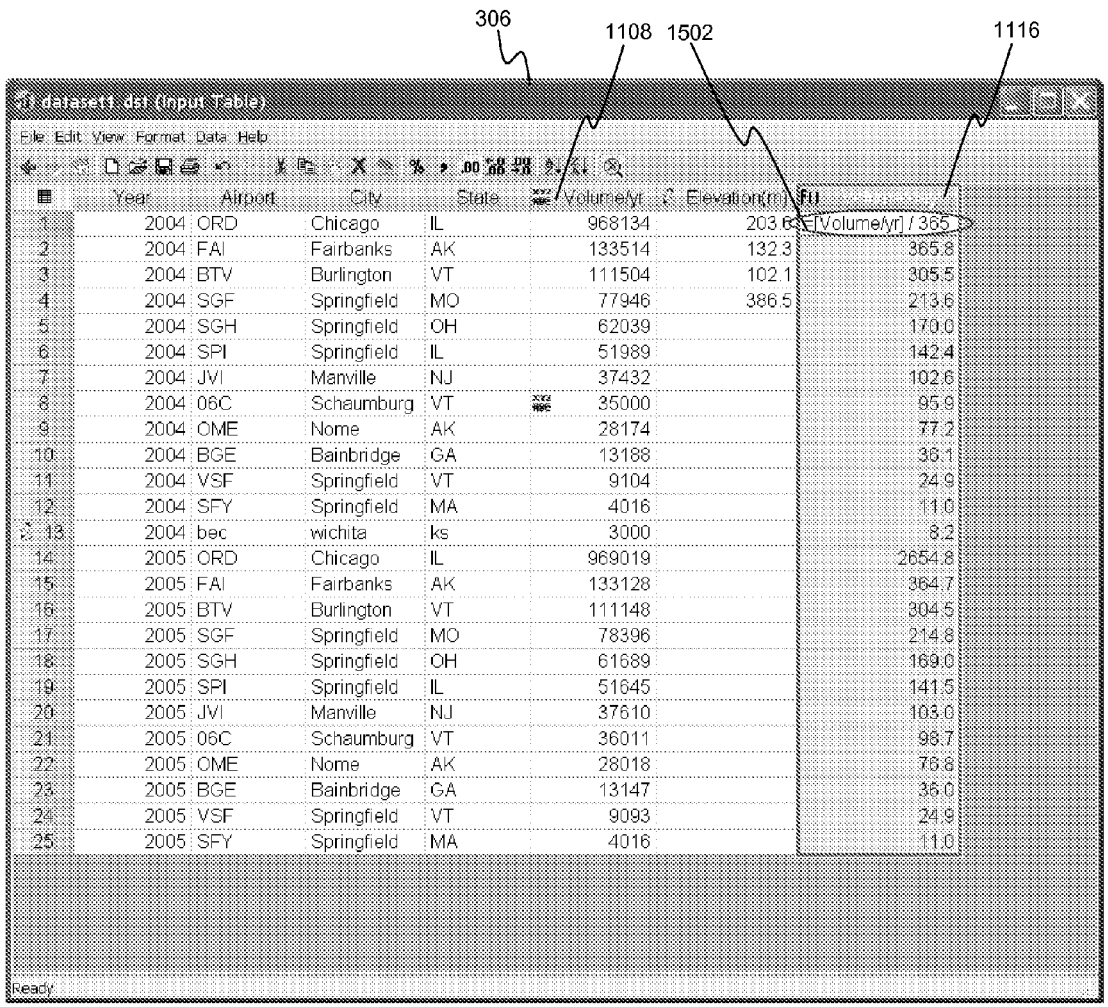

Formulas—FIGS. 15, 16

FIG. 15 illustrates the functionality regarding the use of formulas. Formulas are used to derive new data columns from the values in existing data columns (e.g. columns 105). FIG. 15 shows the contents of table 306, which was last shown in FIG. 11D. The user has renamed column 1116, which was inserted manually, from "New Column (2)" to "Volume/day". The user has also entered the text "=[Volume/yr]/365" into cell 1502, one of the cells in column 116. This text represents a formula similar to that used in a spreadsheet program. In a formula, the values in other columns can be referenced by specifying the column name. The formula specifies that column "Volume/day" 1116 is to be calculated by taking the value in each corresponding cell of column "Volume/yr" 1108, and dividing its value by 365.

The formula automatically applies to the entire column "Volume/day" 1116. The user can enter the formula into any of the cells in the column.

FIG. 16 lists the different operations and functions which can by used in a formula. The data analysis system 100 also supports a number of special functions which are used to aggregate multiple values in a column, to retrieve the values of cells in different rows, or to retrieve other special values.

Formulas are calculated dynamically. Any changes to cells will immediately result in the recalculation of any affected cell arrays such as columns containing formulas.

Figure 17:
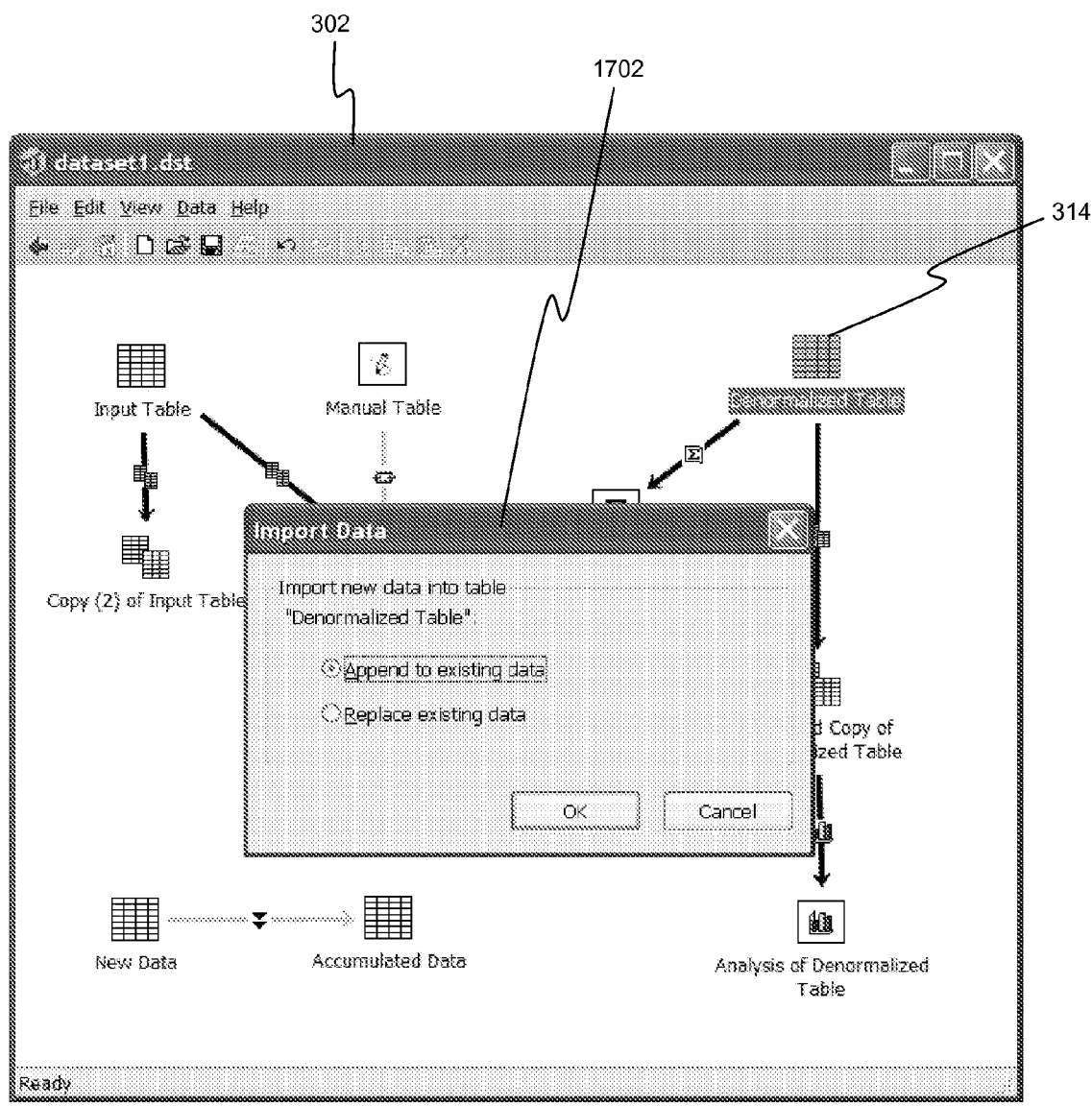
FIG. 17 illustrates a workflow diagram for refreshing data.

Refreshing Imported Data—FIG. 17

FIG. 17 illustrates the functionality allowing the user to refresh imported data. The user selects a data file outside the data analysis system 100 (e.g. from the computer desktop or file manager), and uses the mouse to drag it into table workspace 302 and drop it onto input table 314. The data analysis system 100 displays a window 1702 which gives the user the option of either appending the data from the data file, or replacing the existing data.

Due to the dynamic and persistent nature of the data analysis system 100 operations, any other tables directly or indirectly using table 314 as a source table (e.g. table 103) are automatically updated with no further user intervention. If corrections have been made to a summary table or an analysis table (e.g. resultant table 111), then any such corrections will remain in effect and be applied to the new data.

Architecture of the Data Analysis System 100

Figure 18:
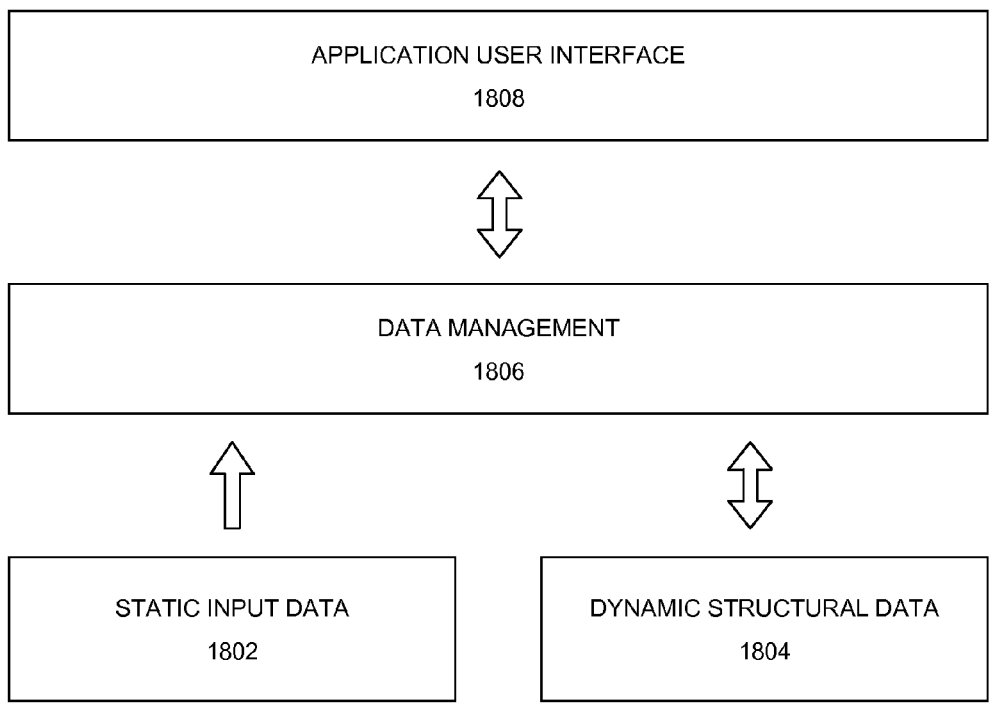
FIG. 18 illustrates an exemplary architecture of the data analysis system of FIG. 1A.

FIG. 18 illustrates the internal architecture of the data analysis system 100 according to one embodiment. According to the present embodiment, the data analysis system 100 uses a plurality of data repositories (e.g. two data repositories). The static input data 1802 (e.g. data sets 101), kept on disk, contains data as originally imported into the system. The dynamic structural data 1804, kept in memory, contains data structures that describe and organize the input data (e.g. data sets 101). In addition to these two data repositories, a data management module 1806 is responsible for initializing the static input data 1802 and for creating and managing the contents of the dynamic structural data 1804. It is also responsible for retrieving and integrating data from both the static input data 1802 and the dynamic structural data 1804, for presentation to the application user interface module 1808. In turn the application user interface module 1808 presents information to the user, accepts user input, and passes requests back to the data management module 1806 to satisfy the user's requests.

Static Data Structures

The static input data 1802 consists of a set of two-dimensional arrays of data representing the rows and columns of input data. Each array is composed of fixed-size cells that can be accessed directly as would be understood by a person skilled in the art. For example, an array of input data 1802 may be accessed by referencing the position on disk using an index calculation, given row and column indices. When storing numeric or date/time data, a cell contains an actual data value representing the numeric or date/time date. When storing string data, if the string fits within the cell's pre-determined size it is kept directly within the cell; otherwise the cell contains an offset into a separate string table on disk.

Each input table (e.g. shown in FIG. 3) initially has associated with it one array within the static input data 1802. This array contains the data originally imported into the table in its original sequence. Each time the input table is refreshed with new imported data (e.g. the updated data based on user modification of the static input data 1802), a new array is created to contain the new data.

Figure 19:
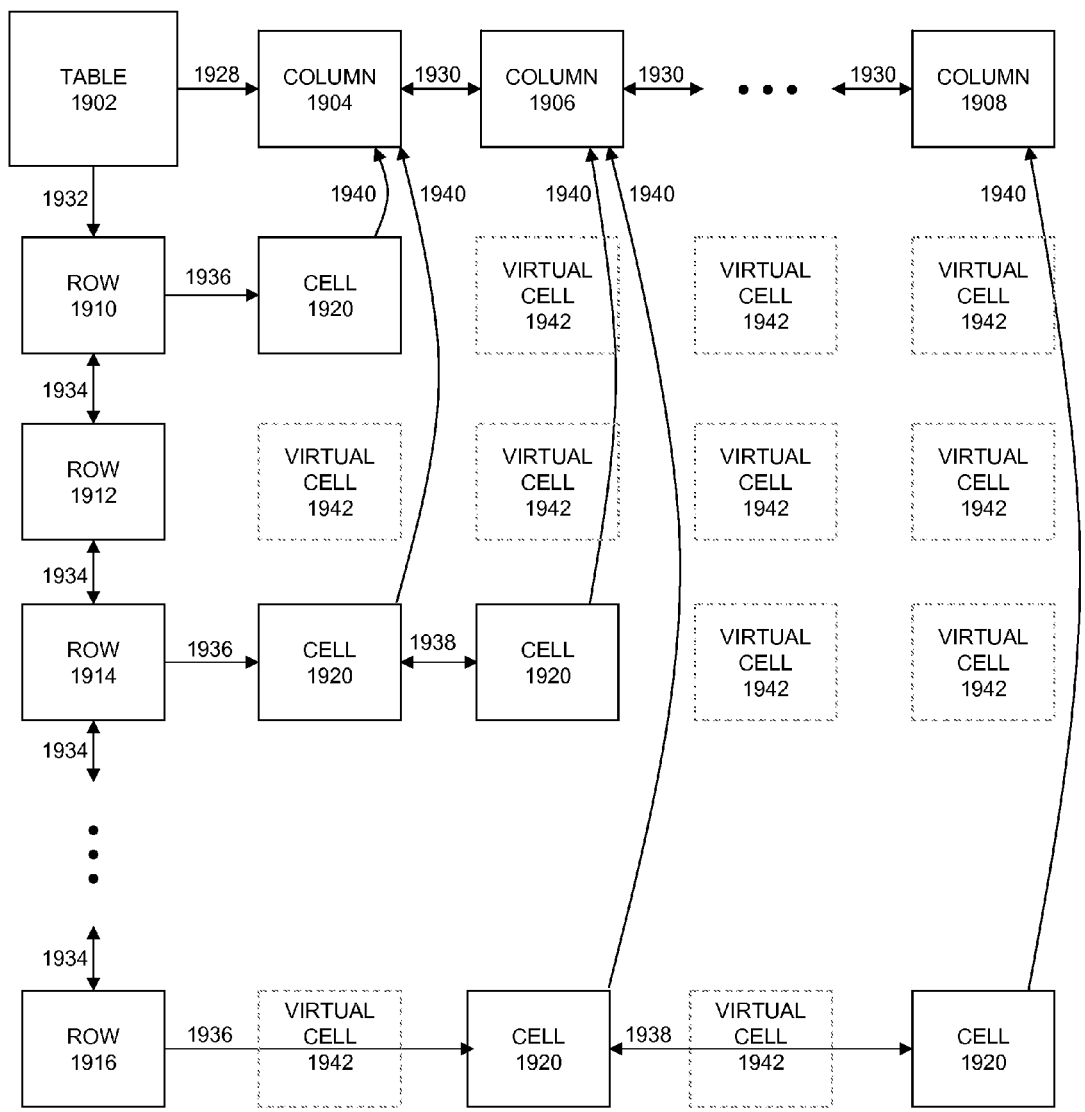
FIG. 19 illustrate an example data object structure for input and resultant tables of FIG. 1A.

Dynamic Data Structures—FIGS. 18 and 19

As illustrated in FIG. 18, in one embodiment, the data management module 1806 is also be provided with dynamic structural data 1804. The dynamic structural data 1804 consists of a set of data objects that represent the tables and their rows, columns and cells. The data objects can contain reference pointers to other objects, representing the relationships between the objects.

FIG. 19 illustrates an example of a table object and its associated row, column and cell objects. Table object 1902 has associated with it a column reference pointer 1928. This refers to column object 1904, which is the head of a chain 1930 of column objects 1904, 1906 and 1908. Table object 1902 also has associated with it a row reference pointer 1932. This refers to row object 1910, which is the head of a chain 1934 of row objects 1910, 1912, 1914 and 1916.

Each row object 1910 optionally has associated with it a cell reference pointer 1936, which refers to the first cell object 1920 in a chain 1938 of cell objects associated with the row object. Each cell object (e.g. 1920) has a column reference pointer 1940, indicating which column object it is associated with. In one embodiment, the cell object is only used to contain cell values entered directly by the user. Only some pairings of row and column objects have an associated cell object. The row and column pairings that have no associated cell object instead display a "virtual cell object" 1942. A virtual cell 1942 does not exist as an actual data object, but is a useful way to refer to a specific row/column pairing. The data management module 1806 determines the actual data value for a virtual cell dynamically whenever it is needed, given a table, row and column object identification.

Although every cell object 1920 has a column reference pointer 1940, for clarity subsequent figures will not show these reference pointers. Instead, a cell object will be implied to be associated with the column object positioned above it.

Manual Input Table Structures—FIG. 20(A-B)

Figure 20A:
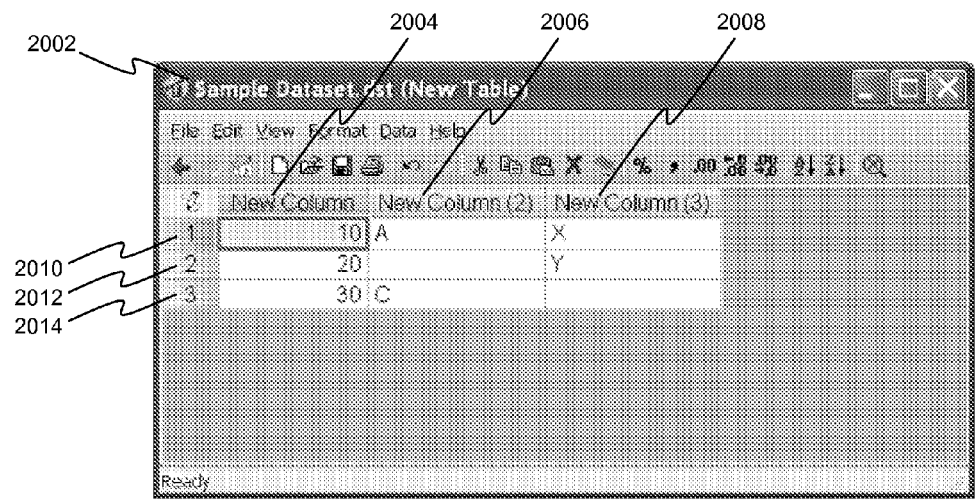
FIGS. 20A-20B illustrates example manual input tables for use with the data analysis system of FIG. 1A.
Figure 20B:
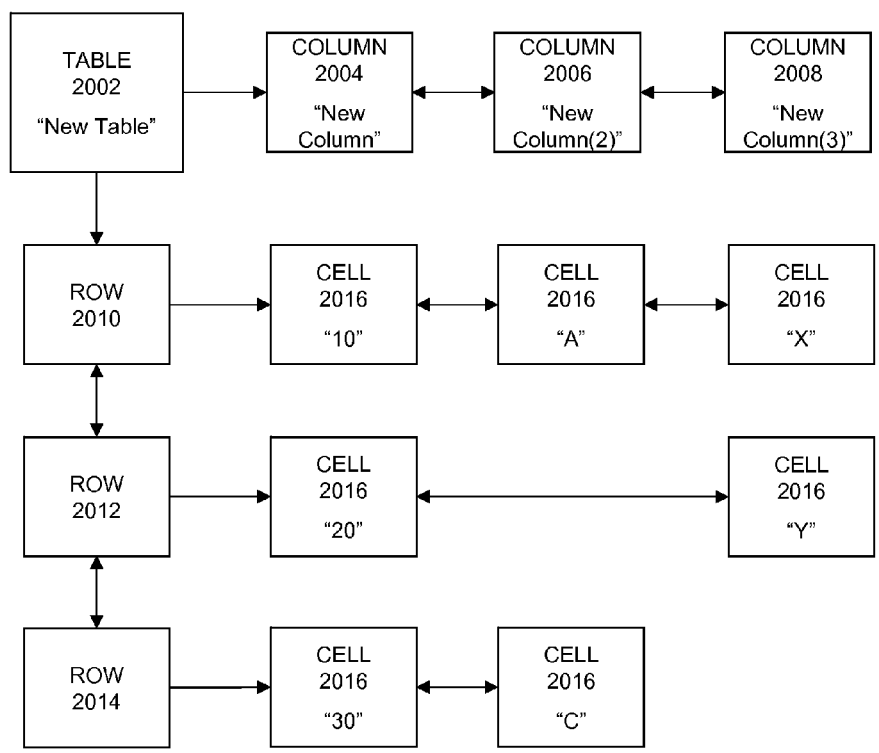

FIG. 20A shows an example of a manual input table 2002 (e.g. table 103) with three columns 2004, 2006 and 2008 and three rows 2010, 2012 and 2014. FIG. 20B shows the corresponding exemplary data objects within the dynamic structural data 1804 (FIG. 18). There is a one-to-one correspondence between the row and column data objects and the corresponding rows and columns displayed to the user. Cell values for the manual table are always stored within cell objects 2016. Names for columns are stored within column objects 2004, 2006 and 2008. As the user modifies the manual input table 2002, the corresponding data objects are created, modified and deleted as necessary to maintain the table's data structure as requested by the user.

Within tables other than input tables, the user can insert rows and columns marked as "manual". The data in these rows and columns is treated in the same manner as the data in a manual table.

Input Table Structures—FIG. 21(A-C)

Figure 21A:
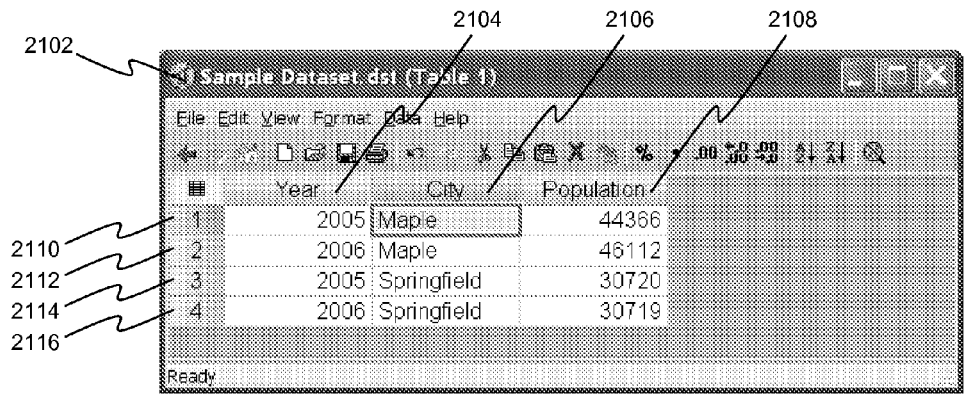
FIGS. 21A-21C illustrates example input tables for use with the data analysis system of FIG. 1A.

FIG. 21A shows an example of an input table 2102 (e.g. table 103) with three columns 2104, 2106 and 2108 and four rows 2110, 2112, 2114 and 2116.

Figure 21B:

FIG. 21B shows the corresponding data array for the input table 2102. As illustrated in this figure, the array of data includes five rows and three columns. The first row in the array contains the column names found in the input data. The other four rows in the array correspond to rows 2110, 2112, 2114 and 2116 in table 2102. The three columns in the array correspond to columns 2104, 2106 and 2108 in table 2102. Each row in the array can be identified by a sequential index number 2118. Each column in the array can be identified by a sequential index number 2120. Alternatively, as will be understood, the data array in FIG. 21B may be transposed, such that the first column in the array provides the identification names (e.g. Year, City, Population) for each of the rows.

Figure 21C:
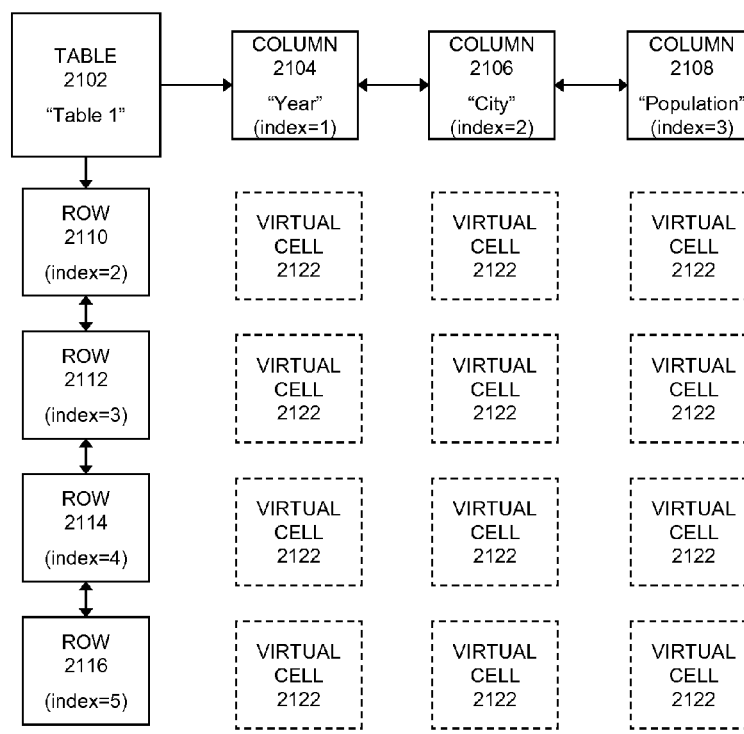

FIG. 21C shows the data objects for table 2102. The row and column objects have been set up to represent the rows and columns in the table 2102. Each row and column object contains an index number. The numbers correspond to the row index numbers 2118 and column index numbers 2120 in FIG. 21B. In this manner, the row and column objects can be rearranged, and each will continue to reference the same static input data.

An input table generally does not have cell objects, unless the user has typed in a corrected value for a cell, or has inserted manual rows or columns. The values of the virtual cells 2122 are dynamically determined when needed, by using the index numbers in the row and column objects to index into the fixed array (FIG. 21B) and retrieve the corresponding values.

In one embodiment, the data objects and data structure for an input table are created at the same time the table data is imported from an external source (e.g. from a database or other storage means or from user input) and stored in the static input data 1802 (FIG. 18).

Figure 22A:
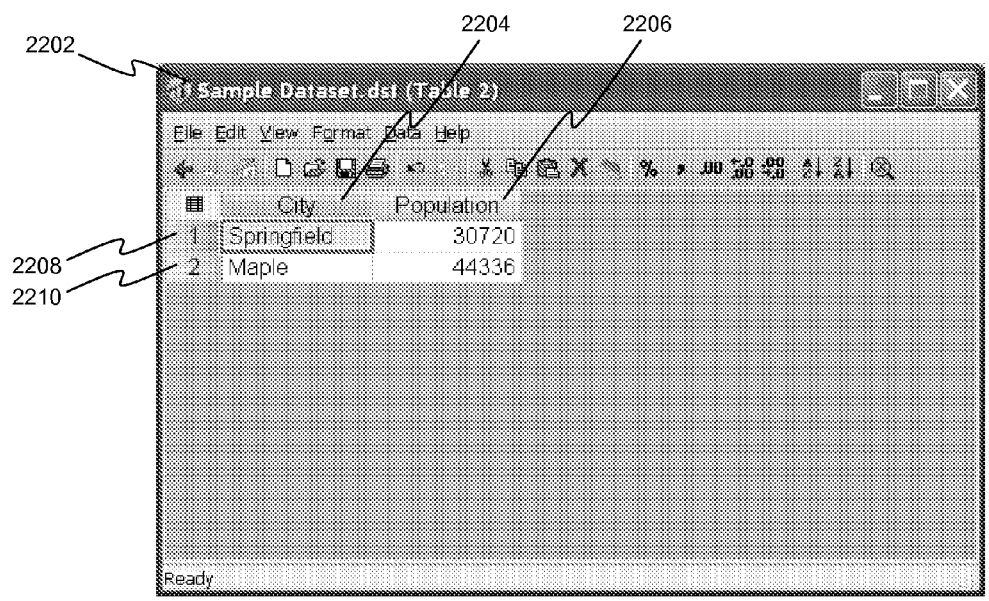
FIGS. 22A-22C illustrate the example structure of copy tables of the data analysis system of FIG. 1A.
Figure 22B:
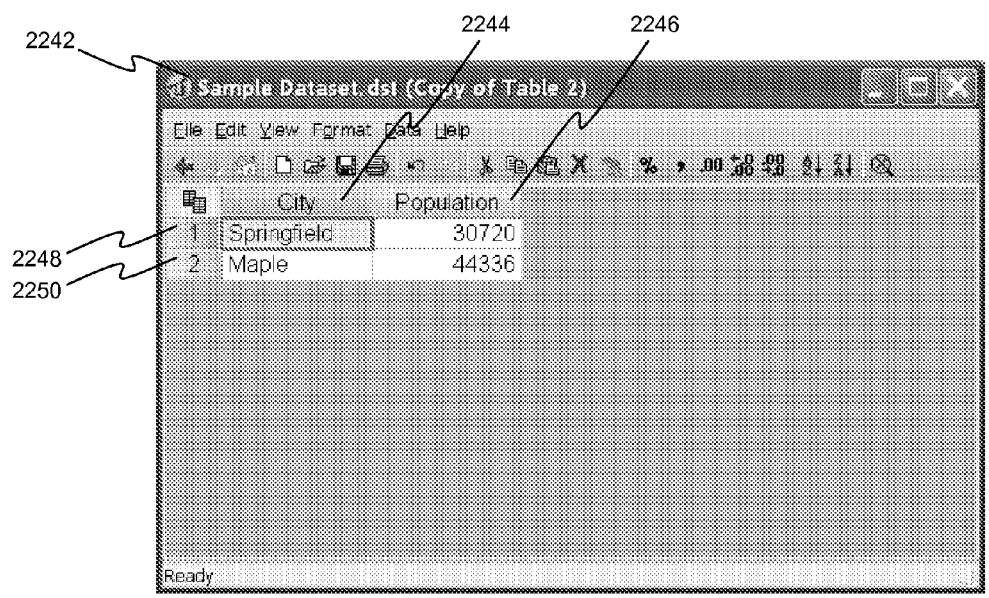
Figure 22C:
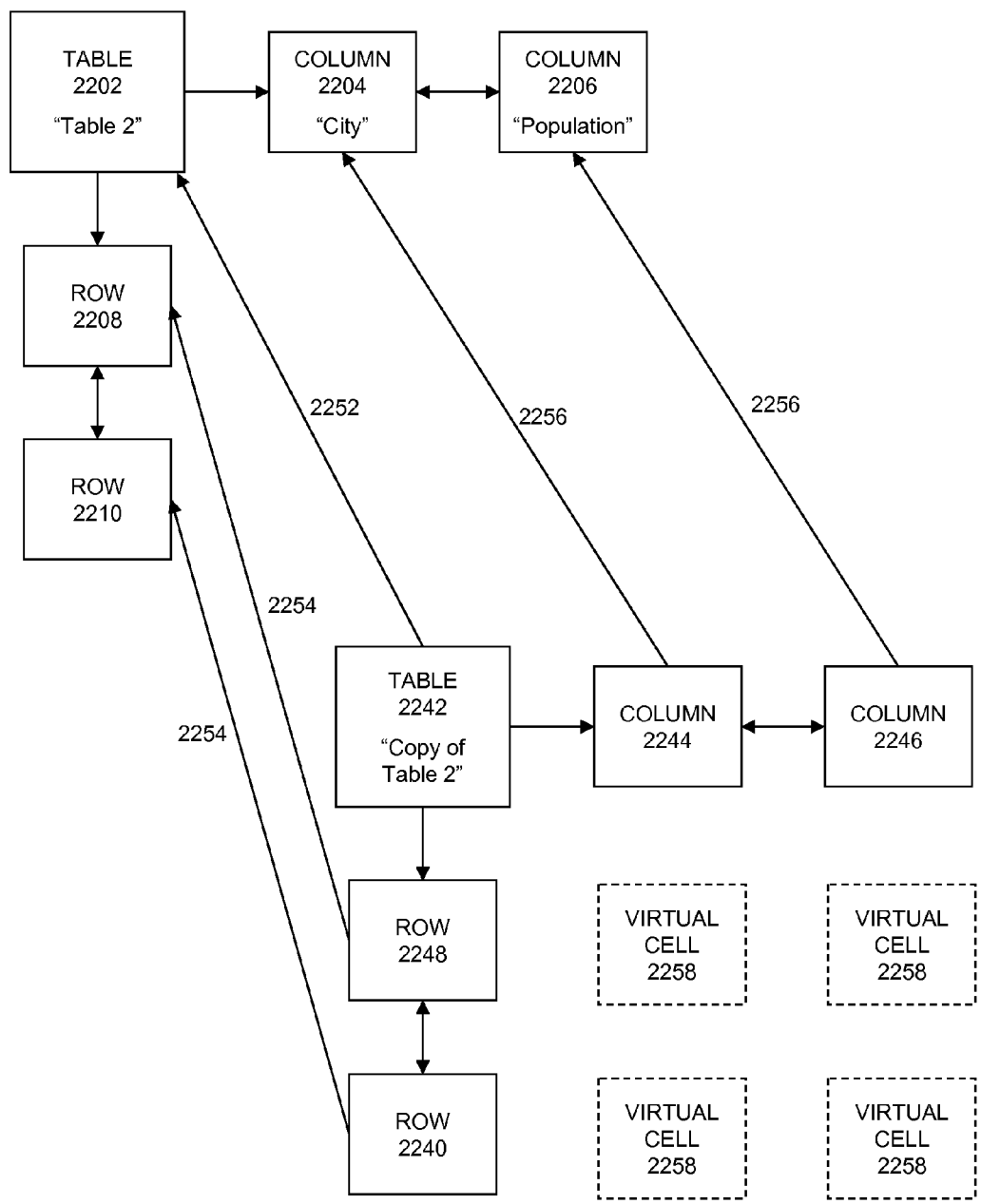
Figure 23:
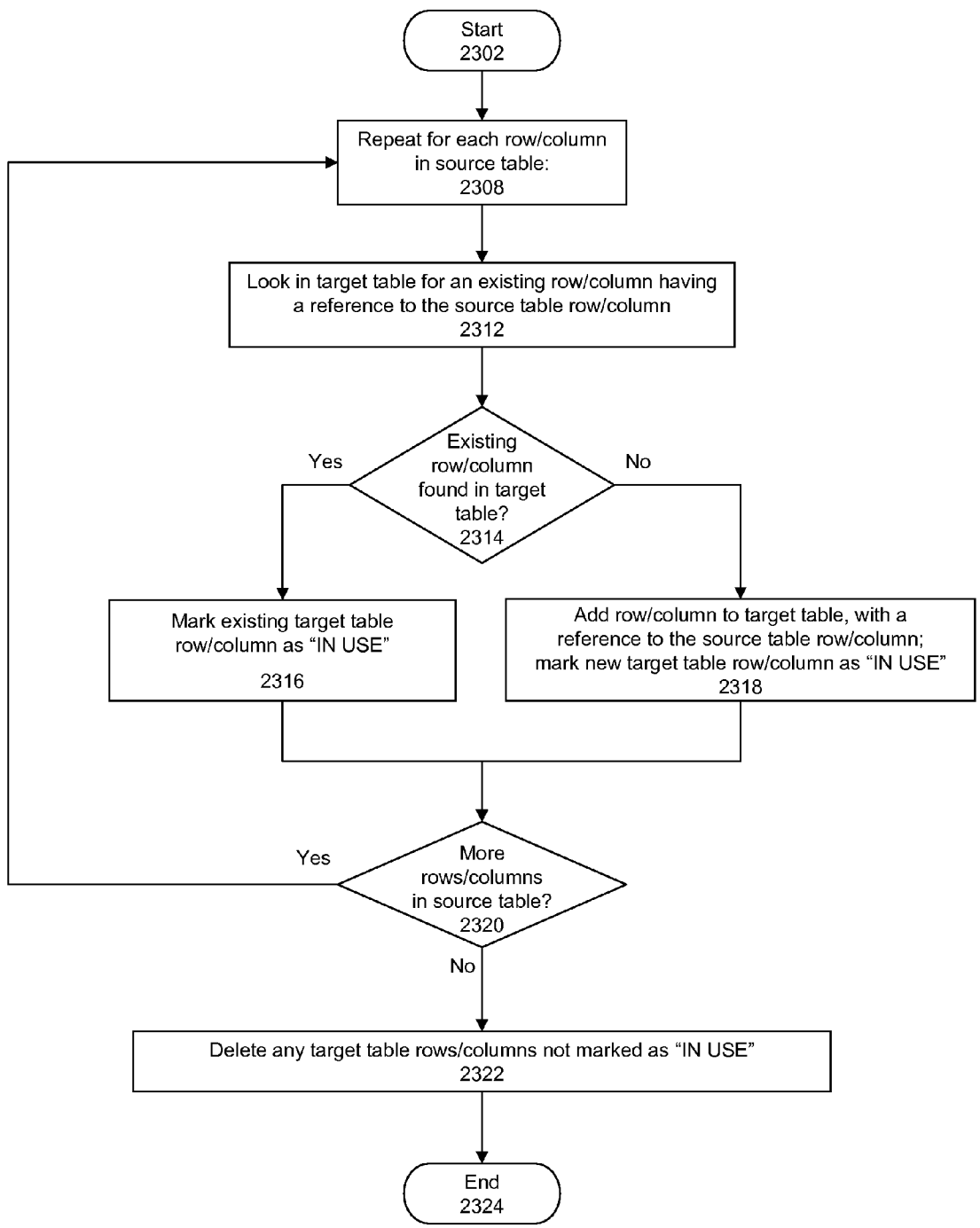
FIG. 23 illustrates exemplary operation of the copy module of FIG. 1A.

Copy Table Structures—FIG. 22(A-C), FIG. 23

Referring to FIGS. 22A and 22B, exemplary tables illustrate the copy operations provided by the copy module 102. FIG. 22A shows a table 2202 with two rows 2204 and 2206 and two columns 2208 and 2210. FIG. 22B shows a copy table 2242 which uses table 2202 as its source table. Finally, FIG. 22C shows the data objects representing these tables (2202 & 2242). Copy table object 2242 contains a reference pointer 2252 that refers to source table object 2202. Similarly, row objects 2248 and 2210 in copy table 2242 contain reference pointers 2254 to their corresponding row objects 2208 and 2210 in source table 2202. Column objects 2244 and 2246 in copy table 2242 contain reference pointers 2256 to their corresponding column objects 2204 and 2206 in source table 2202. The column objects 2204 and 2206 in source table 2202 contain the column names "City" and Population" respectively. The column objects 2244 and 2246 in copy table 2242 do not contain column names; their names are implied to be the same as the source columns they reference.

A copy table generally does not have cell objects, unless the user has typed in a corrected value for a cell, or has inserted manual rows or columns. The values of the virtual cells 2258 are dynamically determined when needed, by using the appropriate row and column reference pointers to retrieve data directly from the source table.

The data objects for a copy table are refreshed dynamically as changes are made to the source table. FIG. 23 illustrates the method used by the copy module 102 of the data analysis system to dynamically build a copy table. This method is applied both to initially build a new copy table, and to refresh its contents if the source table changes. Each table object contains a flag to indicate whether its row or column objects need to be refreshed. Any time the data analysis system 100 modifies a source table (e.g. table 103), the flag in the target table is set to indicate a refresh is needed. Any time the data analysis system 100 accesses the target table, this flag is checked first; if the flag is set, the data analysis system 100 uses the method illustrated in FIG. 23 to refresh the table and then clears the flag.

The method in FIG. 23 is used separately by the data analysis system 100 to refresh row objects and column objects. The process starts at Step 2302, once the table modified flag is set and proceeds to Step 2308 to repeat the steps that follow for each row/column found in the source table. At Step 2312, the target table is checked for an existing row/column having a reference pointer to the source row/column in question. If such a row/column is found (Step 2314), a flag is set on the row/column object to indicate that it is in use (Step 2316). If no such row/column is found in the target table (e.g. resultant table 111), a new row/column object is added to the target table with an appropriate reference pointer to the current source table row/column (Step 2318); the new row/column object is also flagged to indicate that it is in use. At Step 2320 the sequence from Step 2308 is repeated if more rows/columns remain in the source table to be processed. Once all source row/column objects have been processed, Step 2322 deletes any rows/columns in the target table that have not been flagged (e.g. as in use). This deletes any rows/columns referring to source objects that no longer exist. When a copy table is refreshed, manual rows and columns, appended rows and joined columns are excluded from Step 2322.

The method in FIG. 23 is also used by the data analysis system 100 to refresh joined columns and appended rows, which will be discussed below.

Join Relationship Structures—FIG. 24(A-C)

The join operation provided by the join module 104, joins two or more tables such as to add additional columns/rows from the first table to the second table when at least one of the columns/rows in one table has common values with the second other table. The user is able to select which column/row of the first table should be linked with which column/row of the second table. In this case, the method includes: linking one of the columns or rows of the target table with a selected one of the columns or rows of the source table, each value in the linked column or row of the target table having corresponding values in the other of said columns or rows of the target table. Each value in the selected column or row of the source table is then associated with each of the corresponding values in the other said columns or rows of the target table. Next, a joined table is created comprising the columns or rows of the source table and combination columns or rows for each other of said columns or rows of the target table. That is, each combination column or row having values from the linked target column or row associated with the selected source table column or row.

Figure 24A:
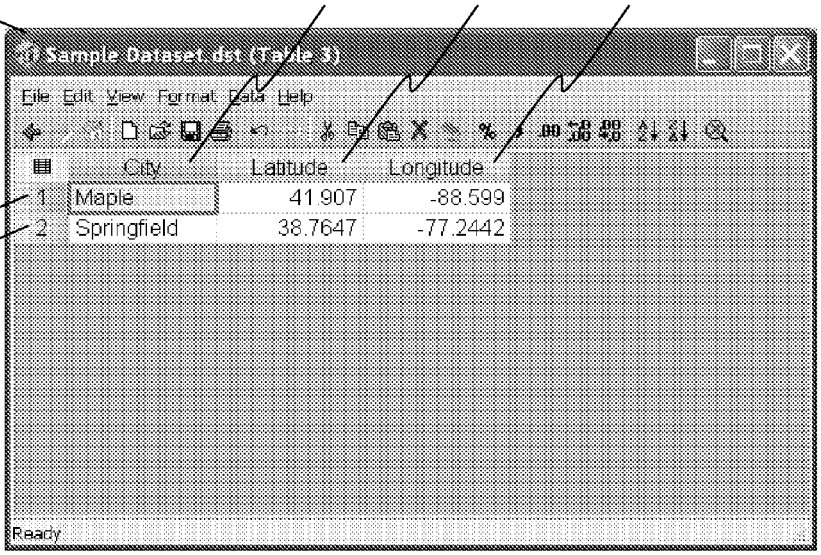
FIGS. 24A-24C illustrate exemplary tables and data object structure according to the join module of FIG. 1A.
Figure 24B:
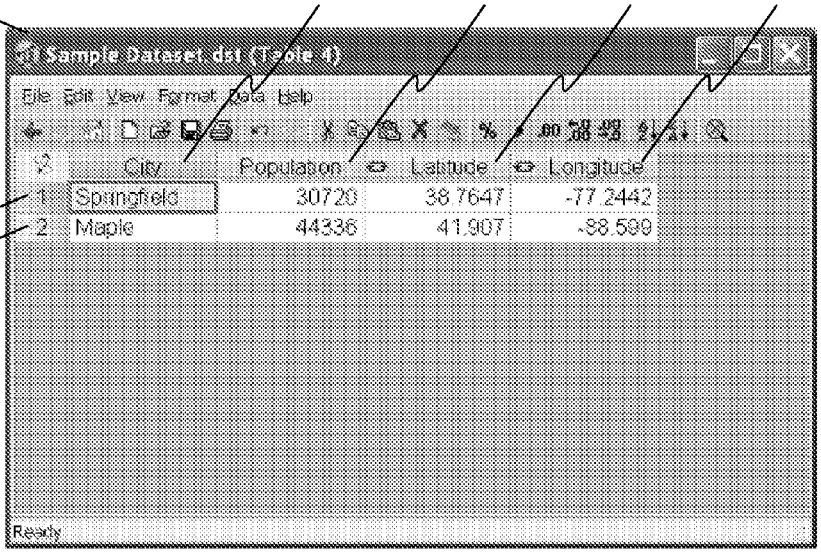

FIG. 24A shows a table 2402 with three columns "City" 2404, "Latitude" 2406 and "Longitude" 2408. The table has two rows 2410 and 2412. FIG. 24B shows another table 2414 with four columns. The first two columns are "City" 2416 and "Population" 2418. The next two columns are "Latitude" 2420 and "Longitude" 2422, which have been joined from source table 2402; they correspond to columns "Latitude" 2406 and "Longitude" 2408 in source table 2402.

Figure 24C:
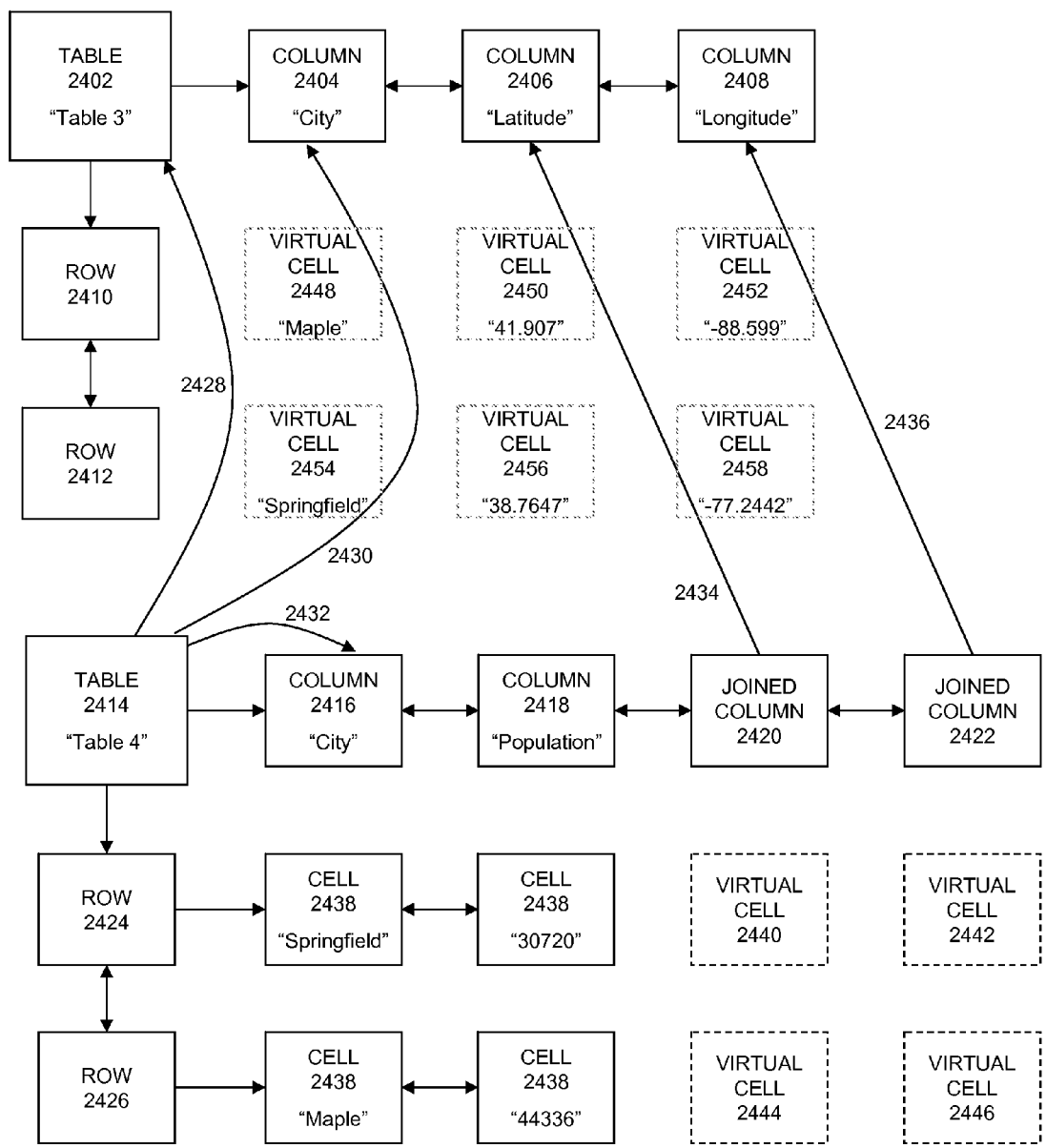

FIG. 24C shows the data objects used to represent tables 2402 and 2414. Table object 2414 contains three reference pointers. Reference pointer 2428 refers to the join source table object 2402. Reference pointer 2430 refers to column object "City" 2404 in join source table 2402, indicating that this column contains lookup values to be used in the join. Reference pointer 2432 refers to column object "City" 2416 in target table 2414, indicating that values in this column are to be matched to lookup values in column "City" 2404 in join source table 2402. If a join is based on multiple columns, then multiple occurrences of reference pointers 2430 and 2432 will be present.

Joined column objects 2420 and 2422 in target table 2414 have reference pointers 2434 and 2436 to column objects "Latitude" 2406 and "Longitude" 2408 respectively in source table 2402. This indicates that these joined columns are to contain data from those two columns respectively.

A joined column object generally does not have cell objects associated with it, unless the user has typed in a corrected value for a cell. The values of the virtual cells 2440, 2442, 2444 and 2446 are dynamically determined when needed. As an example of this, when a value is required for a virtual cell 2440, the join module 104 first retrieves the value "Springfield" from Cell 2438, which is in the same row as the virtual cell 2440 being evaluated, and is in column "City" 2416 which is identified as the lookup column by reference pointer 2432. The join module 104 then looks in source table 2402 for a row with the value "Springfield" in column "City" 2404, which is identified as the join column by reference pointer 2430; the join module 104 finds that row 2412 matches. The program then locates column object 2420, which is associated with the virtual cell 2440 being evaluated, and uses reference pointer 2434 to locate column object "Latitude" 2406 in source table 2402. This column, together with row 2412 located previously, are then used to locate virtual cell 2456 in source table 2402 and retrieve the value "38.7647". This value is then used as the value of virtual cell 2420 in target table 2414.

The joined column objects for the join target table are refreshed dynamically as changes are made to the source table. The method shown previously in FIG. 23 is used to refresh the columns; in this case Step 2322 of FIG. 23 is modified to operate on the joined columns only.

Append Relationship Structures—FIG. 25(A-C)

Figure 25A:
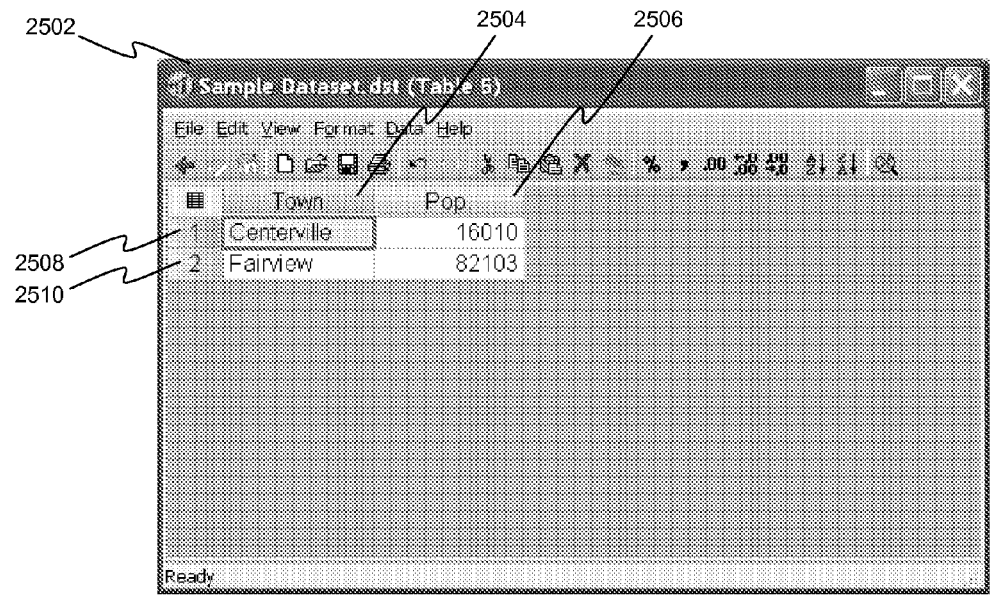
FIGS. 25A-25C illustrate exemplary tables and data object structure according to the append module of FIG. 1A.
Figure 25B:
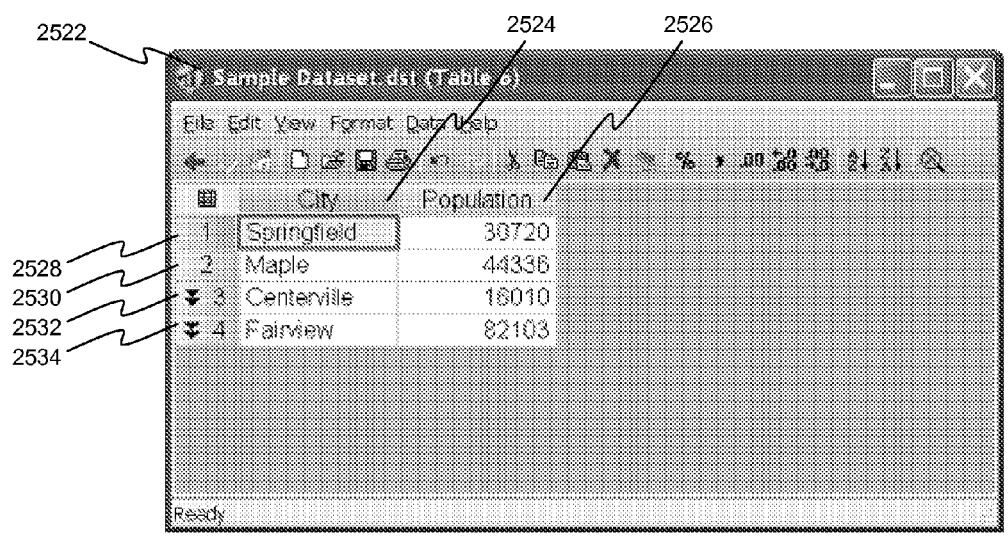

FIG. 25A shows a table 2502 with two columns 2504 and 2506, and two rows 2508 and 2510. FIG. 25B shows another table 2522 with two columns 2524 and 2526. Table 2522 has four rows (e.g. resultant appended table 111); the first two rows 2528 and 2530 contain the original contents of the table, and the next two rows 2532 and 2534 have been appended from table 2502.

Figure 25C:
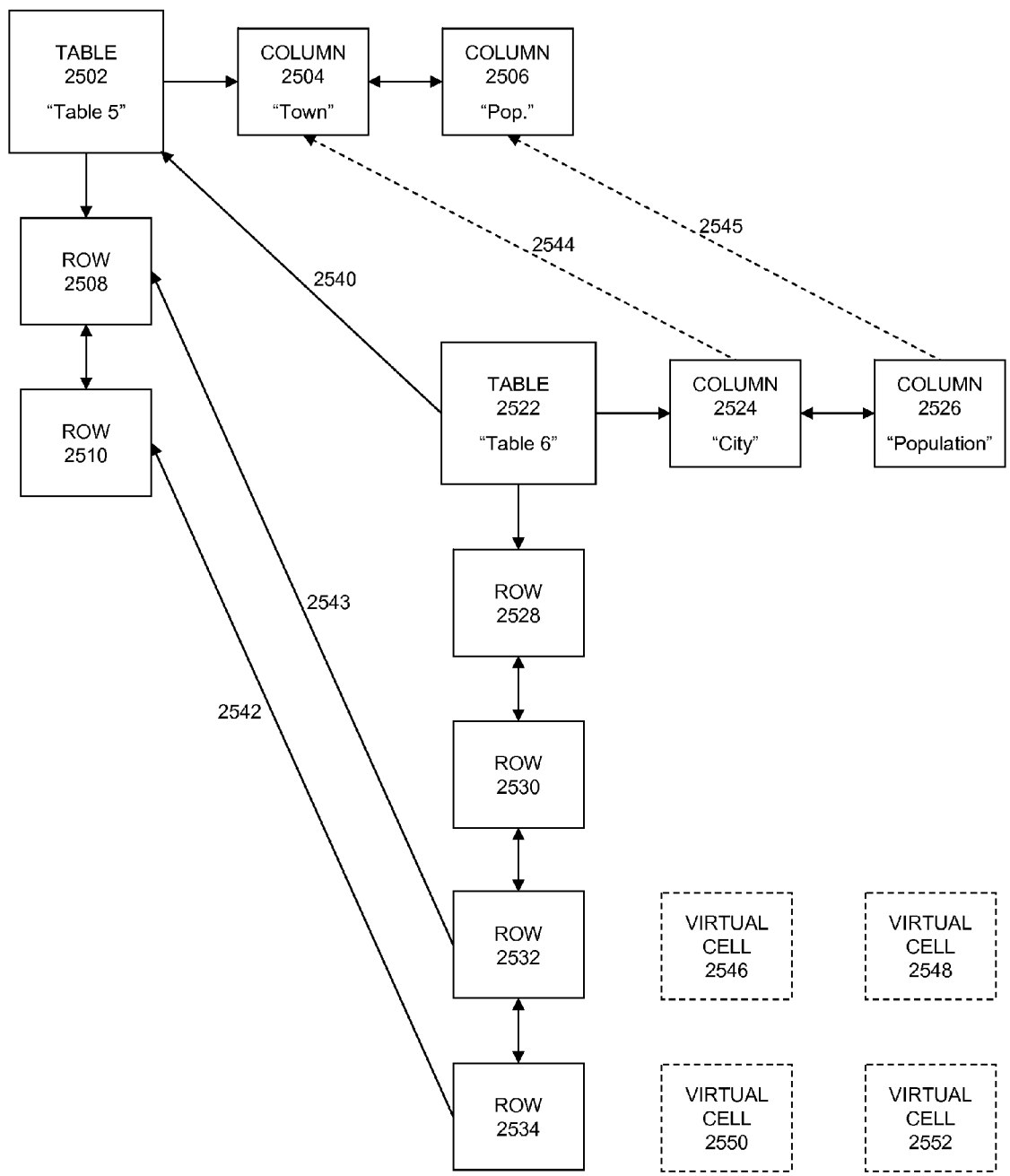

FIG. 25C shows the data objects used to represent tables 2502 and 2522. Target table 2522 has a reference pointer 2540 to source table 2502, and appended rows 2532 and 2534 have reference pointers 2542 and 2543 to the two rows 2508 and 2510 respectively in source table 2502. The figure shows two dashed-line arrows 2544 and 2545, linking the two target table columns "City" 2524 and "Population" 2526 with the two source table columns "Town" 2504 and "Pop." 2506. These are not actual pointers, but represent the dynamic association of the two target table columns with the two source table columns. The source and target columns are associated with each other by object position within their respective column chains; this association is determined dynamically so that if the column positions change, the column associations are changed correspondingly.

An appended row object generally does not have cell objects associated with it, unless the user has typed in a corrected value for a cell. The values of the virtual cells 2546, 2548, 2550 and 2552 are dynamically determined when needed. As an example of this, when a value is required for virtual cell 2546, the append module 106 uses reference pointer 2543 to locate row 2508 in source table 2502, and uses dynamic column association 2544 to locate column "Town" 2504 in source table 2502. The append module 104 then uses source row 2508 and source column 2504 to retrieve the appropriate value from source table 2502. This value is then used as the value of virtual cell 2546 in target table 2522.

The appended row objects for the append target table are refreshed dynamically as changes are made to the source table. The method shown previously used by the copy module 102 in FIG. 23 is used to refresh the rows; in this case Step 2322 of FIG. 23 is modified to operate on the appended rows only.

Figure 27A:
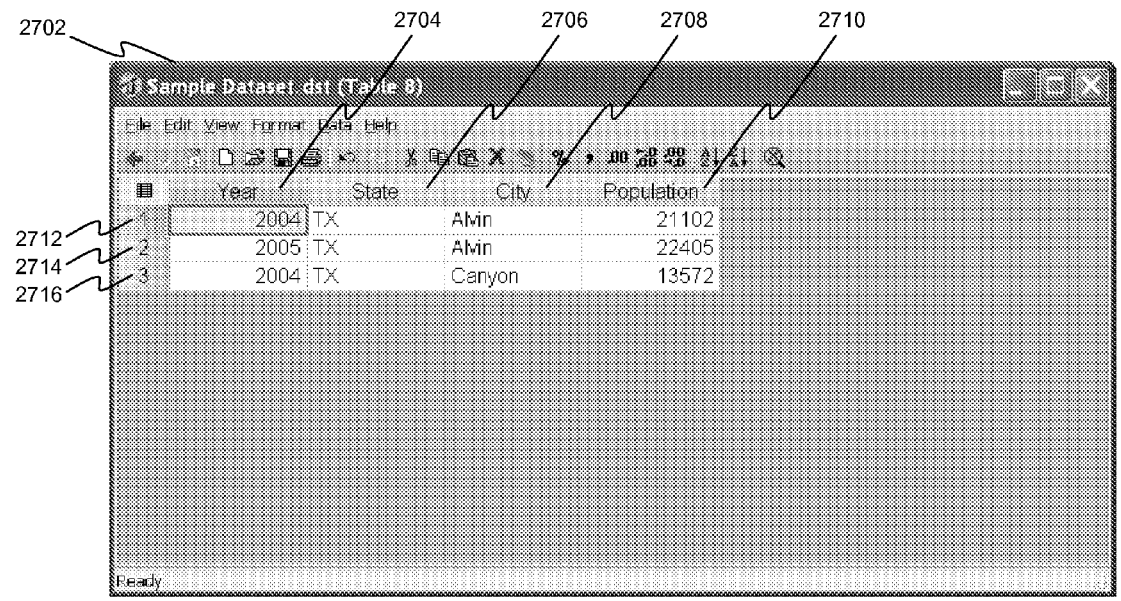
Figure 27B:
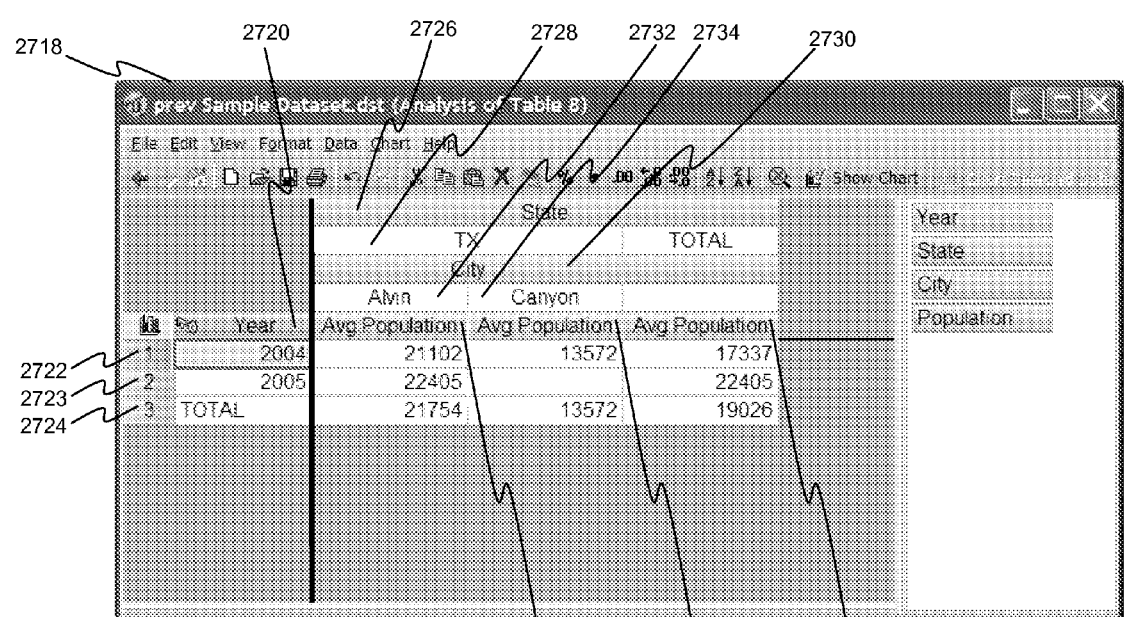
Figure 27C:
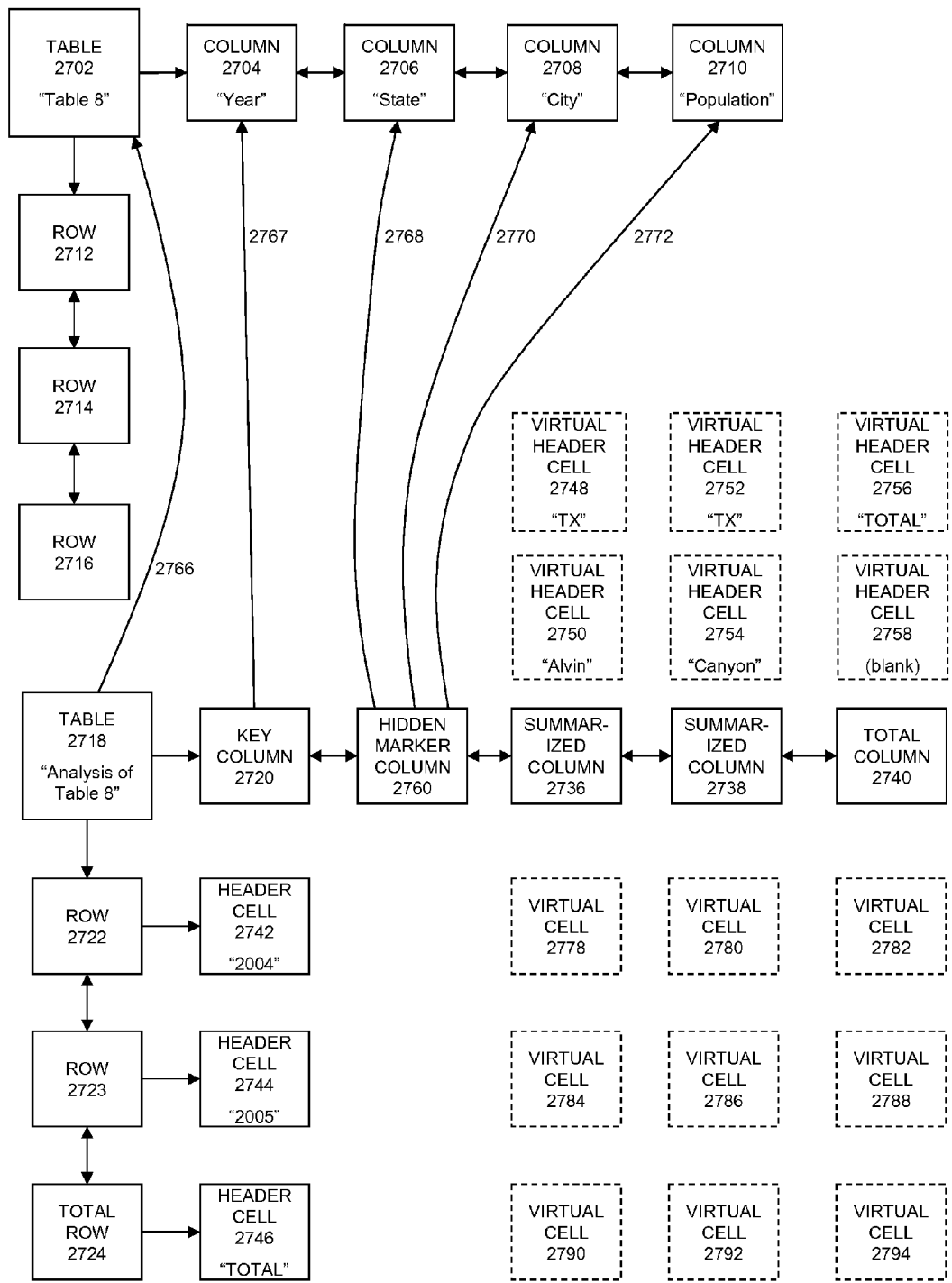
Figure 28:
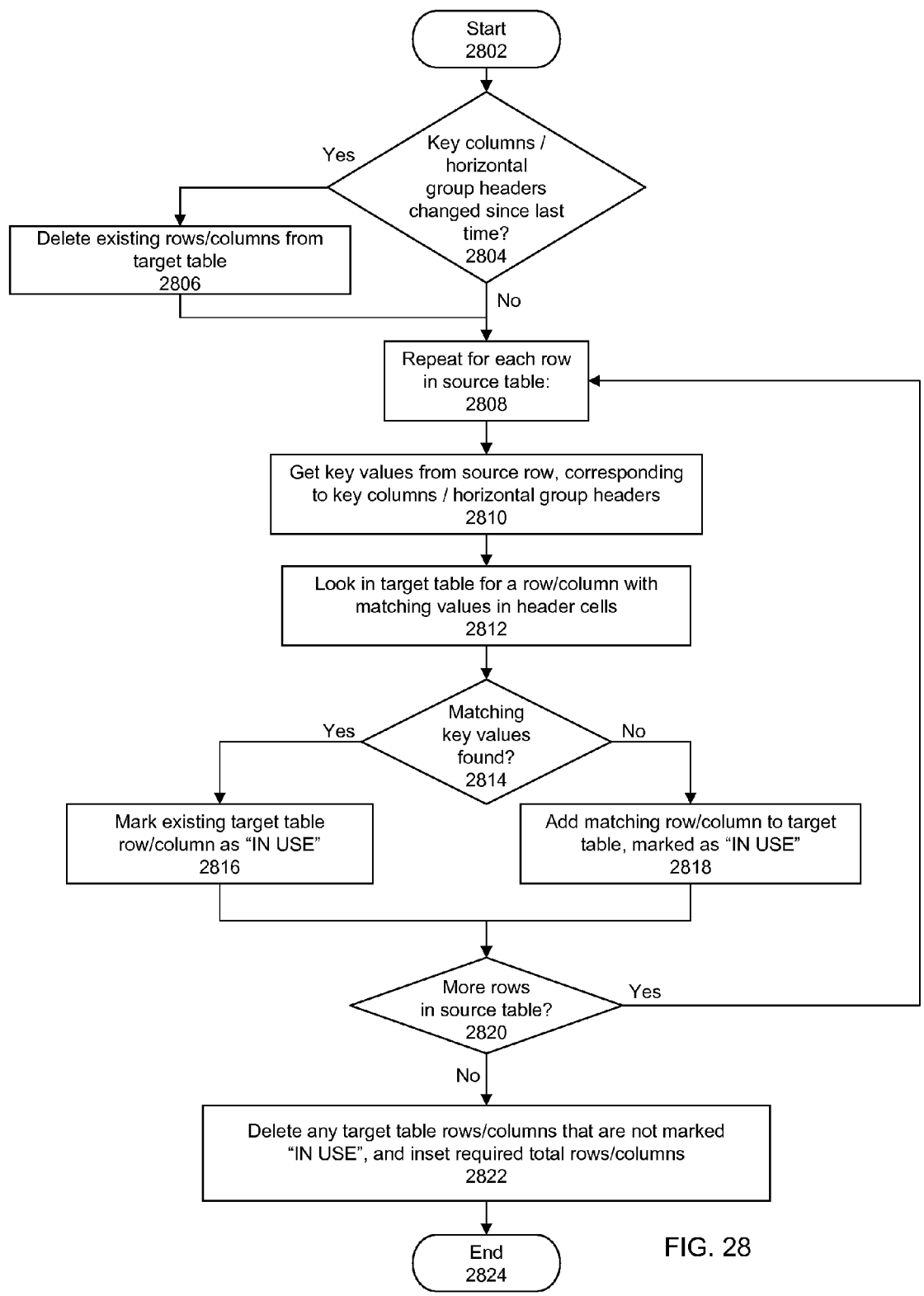
FIG. 28 illustrates exemplary operation of the summary and/or analysis module of FIG. 1A.

Summary/Analysis Table Structures—FIG. 26(A-C), FIG. 27(A-C), FIG. 28(A-B)

As described earlier, the summary module 108 provides a summarized table wherein redundant values in one or more selected columns (e.g. key columns 2622, 2624) are consolidated to a single value and corresponding values in other columns are aggregated to form summarized columns.

Figure 26A:
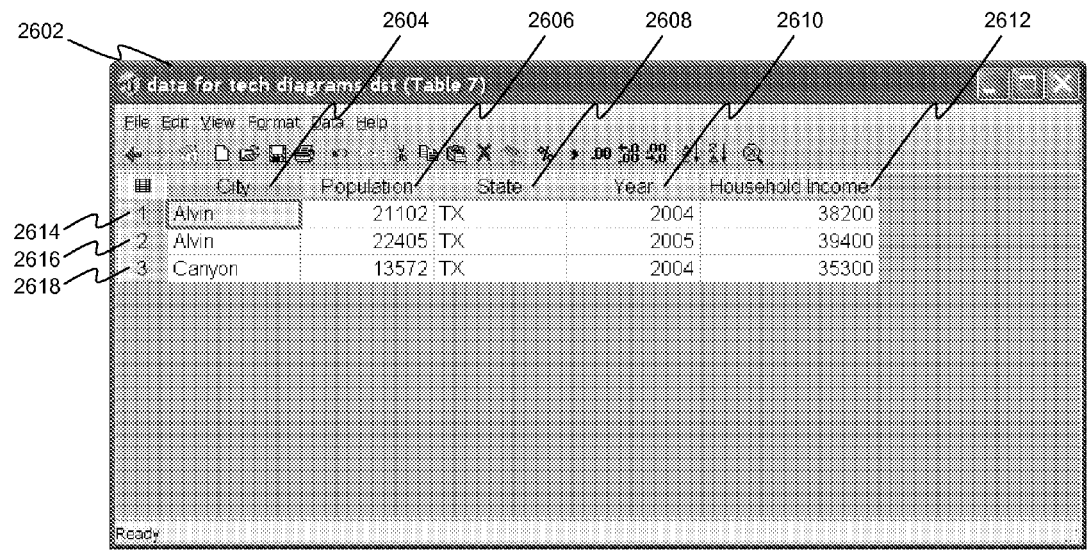
FIGS. 26A-27C illustrate exemplary tables and data object structure according to the summary and analysis module of FIG. 1A.
Figure 26B:
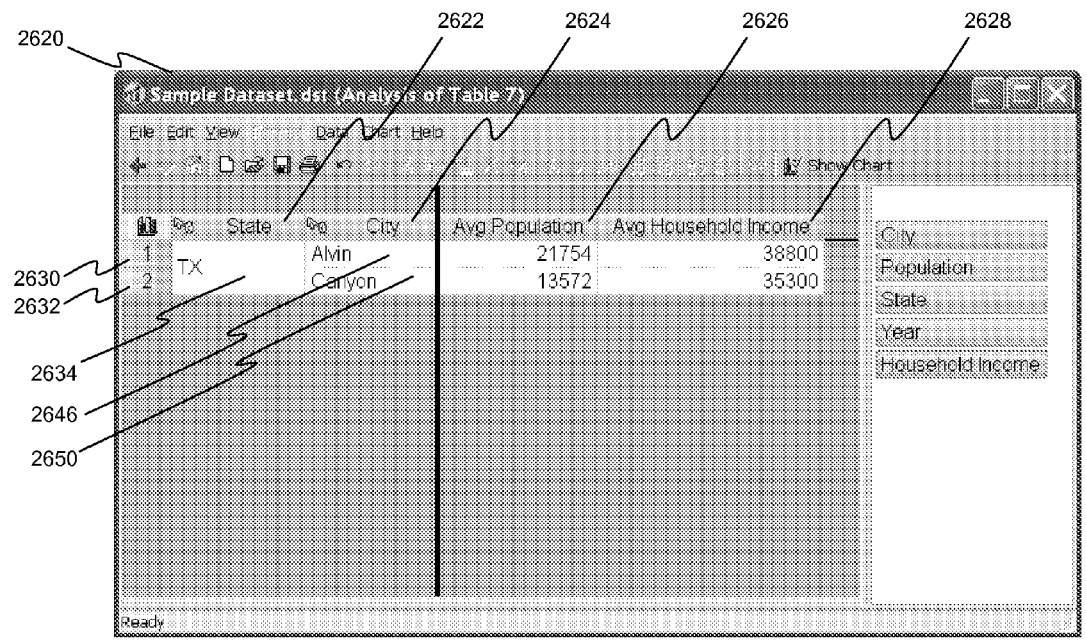

FIG. 26A shows source table 2602 (e.g. table 103), and FIG. 26B shows analysis table 2620 (e.g. resultant table 111) which is derived from source table 2602. Analysis table 2620 has two key columns "State" 2622 and "City" 2624. Within the higher-level key column "State" 2622, there is a single group header cell 2634 containing the value "TX"; within the scope of this header there are two lower-level sub-headers 2646 and 2650 containing the values "Alvin" and "Canyon" respectively. Summarized columns "Avg Population" 2626 and "Avg Household Income" 2628 are also present.

Figure 26C:
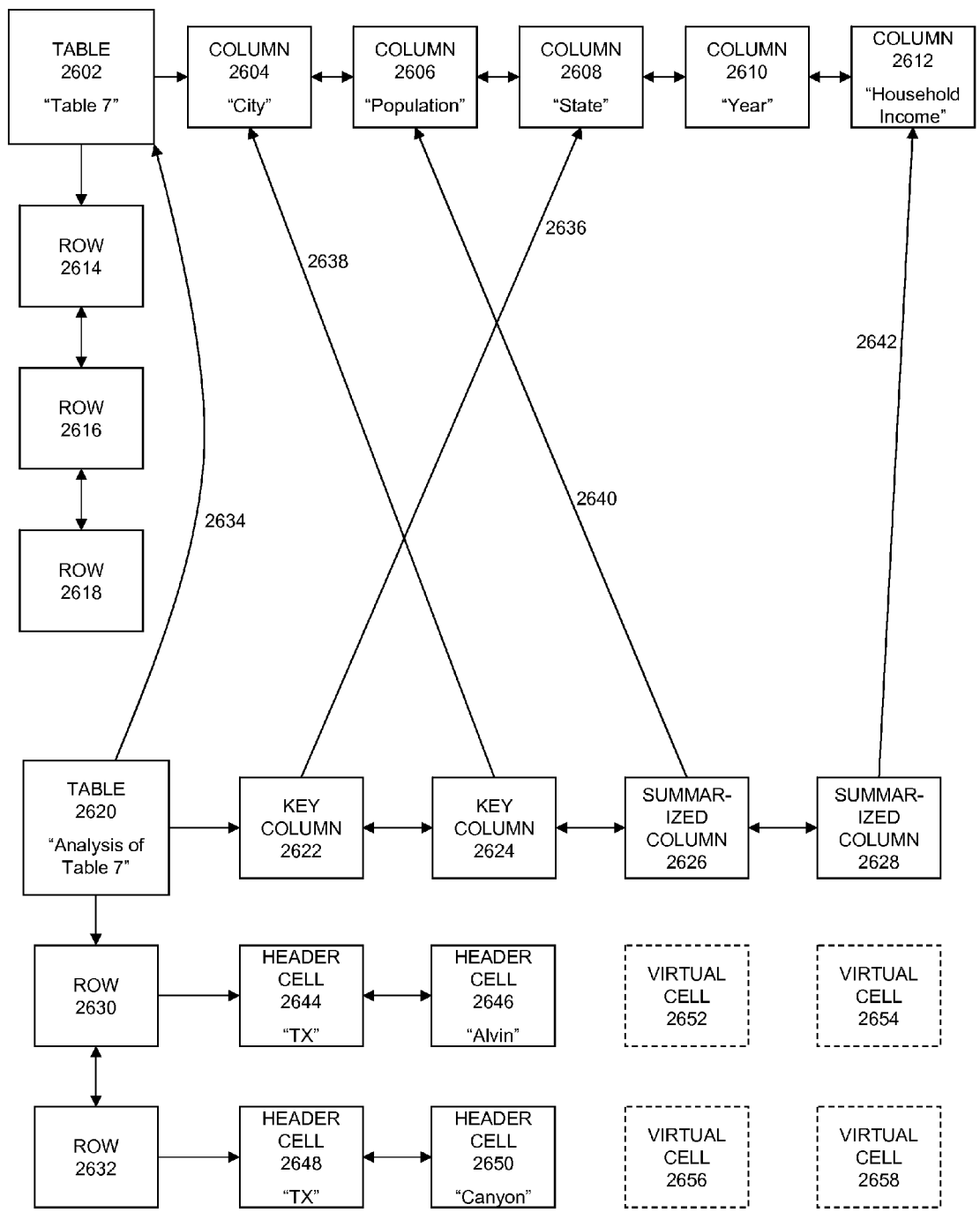

FIG. 26C shows the data objects used to represent tables 2602 and 2620. Analysis table 2620 has a reference pointer 2634 to source table 2602, and each column in analysis table 2620 has a reference pointer 2636, 2638, 2640 or 2642 to its corresponding column in source table 2602. The first two columns 2622 and 2624 in analysis table 2620 are designated as "key columns", and the next two columns 2626 and 2628 are designated as "summarized columns". Associated with the two key columns are header cells containing group header values. Lower-level header cells 2646 and 2650, which contain the values "Alvin" and "Canyon" respectively, correspond directly to cells 2646 and 2650 in FIG. 26B. The higher-level header cells 2644 and 2648 both contain the same value "TX". This indicates that they are to be treated as a higher-level grouping, corresponding to group header cell 2634 in FIG. 26B.

A summarized column object generally does not have cell objects associated with it, unless the user has typed in a corrected value for a cell. The values of the virtual cells 2652, 2654, 2656 and 2658 are dynamically determined when needed. As an example of this, when a value is required for virtual cell 2652, the summary module 108 first obtains the values "TX" and "Alvin" from header cells 2644 and 2646. The program then searches source table 2602 for rows with matching values "TX" and "Alvin" in the corresponding columns "State" 2608 and "City" 2604. Two such matching rows are found, rows 2614 and 2616. The program then uses reference pointer 2640 to locate column "Population" 2606 in source table 2602. It then extracts the value for this column from each of the two matching rows 2614 and 2616, and aggregates the values using the appropriate method (in this case, by averaging the values). This aggregated value is then used as the value for virtual cell 2652 in analysis table 2620. It will be understood that other statistical analysis methods such as median, mean, mode, sum, minimum, maximum, and difference may be used to aggregate the values in a column.

FIGS. 27(A-C) illustrate an example of an analysis table (e.g. resultant analysis table 111) using horizontal group headers provided by the analysis module 110. FIG. 27A shows source table 2702 (e.g. table 103), and FIG. 27B shows analysis table 2718 which is derived from source table 2702. Analysis table 2718 has one key column "Year" 2720 and three summarized columns 2736, 2738 and 2740 under a set of horizontal group headers. The higher-level group header is "State" 2726 and the lower-level group header is "City" 2730. The table displays the value "TX" in group header cell 2728. Beneath that are two header cells 2732 and 2734 containing the values "Alvin" and "Canyon" respectively. In addition a grand total column 2740 is included beneath the horizontal group headers. There are two regular rows 2722 and 2723 and one grand total row 2724 in analysis table 2718.

FIG. 27C shows the data objects used to represent source table 2702 and analysis table 2718. There is a reference pointer 2766 from analysis table 2718 to source table 2702. One key column object 2720 is present, and has a reference pointer 2767 to the corresponding column "Year" 2704 in source table 2702.

After key column 2720 is a "hidden marker column" 2760. This marker column is not visible to the user; it is used to delineate the start of the horizontal group header set. The marker column 2760 has reference pointers 2768 and 2770 to columns "State" 2706 and "City" 2708 in source table 2702. These indicate that these two columns 2706 and 2708 are to be used as horizontal group headers. The marker column 2760 also has a reference pointer 2772 to column "Population" 2710 in source table 2702. This indicates that column 2760 provides the data values to be aggregated for this set of horizontal group headers.

In this way, redundant values in column 2704 are consolidated to form column 2720. Redundant values in column 2708 are consolidated to form row 2730 and associated values (2723, 2734). Redundant values in column 2706 are consolidated to form row 2726 and values 2728. Accordingly, values in corresponding columns are aggregated. For example, values for population of each city (e.g. consolidated cells "Alvin" and "Canyon") are aggregated or averaged (e.g. as avg. population in values).

Following the marker column 2760 are two summarized column objects 2736 and 2738 and a total column object 2740. Header cells 2742, 2744 and 2746 contain the key column values for the three rows in the table. The horizontal group header values are shown in "virtual header cells" 2748, 2750, 2752, 2754, 2756 and 2758. These values are not actually kept in cell objects, but instead are stored within the column object shown beneath.

As an example of the process for determining the value of virtual cells in analysis table 2718, consider virtual cell 2778. To determine the value for this cell, the program first determines the values of the appropriate header/virtual header cells 2742, 2748 and 2750, which contain "2004", "TX" and "Alvin" respectively. The program then searches source table 2702 for rows containing these same values in the corresponding columns "Year" 2704, "State" 2706 and "City" 2708. A single row 2712 is found to match, and its value for column "Population" 2710 is retrieved. This single value is then "aggregated" (in this case, averaged), and the result used as the dynamic value for virtual cell 2778.

The data objects for a summary/analysis table (e.g. table 111) are refreshed dynamically as changes are made to the source table. FIG. 28 illustrates the method used to dynamically build a summary/analysis table as provided by the summary module 108 and analysis module 110. This method is applied both to initially build a new summary/analysis table, and to refresh its contents if the source table changes. Each table object contains a flag to indicate whether its row or column objects need to be refreshed. Any time the data analysis system 100 modifies a source table, the flag in the target table is set to indicate a refresh is needed. Any time the data analysis system 100 accesses the target table, this flag is checked first; if the flag is set, the data analysis system 100 uses the method illustrated in FIG. 28 to refresh the table and then clears the flag.

The method in FIG. 28 is used separately to refresh row objects and to refresh the column objects for each set of horizontal group headers. The data analysis system 100 starts at Step 2802 and proceeds to Step 2804 to check if the key columns (in the case of refreshing rows) or the horizontal group headers (in the case of refreshing columns) have changed since the last time the table was refreshed; if so then all existing rows or all existing columns under the group header are deleted in Step 2806. The data analysis system 100 then proceeds to Step 2808, to repeat the steps that follow for each row found in the source table. At Step 2810, the key values are retrieved from the source table row corresponding to the key columns or horizontal group headers in the target table. At step 2812, the target table is checked for an existing row/column having these key values in the appropriate header cells. If such a row/column is found (Step 2814), a flag is set on the row/column object to indicate that it is in use (Step 2816). If no such row/column is found in the target table, a new row/column object is added to the target table with the appropriate key values (Step 2818); the new row/column object is also flagged to indicate that it is in use. At Step 2820 the sequence from Step 2808 is repeated if more rows remain in the source table to be processed. Once all source row objects have been processed, Step 2822 deletes any rows or columns in the target table that have not been flagged as in use. When deleting rows, Step 2822 does not delete manual rows. When deleting columns, only columns under the horizontal group header set in question are deleted.

Correction Structures—FIG. 29(A-D)

Figure 29A:
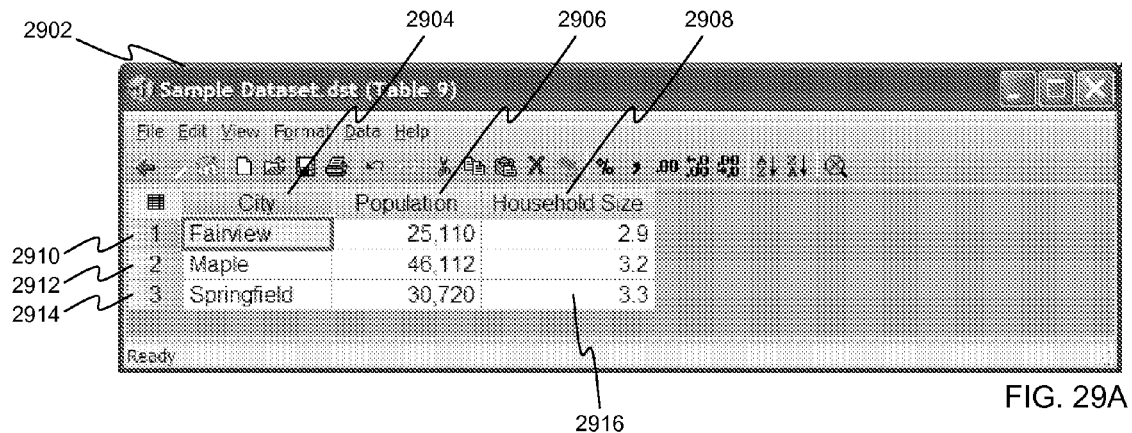
FIGS. 29A-29D illustrate exemplary tables and data object structure according to the corrections module of FIG. 1A.
Figure 29B:
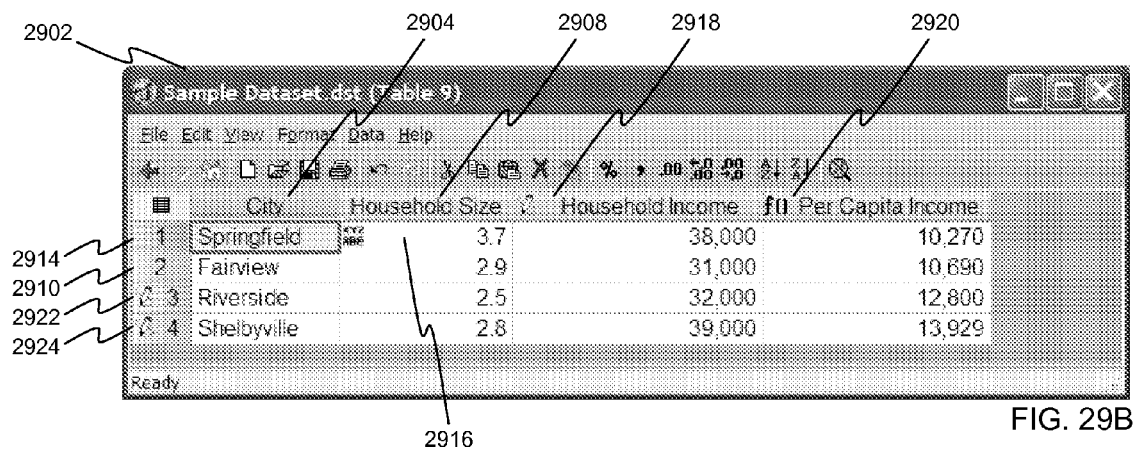
Figure 29C:
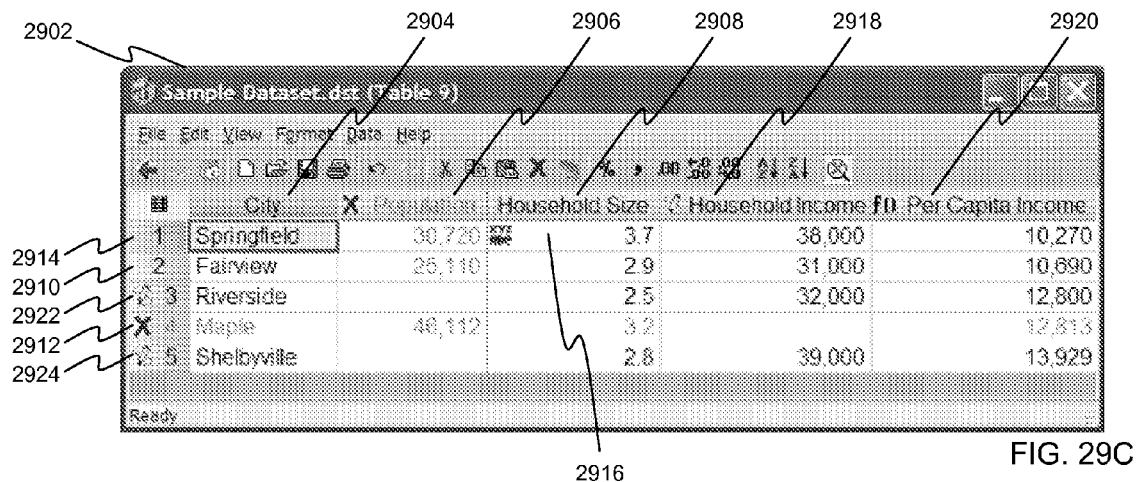

FIG. 29A shows an example of an input table 2902 (e.g. table 103 or resultant table 111) with three rows and three columns. FIG. 29B shows the same table after the user has made some corrections. Row 2912 has been deleted, and the other two original rows 2910 and 2914 have been reordered. Two manual rows 2922 and 2924 have been added and values typed into their cells. Column "Population" 2906 has been deleted. Manual column "Household Income" 2918 has been added and values typed into its cells. A formula column 2920 has also been added, containing the formula "=[Household Income]/[Household Size]". Finally, the value in cell 2916 has been changed from "3.3" to "3.7". FIG. 29C shows the same table with the same corrections, except that the user has selected the option to view deleted items; in this figure deleted row 2912 and deleted column 2906 are visible again, but are marked with icons to indicate that they have been deleted.

Figure 29D:
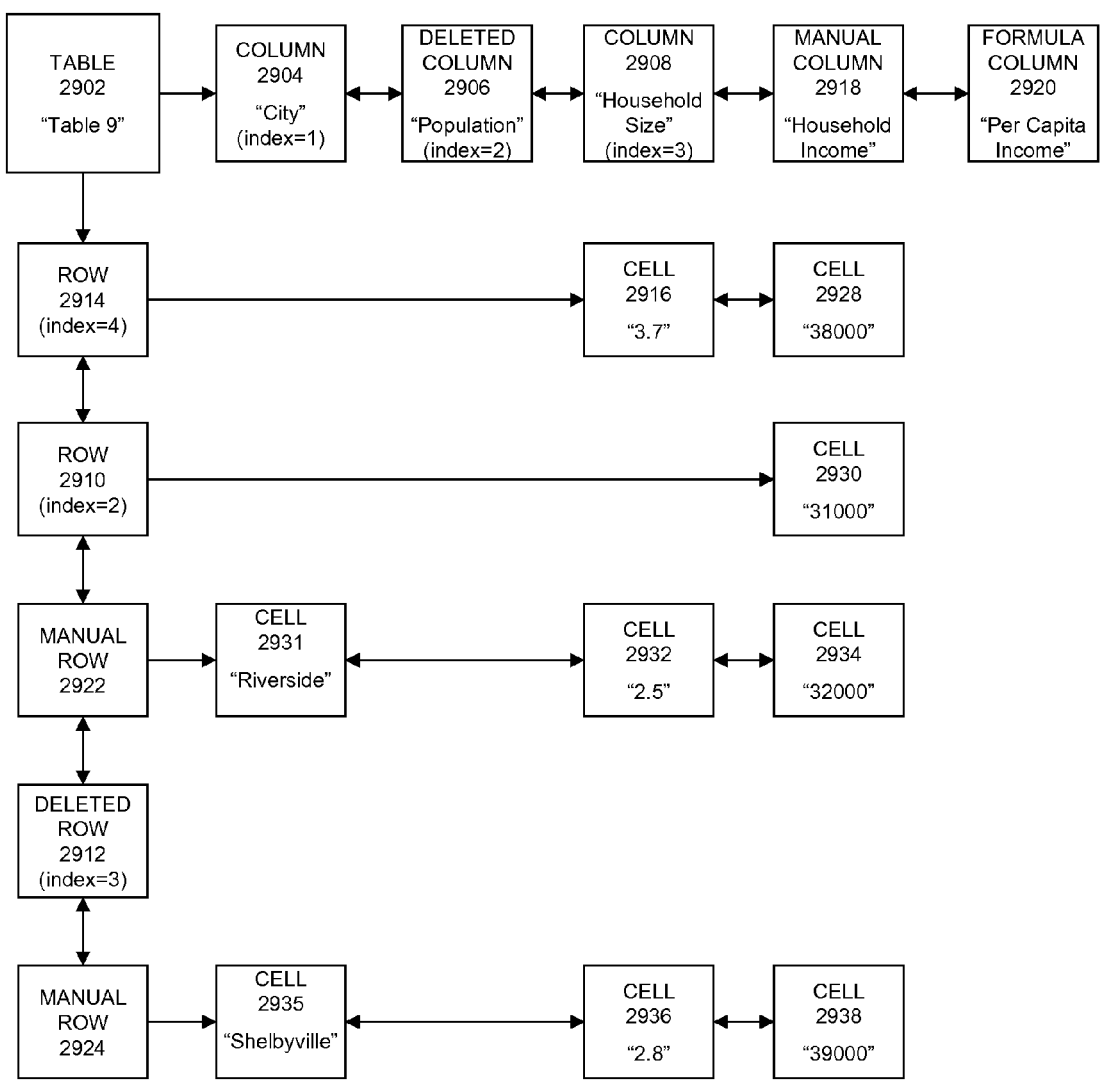

FIG. 29D shows the data objects used to represent table 2902. Row object 2912 and column object 2906 have been marked as "deleted". Manual rows 2922 and 2924 and manual column 2918 are present, with cell objects containing their values. In addition, cell object 2916 is present to contain the corrected value for this cell. Formula column 2920 is present but has no cell objects associated with it; its cell values are calculated dynamically when needed.

Figure 33A:
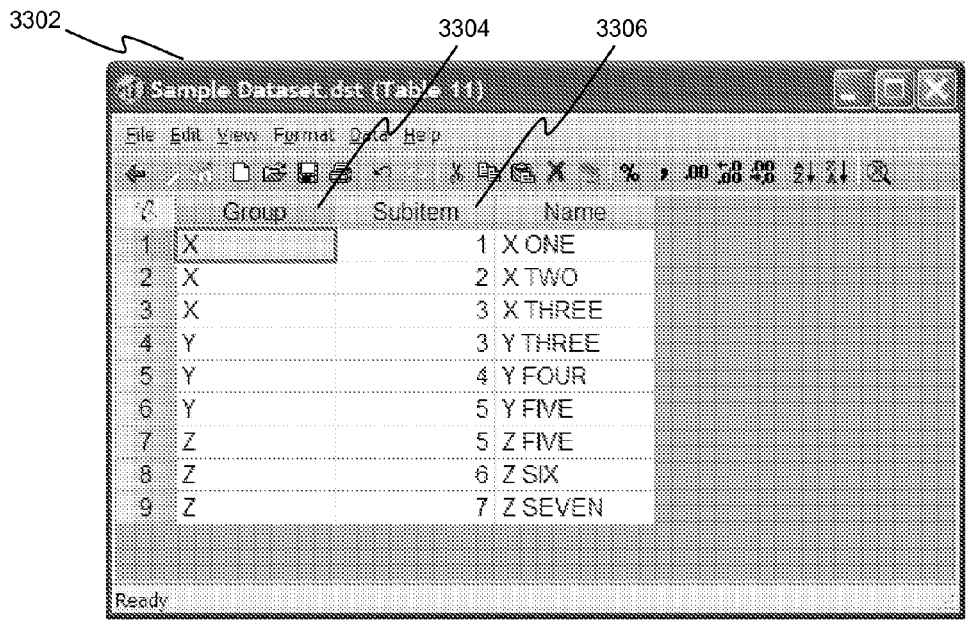
Figure 33B:
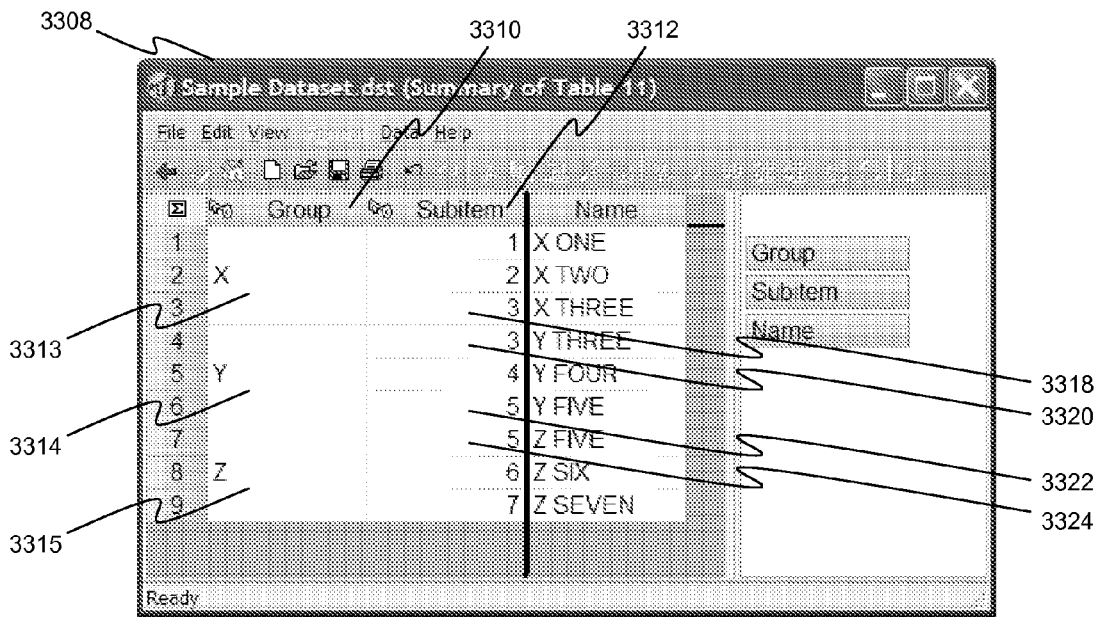
Figure 33C:
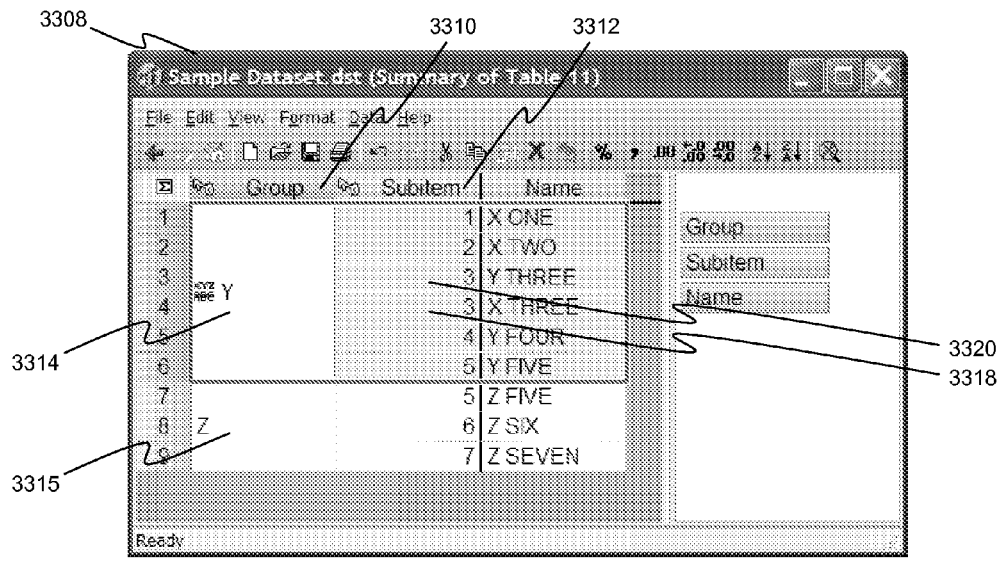
Figure 33D:
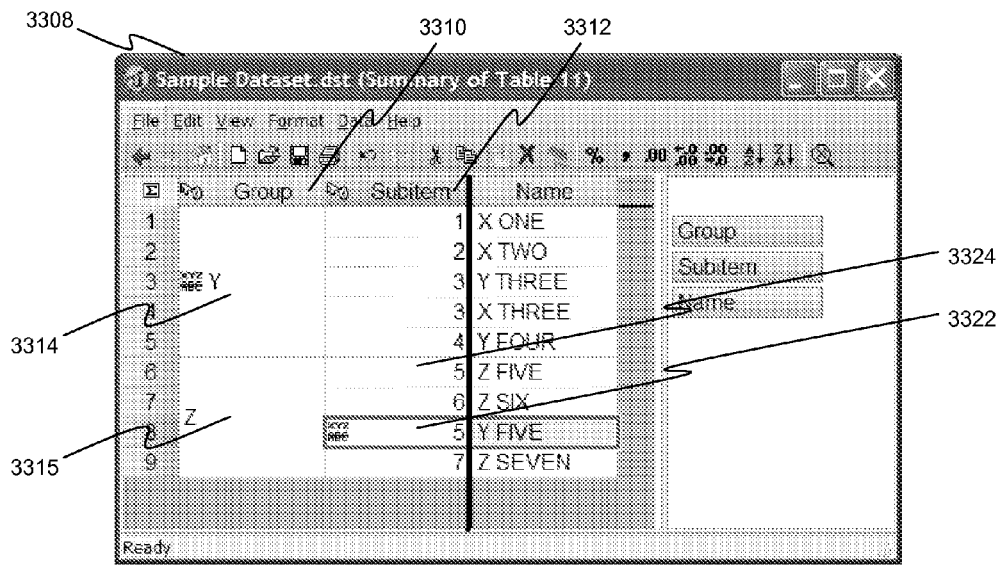
Figure 34:
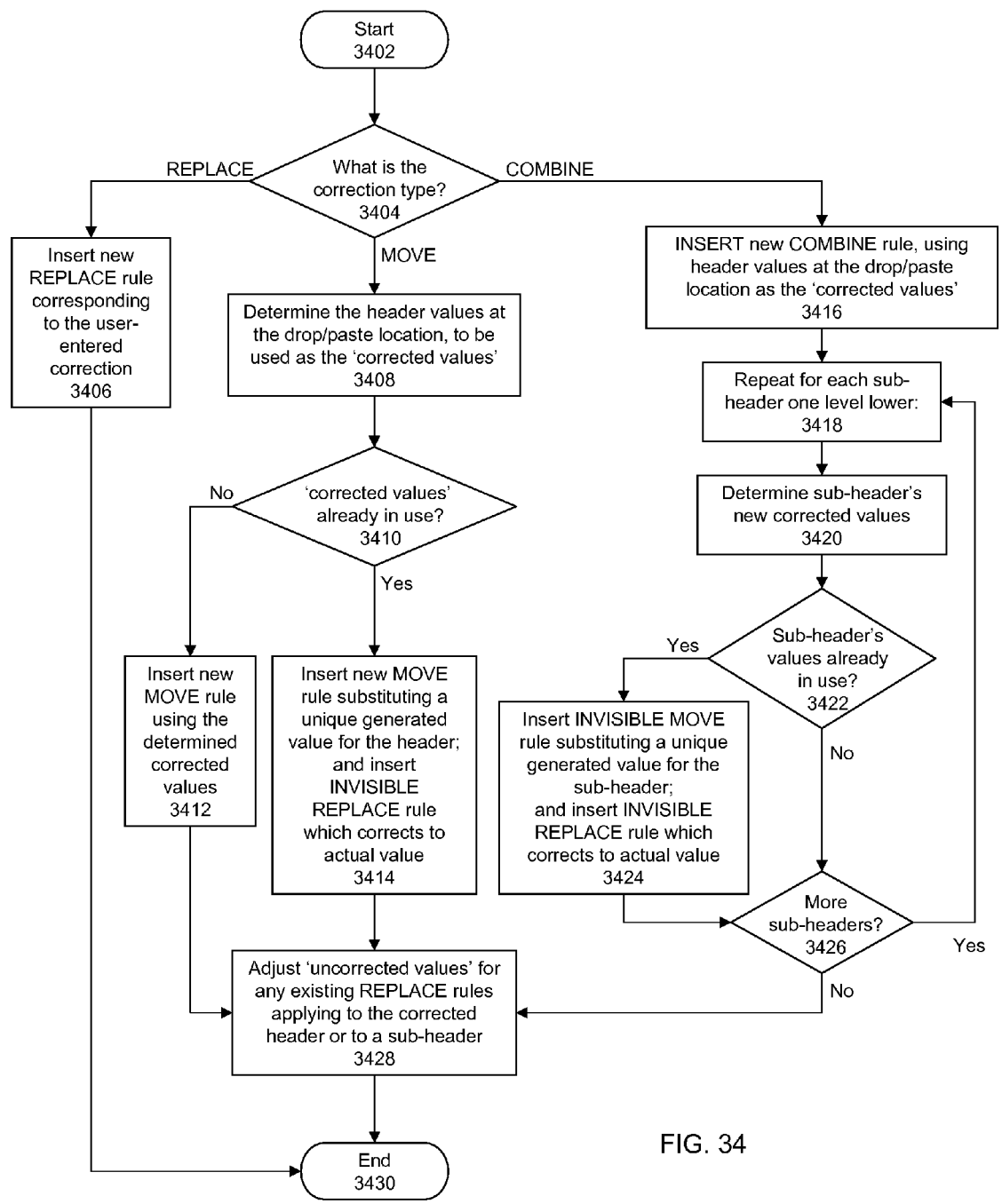
FIG. 34 illustrates a method for adding correction rules.
Figure 35:
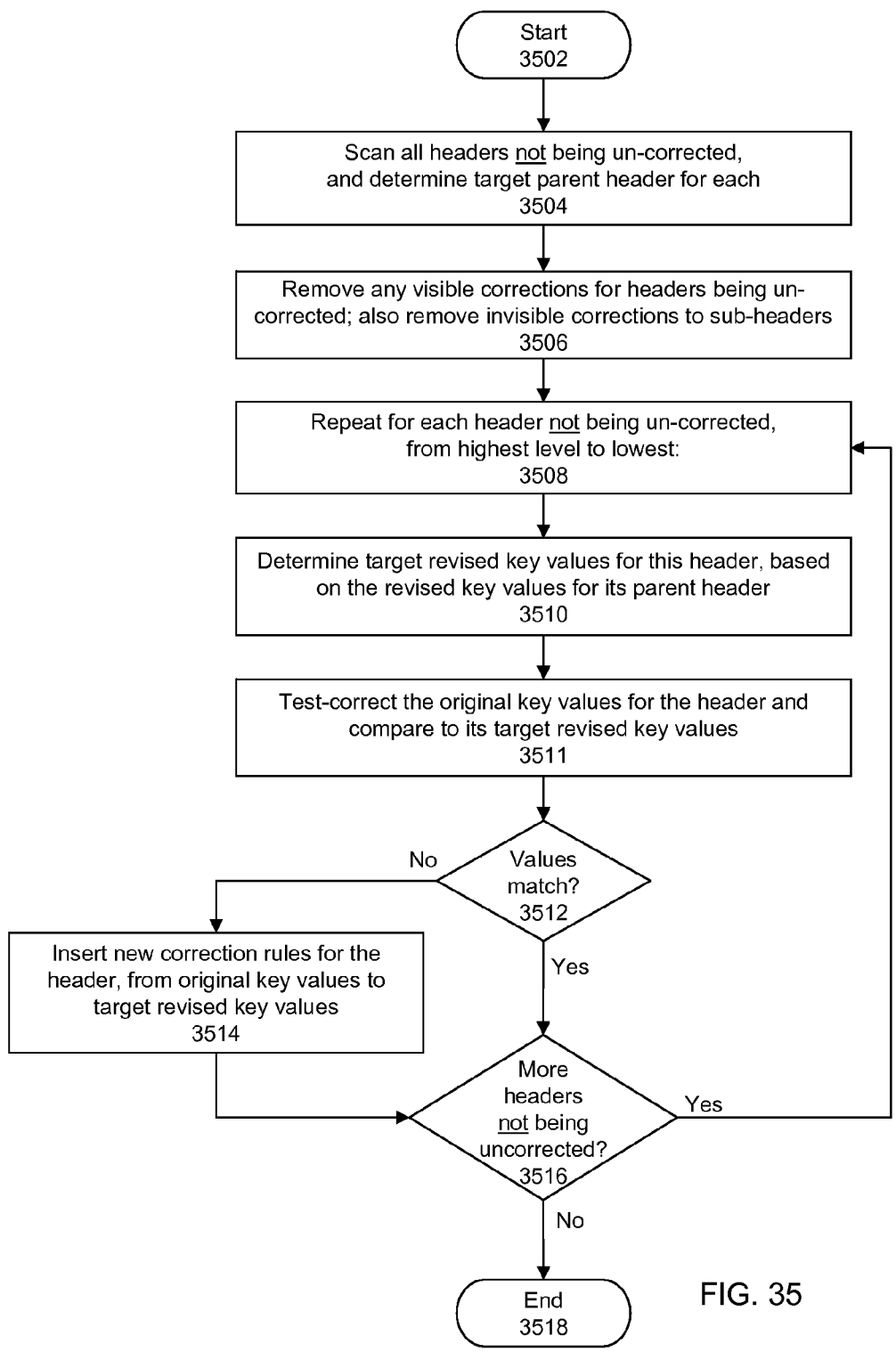
FIG. 35 illustrates a method for modifying correction rules.

Summary/Analysis Table Correction Structures—FIG. 30, FIG. 31, FIG. 32(A-I), FIG. 33(A-H), FIG. 34, FIG. 35

Additional data structures are used to handle moving, combining and inserting headers within a summary or analysis table. Associated with each key column and each horizontal group header is a list of correction rules that indicate what corrections apply to headers at the corresponding level. Each rule specifies a correction type: "combine", meaning the user dropped one header onto another; "move", meaning the user moved a lower-level header into the scope of a different higher-level header than before; and "replace", meaning that the user overtyped a header value. Each rule also specifies a value translation, taking an original value for a header and correcting it to a new value. For lower-level headers, the values provided are "fully qualified", meaning that values are provided for the header and for each corresponding higher-level header. Each rule also can be flagged as "invisible".

FIG. 30 shows some examples of correction rules. Table 3002 is a summary table with three key columns "Region" 3004, "Division" 3006 and "Sales Rep" 3008, with "Region" 3004 being the at highest header level and "Sales Rep" 3008 at the lowest level. As an example of a rule for key column "Region" 3004, rule 3010 specifies that the sub-items for header cell 3012 (Region "CENTRAL") should be combined with the sub-items for header cell 3014 (Region "EAST"). For key column "Division" 3006, rule 3016 specifies that the sub-items for header cell 3020 (Region "NORTH", Division "Consumer") should be combined with the sub-items for header cell 3018 (Region "EAST", Division "Consumer"). For key column "Sales Rep" 3008, rule 3022 specifies that item 3024 (Sales Rep "MARIE TURNER") should be moved from header cell 3026 (Region "CENTRAL", Division "Government") to header cell 3028 (Region "CENTRAL", Division "Industrial"). Also for key column "Sales Rep" 3008, rule 3030 specifies that the value for item 3032 (Sales Rep "CARL PARKER" in Region "East", Division "Industrial") should replaced with the value "KARL PARKER".

FIG. 31 summarizes when and how correction rules are applied by the corrections module 112. For "combine" or "move" rules, the rules are applied to the source table data as it is retrieved, before it is used to build the summary/analysis table structure. For "replace" rules, the rules are applied to the summary/analysis table data as it is displayed. "Combine" or "move" rules are re-applied repeatedly, as long as a rule is found which matches the data. "Replace" rules are only applied once. This arrangement allows the user to make corrections freely without creating circular dependencies within the rules.

FIGS. 32(A-I) illustrate a sequence of summary table corrections made by the user, and show the corresponding correction rules which are created. This sequence also illustrates the special handling required for the removal of corrections. FIG. 32A shows table 3202, which is the source table. FIG. 32B shows summary table 3208, with two key columns "Group" 3210 (the higher level key column) and "Subitem" 3212 (the lower level key column). In column "Group" 3210 are three group header cells 3213, 3214 and 3215 with the values "A", "B" and C" respectively. Each of these has a number of sub-items within its scope.

Figure 32A:
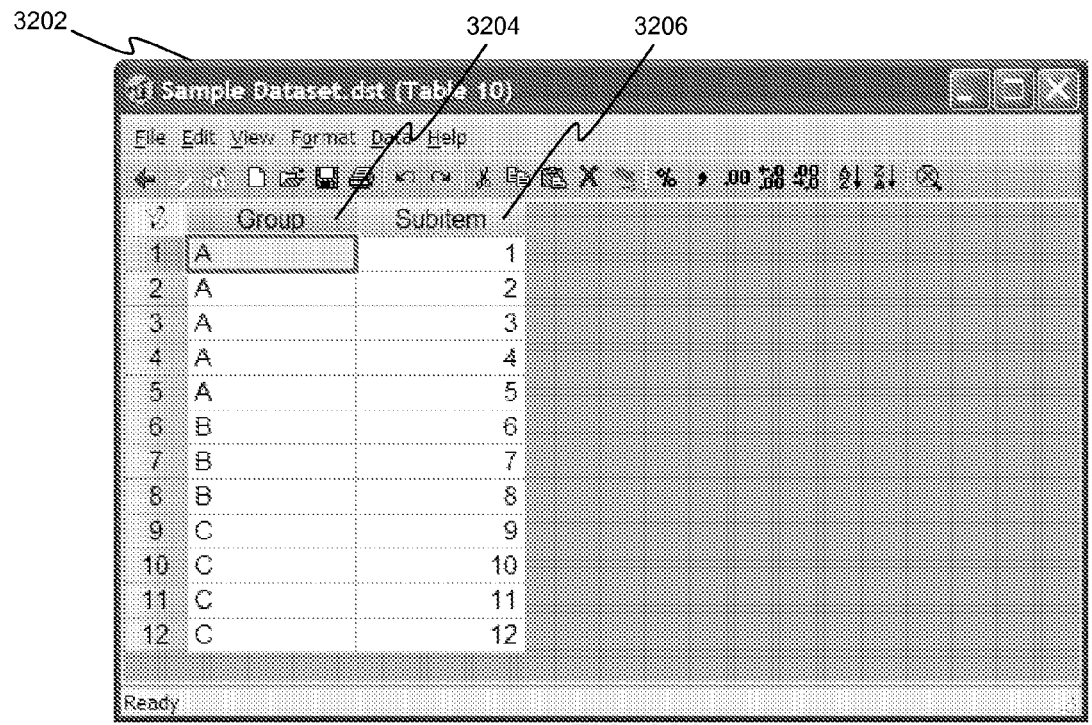
Figure 32B:
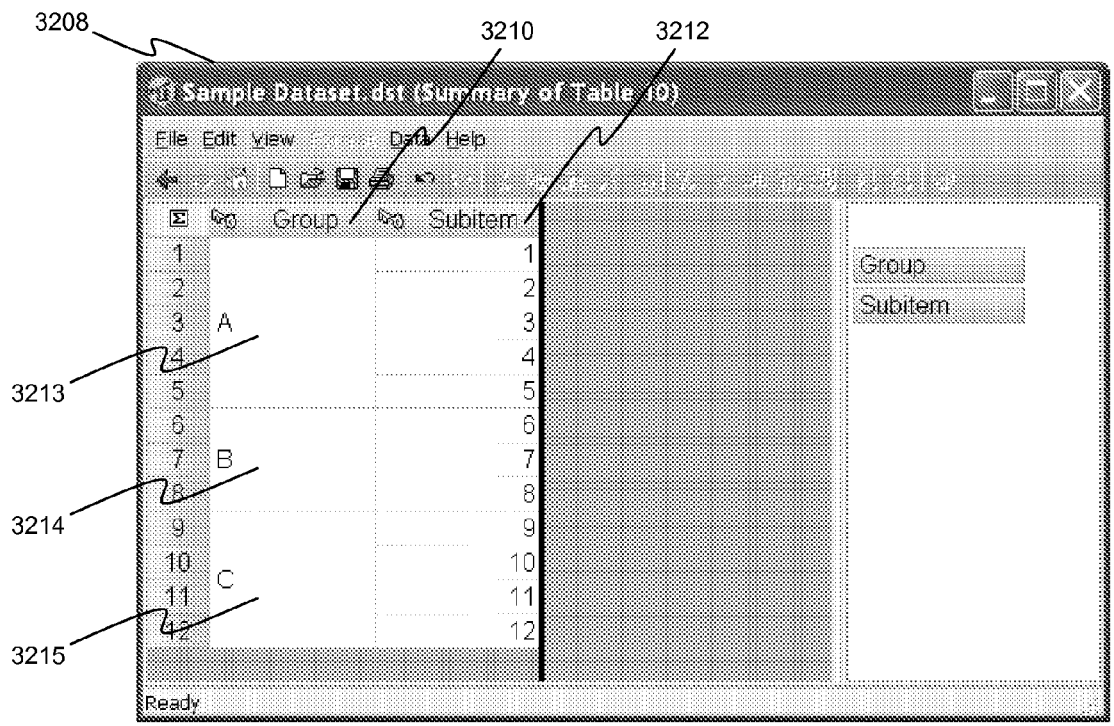
Figure 32C:
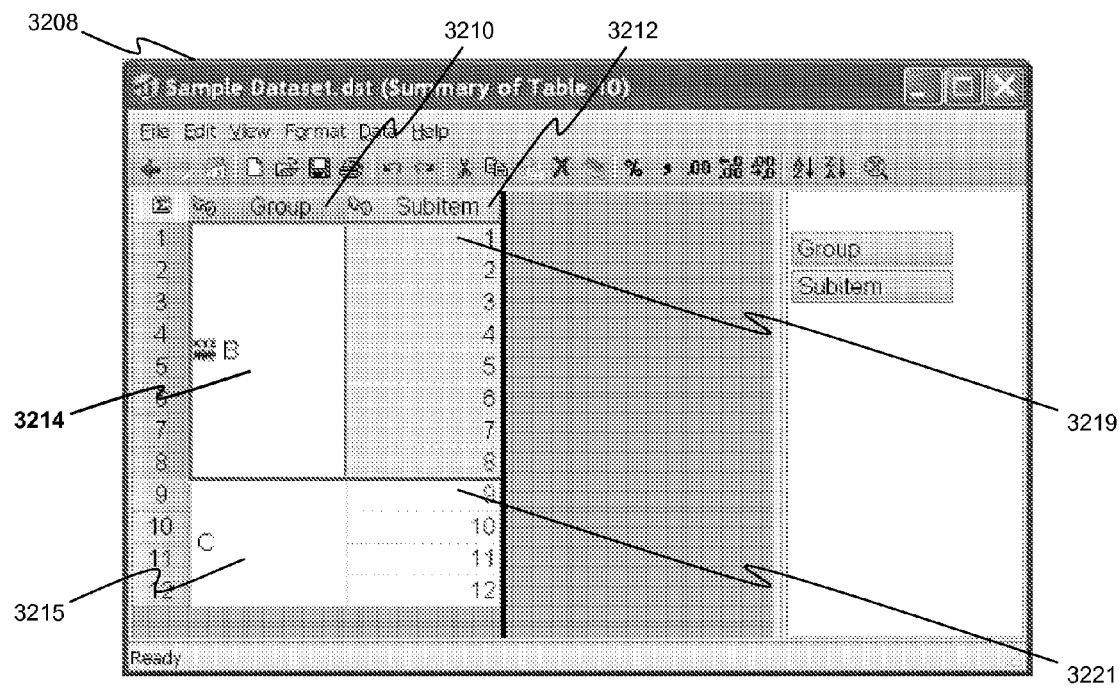

In FIG. 32C, the user has dragged Group "A" (3213 in the previous figure) and combined it with Group "B" 3214. This has resulted in the creation of the corresponding rule 3218 in the list of rules 3216 for key column "Group" 3210.

Figure 32D:
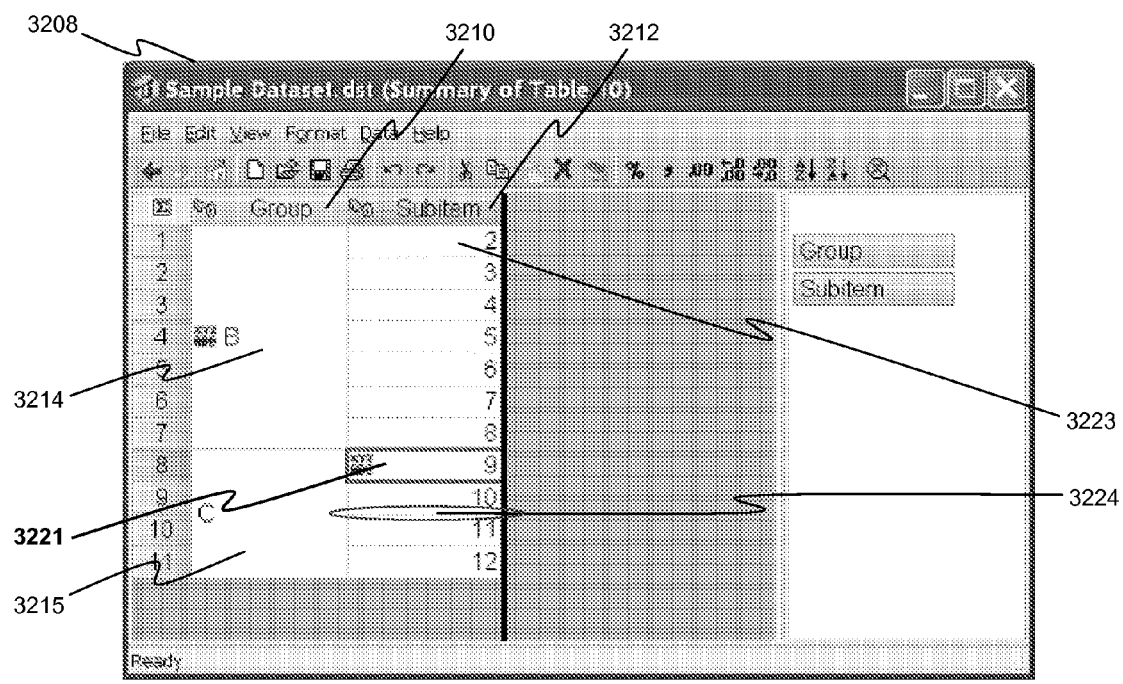

The user then selects header cell 3219 (Group "B" Subitem "1") and drops it onto header cell 3221 (Group "C" Subitem "9"). As shown in FIG. 32D, this has resulted in the creation of the corresponding rule 3222 in the list of rules 3217 for key column "Subitem" 3212.

Figure 32E:
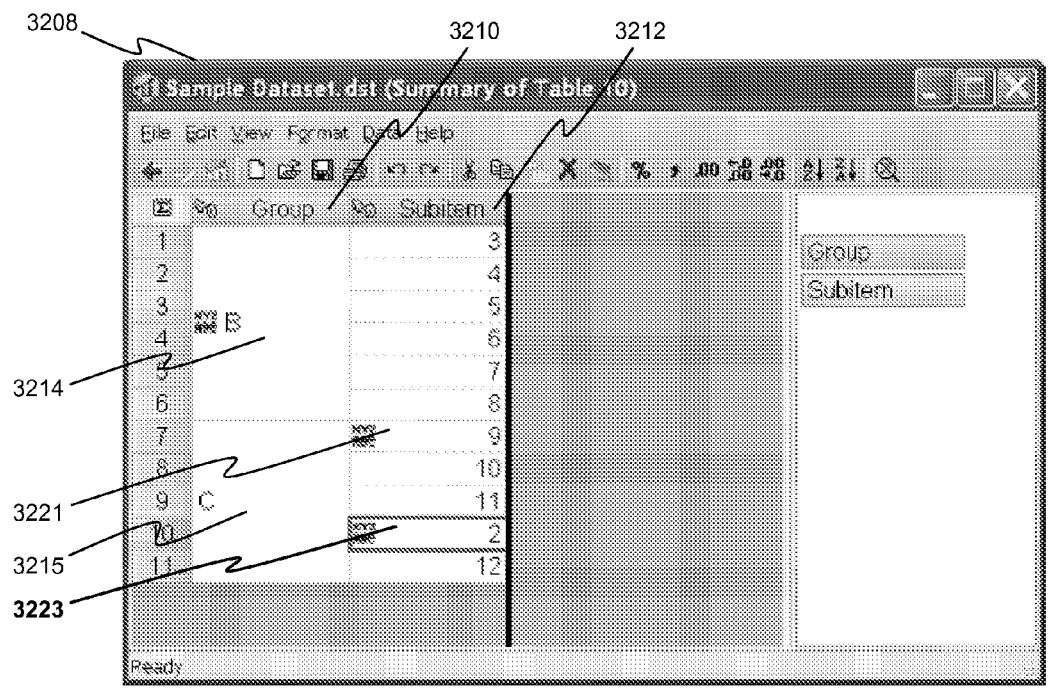

The user then selects header cell 3223 (Group "B" Subitem "2") and moves it to a new position 3224 in Group "C" 3215. As shown in FIG. 32E, this has resulted in the creation of the corresponding rule 3228.

Figure 32F:
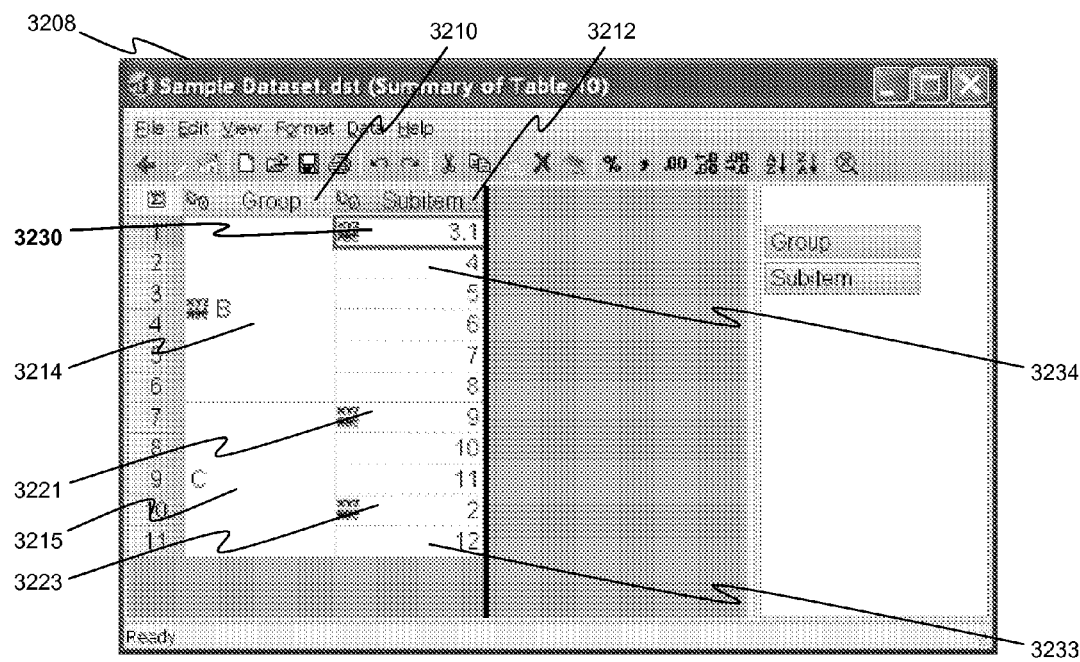

In FIG. 32F, the user has overtyped header cell 3230 (Group "B", Subitem "3") with the value "3.1". This has resulted in the creation of the corresponding rule 3232.

Figure 32G:
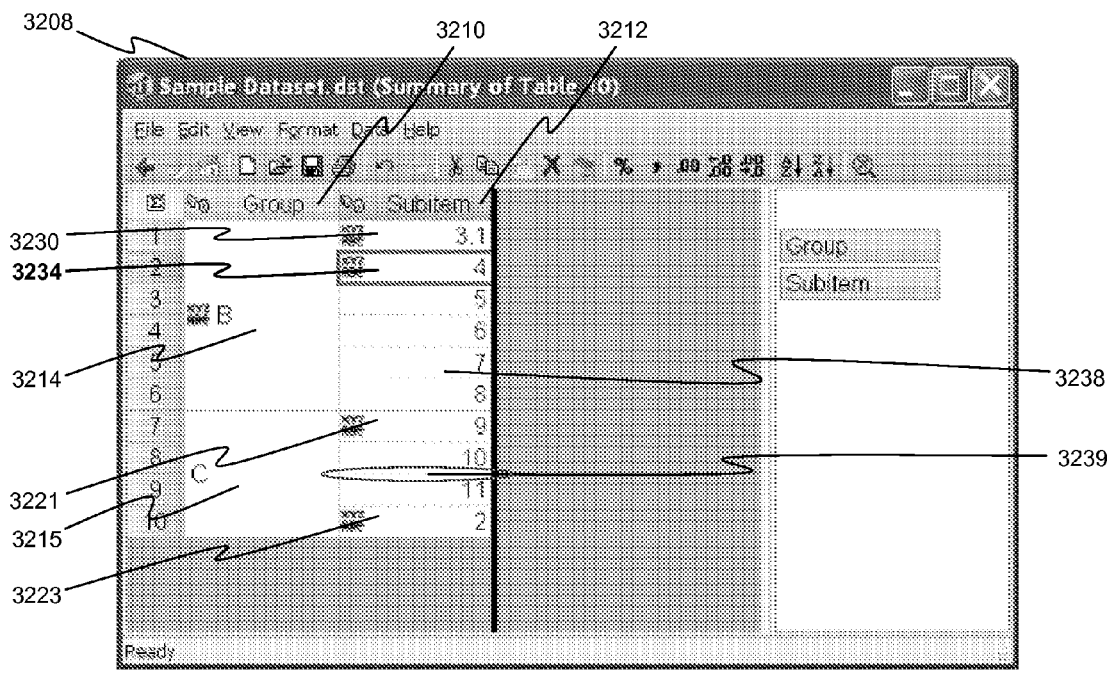

The user then selects header cell 3233 (Group "C", Subitem "12") and drops it onto header cell 3234 (Group "B", Subitem "4"). As shown in FIG. 32G, this has resulted in the creation of the corresponding rule 3236.

Figure 32H:
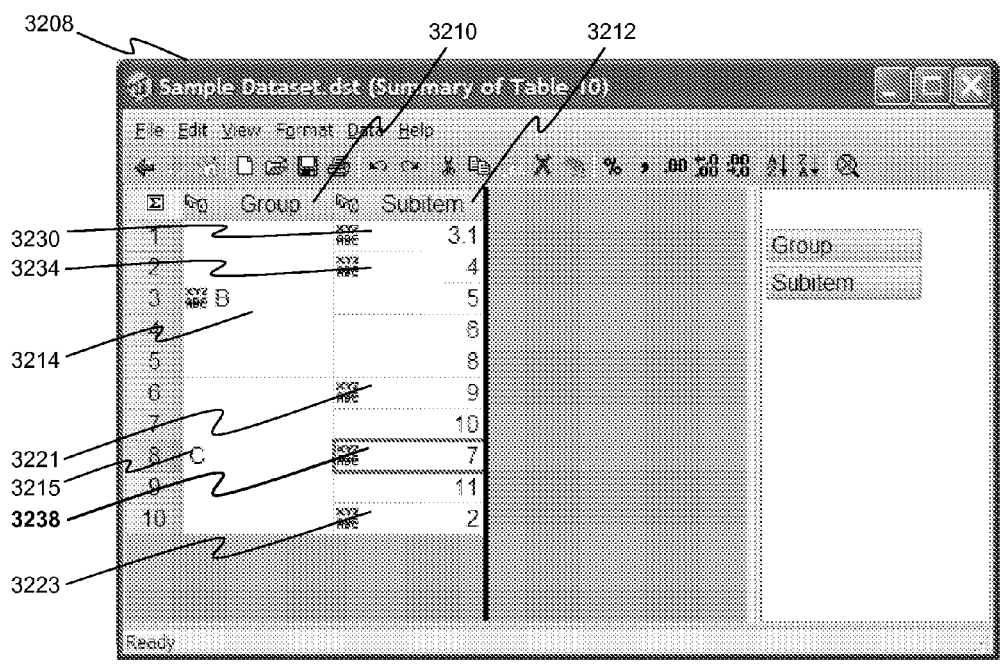

As a final correction, the user selects header cell 3238 (Group "B", Subitem "7") and moves it to position 3239 within the scope of header cell 3215 (Group "C"). As shown in FIG. 32H, this has resulted in the creation of the corresponding rule 3240.

Figure 32I:
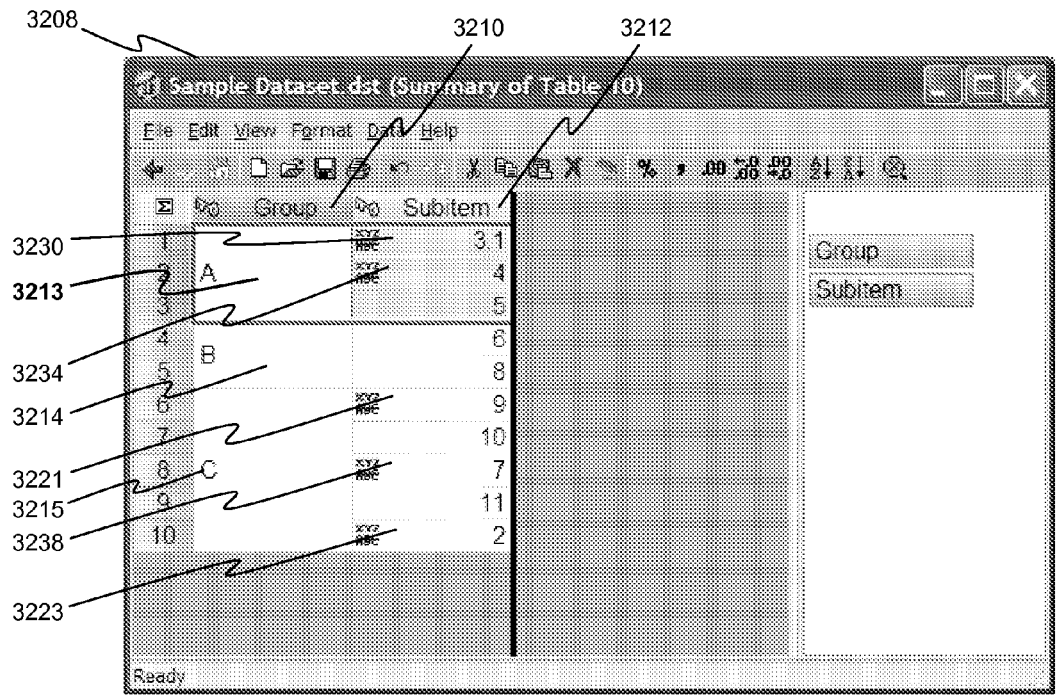

The user then selects header cell 3214 (Group "B") and invokes the command to remove its correction. As shown in FIG. 32I, this has resulted in header cell 3213 (Group "A") reappearing. Within the scope of this header are three sub-items that had previously been under header cell 3214 ("Group "B"). Two of these sub-items 3230 and 3234 had been corrected, and the corrections have been retained. Two sub-items 3221 and 3223 had been combined/moved into Group "C" 3215. These sub-items remain in Group "C".

As also shown in FIG. 32I, in addition to deleting a correction rule, the corrections module 112 has also made changes to the remaining rules. In rules 3222, 3228, 3232 and 3236, instances of Group "B" have been changed to "A". This is because the table items they referred to have returned to Group "A". In rule 3240, however, Group "B" was not changed to "A" because the sub-item in question originated in Group "B". The method for adjusting rules appropriately when other rules are deleted will be described below.

FIGS. 33(A-D) illustrate the handling of situations where the user makes corrections which would result in duplicate header cells within the table data structures. The corrections module 112 keeps the headers distinct despite their having the same value. FIG. 33A shows source table 3302, and FIG. 33B shows summary table 3308 which is derived from source table 3302. Summary table 3308 has two key columns, "Group" 3310 which is higher-level, and "Subitem" 3312 which is lower level. There are three header cells 3313, 3314 and 3315 for key column "Group" 3310, with the values "X", "Y" and "Z" respectively. There are two items 3318 and 3320 that both have a value of "3" for key column "Subitem" 3312; however this does not cause any duplication because they are under different higher-level headers. Similarly, there are two items 3322 and 3324 with a value of "5" for key column "Subitem" 3312; they are also under different higher-level headers.

The user then selects header cell 3313 (Group "X"), and drops it onto header cell 3314 (Group "Y"). As shown in FIG. 33C, items 3318 and 3320 are now both in the same higher-level group.

FIG. 33C also shows that, in order to keep the items distinct within the data structures, the corrections module 112 has used invisible corrections in conjunction with a unique system-generated value. In the list of rules 3326 for key column "Group" 3310, a rule has been added which combines Group "X" with Group "Y", as requested by the user. The corrections module 112 has also created two "invisible" rules in list of rules 3328 for key column "Subitem" 3312. "Invisible" means that the user does not see an icon indicating a correction, and is not given the ability to remove the correction directly. First there is an invisible correction 3332 that moves header cell 3318 into Group "Y", and also converts the value of header cell 3318 to a unique system-generated value. Then there is an invisible correction 3334 that replaces the system-generated value with the original value "3". Because move-type corrections are applied before the summary table structure is built, but replace-type corrections are applied afterward, the items 3318 and 3320 are kept distinct within the data structures.

To illustrate another way the user can create duplicate headers, FIG. 33D shows summary table 3308 after the user has moved header cell 3322 to a new position in Group "Z". As a result, header cells 3322 and 3324 are now in the same group, both having the value "5". In the list of rules 3328, two rules have been added. Rule 3336, which is visible, moves header cell 3322 as requested, but also changes its value to a unique system-generated value. Invisible rule 3338 then replaces the unique system-generated value with the original value "5".

The same technique is applied when manual rows or group headers are added to a summary/analysis table (not illustrated). The manual header cells are each assigned a unique system-generated value, and an invisible rule then replaces the system-generated value with the user-entered value for the cell.

FIG. 34 illustrates the method for adding a correction rule. Starting at Step 3402, the corrections module 112 proceeds to Step 3404 to determine the correction type.

If adding a replace-type correction, Step 3406 inserts a new rule corresponding to the user-entered correction, and then the method ends at Step 3430.

If adding a move-type correction, the corrections module 112 proceeds from Step 3404 to Step 3408, and determines the corrected values for the rule, based on the location the corrected item was dropped by the user. At Step 3410 the corrections module 112 checks if the corrected values are already in use for any existing table header cell. If not, Step 3412 inserts a new rule using the corrected values. If so, Step 3414 inserts a move-type rule that corrects to a unique system-generated value, and inserts an invisible replace-type rule that corrects back to the actual value. Then, in either case, Step 3428 adjusts any existing replace-type rules that had applied to the original values so that they now apply to the corrected values instead. The method then ends at Step 3430.

If adding a combine-type correction, the corrections module 112 proceeds from Step 3404 to Step 3416, which inserts a new combine-type rule as requested by the user. At Step 3418 it then repeats the steps that follow for each sub-header that is one level lower than the corrected header. Step 3420 determines the sub-header's new values. Step 3422 checks if the new values are already in use. If not the corrections module 112 proceeds to Step 3426; if so Step 3424 inserts an invisible move-type rule that changes the value to a unique system-generated value, and inserts an invisible replace-type rule that changes back to the original value. Step 3426 then checks if more sub-headers are to be processed. If so, the corrections module 112 goes back to Step 3418. If not, the corrections module 112 proceeds to Step 3428 where it adjusts any existing replace-type rules that had applied to the original values so that they now apply to the corrected values instead. The method then ends at Step 3430.

To remove a replace-type correction, the corresponding rule is simply deleted. Removing move-type and combine-type corrections require the method illustrated in FIG. 35. Starting at Step 3502, the corrections module 112 proceeds to Step 3504 where it scans all headers that are not being un-corrected and that are not at the highest header level, and determines for each header a "target parent header". The target parent header is assigned such that once a header is moved under a higher-level header, or is combined with another header, it will remain with the same higher-level header unless it is specifically un-corrected. At Step 3506, the corrections module 112 deletes any rules for visible corrections that apply to the header(s) being un-corrected. It also deletes any invisible rules for sub-headers whose values correspond to the rule being deleted. At Step 3508 the corrections module 112 then repeats the steps that follow for each header previously scanned in Step 3504. Step 3510 first determines revised values for the header, based on the revised values for its assigned target parent header. Step 3511 then test-corrects the original uncorrected values for the header, and compares the test-corrected values to the revised values determined in Step 3510; if the values do not match, Step 3514 inserts new rules to correct from the original uncorrected values directly to the revised values. If the current header had been previously shown as corrected, then the inserted rule is made visible; otherwise the inserted rule is made invisible. At Step 3516, the corrections module 112 goes back to Step 3508 if there are more headers to process. If not, the method ends at Step 3518.

Dynamic Retrieval of Table Values—FIG. 36(A-B)

Figure 36A:
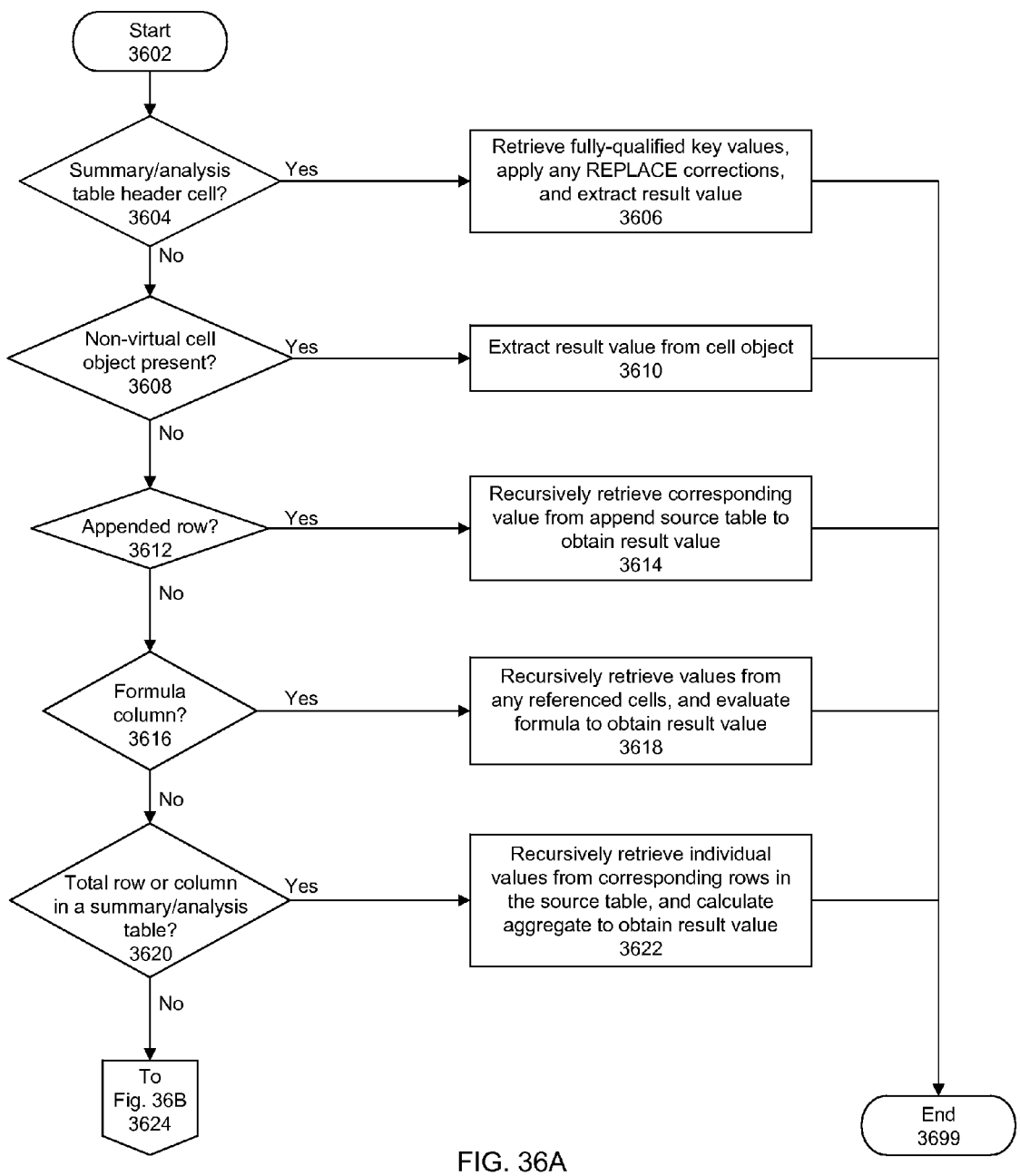
FIGS. 36A-36B illustrate methods for dynamic retrieval of table values.

FIGS. 36(A-B) illustrate the general method for dynamically retrieving cell values from a table. In FIG. 36A, starting at Step 3602 the data analysis system 100 proceeds to Step 3604, where it checks if the cell to be retrieved is a summary/analysis table header cell. If so, Step 3606 retrieves the key values for the header cell, applies any replace-type corrections, and extracts the result value; the method then ends at Step 3699. Otherwise, Step 3608 checks if there is a cell object present. If so, Step 3610 obtains the result value from the cell object, and the method ends. Otherwise, Step 3612 checks if the cell value is for an appended row. If so, Step 3614 retrieves the corresponding value from the append source table and the method then ends. Otherwise, Step 3616 checks if the cell is in a formula column. If so, Step 3618 retrieves any necessary values referenced by the formula and calculates the result value; the method then ends. Otherwise, Step 3620 checks if the cell is in a total row or total column within a summary/analysis table. If so, Step 3622 retrieves all appropriate values from the source table and aggregates the values to obtain the result value; the method then ends.

Figure 36B:
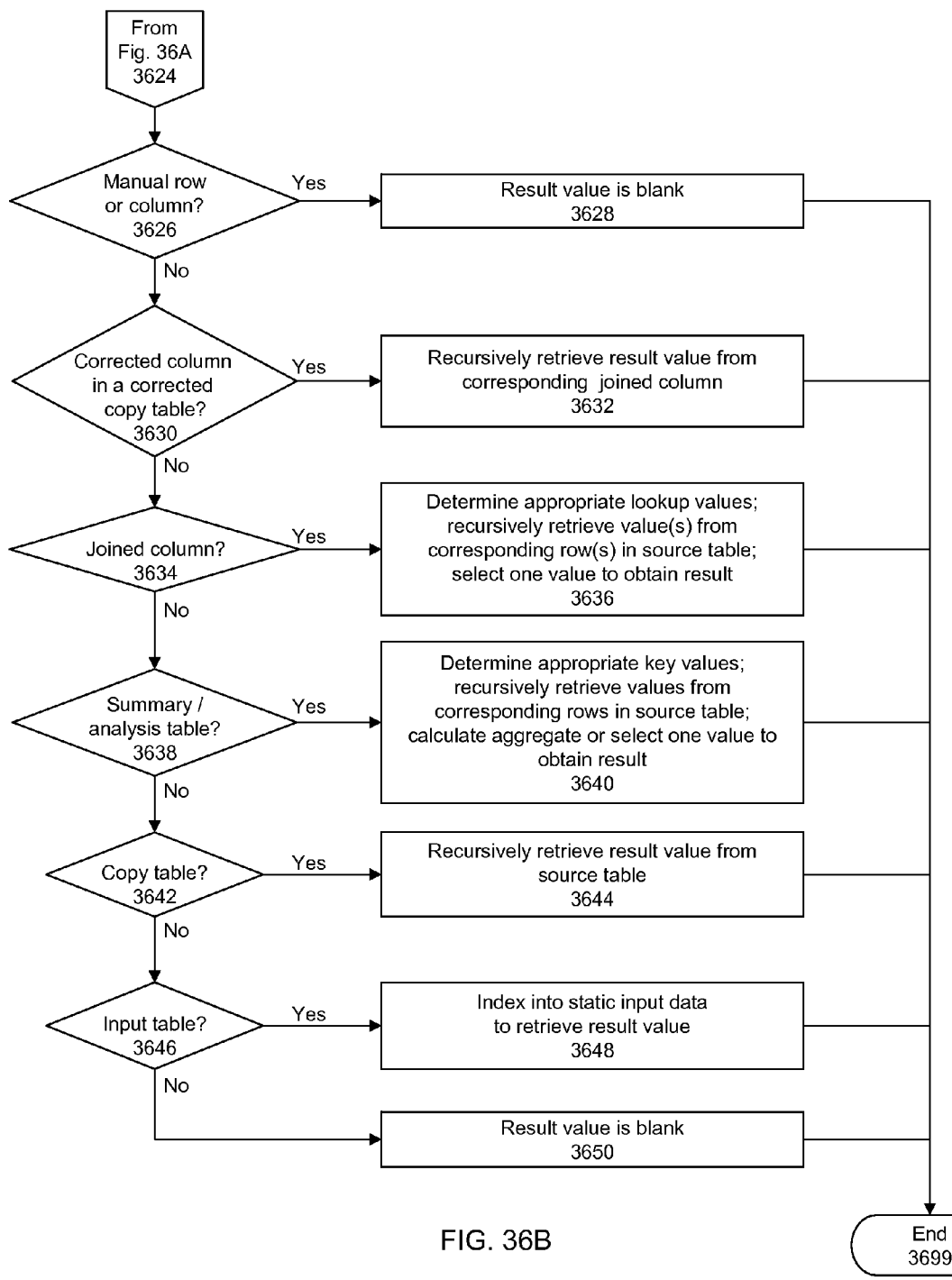

Continuing with FIG. 36B, Step 3626 checks if the cell is in a manual row or column. If so, Step 3628 sets the result value to blank, because Step 3608 had already determined that there is no cell object present; the method then ends. Otherwise, Step 3630 checks if the cell is in a corrected column within a corrected copy table. If so, Step 3632 retrieves the result value from the corresponding correcting column and the method then ends. Otherwise, Step 3634 checks if the cell is in a joined column. If so, Step 3636 then determines the appropriate join lookup value, locates the appropriate source table row, and then retrieves from it the result value; the method then ends. Otherwise, Step 3638 checks if the cell is in a summary or analysis table. If so, Step 3640 determines the appropriate key values, retrieves the corresponding rows in the source table, and then aggregates the values they contain to obtain the result value; the method then ends. Otherwise, Step 3642 checks if the cell is in a copy table. If so, Step 3644 retrieves the corresponding result value from the source table, and the method ends. Otherwise, Step 3646 checks if the cell is in an input table. If so, Step 3648 retrieves the result value from the table's static input data array, and the method ends. Otherwise, Step 3650 defaults the result value to blank and the method ends.

Any element in a claim that does not explicitly state "means for" performing a specified function, or "step for" performing a specific function, is not to be interpreted as a "means" or "step" clause as specified in 35 U.S.C. §112, paragraph 6.

It will be appreciated by those skilled in the art that the invention can take many forms, and that such forms are within the scope of the invention as claimed. Therefore, the spirit and scope of the appended claims should not be limited to the descriptions of the preferred versions contained herein.

What is claimed is:

1. A computer implemented method, executed in a processor, of joining a target table and a source table, the target table and the source table each comprising a plurality of cells arranged in rows and columns, each cell in the plurality of cells being capable of including data, the method comprising:

designating certain ones of the columns of the source table as source key columns;

assigning corresponding ones of the columns of the target table as target key columns thereby creating a one to one correspondence between each source key column and each of the assigned ones of the target key columns;

associating each row of the target table with the source table rows based on the condition that data included in the cells therein and in each source key column is identical to data included in the cells of the target table rows and the corresponding target key column; and populating, into cells of conjoined columns appended onto the target table, data identical to data in cells from corresponding source table columns and from source table rows associated with the target table rows;

thereby creating a joined table comprising the target table with the conjoined columns appended onto the target table;

displaying, on a single user interface screen, a target table icon representative of the target table, and a source table icon representative of the source table;

receiving a drag and drop selection of the source table icon onto the target table icon;

receiving a selection for the source key columns of the source table;

receiving a selection for the target key columns of the target table;

thereby to create the joined table; and displaying a visual directional link between the source table icon and the icon representative of the target table.

2. The method according to claim 1, further comprising:
changing, adding or removing data in at least one cell of the source table; and
updating the data in the joined table.

3. The method of claim 1 further comprising displaying the conjoined data from the source table in a first visual style, and displaying the data of the target table in a second visual style.

4. The method of claim 3 further wherein the first visual style comprises a first graphical icon and the second visual style comprises a second graphical icon.

5. The method of claim 1 wherein the source table is selected from the group consisting of a manual input table, an electronic spreadsheet input table and a database input table.

6. The method of claim 1 further comprising:
providing a user option to correct data in a cell of a target table row and of a target key column; and
updating conjoined data of the target table row to reflect the source table data which matches the corrected data of the cell of the target table row.

7. A computer implemented method, executed in a processor, of creating a resultant table based on a source table comprising a plurality of rows and columns comprising cells capable of including data values, the method comprising:
selecting a first one or more columns of the source table as key columns;
selecting a second one or more columns of the source table as summarization columns;
consolidating redundant data values in the key columns to a single set of key data values;
aggregating data values in the summarization columns associated with the single set of key data values to provide an aggregated value corresponding to the single set of key data values, wherein aggregating one or more data values comprises selecting a single representative data value from the one or more data values based on a selection rule;
thereby to create the resultant table comprising the set of key data values with the aggregated data values from the summarization columns, wherein data values of the resultant table are dynamically refreshed as changes are made to the source table based on a flag indicating objects for refresh.

8. The method according to claim 7, further comprising:
providing a user option to add, delete and/or correct values in the key columns and in the summarization columns; and
reflecting the corrected key column values and aggregated values in the summarized table.

9. The method of claim 7 wherein the source table is selected from the group consisting of a manual input table, an electronic spreadsheet input table and a database input table.

10. The method of claim 7 further comprising:
selecting a first one or more rows of the resultant table;
selecting a second row of the resultant table; and
combining the first one or more rows with the second row, so that only the second selected row is present in the resultant table; and
recalculating the aggregated values in the resultant table which are associated with the second row to include data values from the summarization columns corresponding to any one of the rows in the first and second selections of rows.

11. The method of claim 7 wherein the selected key columns comprise a plurality of columns and the rows of the resultant table are divided into groups of rows which have identical values for at least one but less than all of the selected key columns, and a row header is displayed in the resultant table for each of the groups of rows, the system further comprising:
receiving a first selection of one or more rows of the resultant table;
receiving a second selection of one row header of the resultant table; and
moving the first selection of one or more rows to associate them with the second selection in.

12. The system method of claim 7 wherein the selected key columns include a plurality of columns, the rows in the resultant table being divided into groups of rows which have identical values for at least one but not all of the selected key columns, and wherein a row header is displayed in the resultant table for each of the groups of rows, the system further comprising:
selecting a first one or more row headers in the resultant table;
selecting a second row header in the resultant table; and
combining the first selection of one or more row headers with the second selection of the row header, so that only the selected second row header is present in the resultant table;
wherein all rows associated with the first one or more row headers are re-associated with the selected second row header.

13. A computer implemented method, executed in a processor, of creating a resultant table based on a source table comprising a plurality of rows and columns comprising cells capable of including data values, the method comprising:
selecting a first one or more columns of the source table as key columns;
selecting a second one or more columns of the source table as summarization columns;
consolidating redundant data values in the key columns to a single set of key data values;
aggregating data values in the summarization columns associated with the single set of key data values to provide an aggregated value corresponding to the single set of key data values, wherein aggregating one or more data values comprises mathematically aggregating the one or more data values, thereby creating the resultant table;

selecting a first one or more rows of the resultant table;

selecting a second row of the resultant table;

combining the first one or more rows with the second row, so that only the second selected row is present in the resultant table; and recalculating the aggregated values in the resultant table which are associated with the second row to include data values from the summarization columns corresponding to any one of the rows in the first and second selections of rows;

wherein data values of the resultant table are dynamically refreshed as changes are made to the source table based on a flag indicating objects for refresh.

* * * * *